(12) United States Patent
Kim et al.

(10) Patent No.: US 11,449,165 B2
(45) Date of Patent: Sep. 20, 2022

(54) PRESSURE SENSORS CONSTITUTING PLURALITY OF CHANNELS, TOUCH INPUT DEVICE COMPRISING SAME, AND PRESSURE DETECTING METHOD USING SAME

(71) Applicant: HiDeep Inc., Seongnam-si (KR)

(72) Inventors: Bon Kee Kim, Seongnam-si (KR); Hyuk Jae Choi, Seongnam-si (KR); Myung Jun Jin, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 0 days.

(21) Appl. No.: 16/981,818

(22) PCT Filed: Dec. 12, 2018

(86) PCT No.: PCT/KR2018/015786
§ 371 (c)(1),
(2) Date: Sep. 17, 2020

(87) PCT Pub. No.: WO2019/190025
PCT Pub. Date: Oct. 3, 2019

(65) Prior Publication Data
US 2021/0026484 A1    Jan. 28, 2021

(30) Foreign Application Priority Data

Mar. 28, 2018   (KR) .................. 10-2018-0035520

(51) Int. Cl.
*G06F 3/041* (2006.01)
*G06F 3/044* (2006.01)
(52) U.S. Cl.
CPC ............ *G06F 3/0414* (2013.01); *G06F 3/044* (2013.01); *G06F 3/0412* (2013.01)

(58) Field of Classification Search
None
See application file for complete search history.

(56) References Cited

U.S. PATENT DOCUMENTS

2007/0262969 A1* 11/2007 Pak ..................... G06F 3/0418
345/173
2013/0257781 A1* 10/2013 Phulwani ........... G06F 3/04883
345/173

(Continued)

FOREIGN PATENT DOCUMENTS

JP    2016-080551 A    5/2016
JP    2018-017705 A    2/2018

(Continued)

OTHER PUBLICATIONS

International Search Report from PCT/KR2018/015786, dated Mar. 14, 2019, pp. 1-6, including English translation.

*Primary Examiner* — Christopher R Lamb
(74) *Attorney, Agent, or Firm* — The Belles Group, P.C.

(57) ABSTRACT

A touch input device according to an embodiment is capable of detecting a pressure of a touch on a touch surface and may include: a display module; and a pressure sensor which is disposed at a position where a distance from a reference potential layer may vary according to the touch for the touch surface, the distance is changeable according to a pressure magnitude of the touch, the pressure sensor may output a signal including information on a capacitance which is changed according to the distance, the pressure sensor may include a plurality of electrodes to form a plurality of channel, and detect the magnitude of the pressure for the touch based on a change amount of a capacitance detected in the each channel and an SNR improvement scaling factor assigned to each of the channels.

14 Claims, 35 Drawing Sheets

(56) References Cited

U.S. PATENT DOCUMENTS

| | | |
|---|---|---|
| 2016/0274720 A1 | 9/2016 | Shin |
| 2017/0052074 A1 | 2/2017 | Watazu et al. |
| 2017/0090668 A1* | 3/2017 | Agarwal ................. G06F 3/044 |
| 2017/0131840 A1* | 5/2017 | Deichmann ........... G06F 3/0412 |
| 2017/0364191 A1* | 12/2017 | Jiang ....................... G01L 1/146 |
| 2018/0032209 A1 | 2/2018 | Suzuki et al. |
| 2018/0267668 A1* | 9/2018 | Lu ......................... G01L 1/2262 |
| 2019/0114004 A1* | 4/2019 | Lee ....................... G06F 3/0418 |

FOREIGN PATENT DOCUMENTS

| | | | | |
|---|---|---|---|---|
| KR | 10-2016-0111575 A | 9/2016 | | |
| KR | 10-2017-0020837 A | 2/2017 | | |
| KR | 10-2017-0134760 A | 12/2017 | | |
| WO | WO-2017175035 A1 * | 10/2017 | .......... | G06F 3/0446 |
| WO | WO2017175035 A1 | 10/2017 | | |

* cited by examiner

Figure 3g
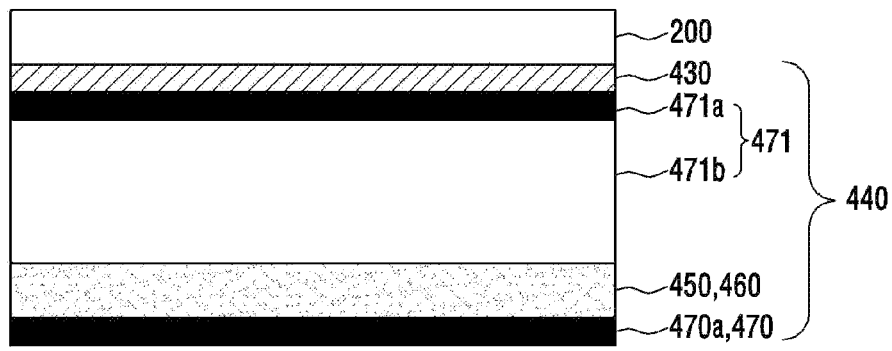
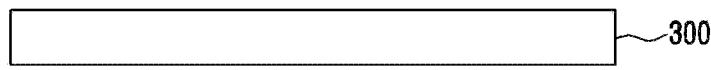
Figure 3h

PRESSURE SENSORS CONSTITUTING PLURALITY OF CHANNELS, TOUCH INPUT DEVICE COMPRISING SAME, AND PRESSURE DETECTING METHOD USING SAME

CROSS-REFERENCE TO RELATED PATENT APPLICATIONS

The present application is a U.S. national stage application under 35 U.S.C. § 371 of PCT Application No. PCT/KR2018/015786, filed Dec. 12, 2018, which claims priority to Korean Patent Application No. 10-2018-0035520, filed Mar. 28, 2018. The disclosures of the aforementioned priority applications are incorporated herein by reference in their entireties.

TECHNICAL FIELD

The present invention relates to a pressure sensor constituting a plurality of channels for pressure detection and a touch input device including the same, and more particularly, to a pressure sensor constituting a plurality of channels, which is applied to a touch input device configured to detect a touch location to detect a touch pressure, a touch input device including the same, and a pressure detection method using the same.

BACKGROUND ART

Various kinds of input devices are being used to operate a computing system. For example, input devices such as includes a button, a key, a joystick and a touch screen are used. Since the touch screen is easy and simple to operate, the touch screen is increasingly being used to operate the computing system.

The touch screen may constitute a touch surface of a touch input device including a touch sensor panel which may be a transparent panel including a touch-sensitive surface. The touch sensor panel is attached to a front side of a display screen, and then the touch-sensitive surface may cover a visible side of the display screen. The touch screen allows a user to operate the computing system by simply touching the touch screen by a finger, etc. Generally, the computing system recognizes the touch and a position of the touch on the touch screen and analyzes the touch, and thus, performs operations in accordance with the analysis.

Meanwhile, a touch input device has been released, which is capable of detecting not only the touch position according to the touch on the touch screen but a pressure magnitude of the touch. However, in a sensor for detecting a magnitude of the touch pressure, a touch pressure detection error may occur due to noise generated from a display device or ambient noise.

DISCLOSURE

Technical Problem

An object of the present invention is to provide a pressure sensor constituting a plurality of channels for pressure detection, a touch input device including the same, and a pressure detection method using the same. Another object of the present invention is to provide a method and a device for detecting pressure, which are resistant to ambient noise.

Technical Solution

A touch input device according to an embodiment is capable of detecting a pressure of a touch on a touch surface and may include: a display module; and a pressure sensor which is disposed at a position where a distance from a reference potential layer may vary according to the touch for the touch surface, the distance is changeable according to a pressure magnitude of the touch, the pressure sensor may output a signal including information on a capacitance which is changed according to the distance, the pressure sensor may include a plurality of electrodes to form a plurality of channel, and detect the magnitude of the pressure for the touch based on a change amount of a capacitance detected in the each channel and an SNR improvement scaling factor assigned to each of the channels.

wherein the SNR improvement scaling factor assigned to a channel in which N largest signals are detected among the signals detected in each channel is 1, the SNR improvement scaling factor assigned to a channel in which N smallest signals are detected is −1, and the SNR improvement scaling factor assigned to the remaining channels is 0.

wherein the SNR improvement scaling factor assigned to a channel in which N largest signals are detected among the signals detected in each channel is 1, the SNR improvement scaling factor assigned to a channel in which the smallest signal is detected is −N, and the SNR improvement scaling factor assigned to the remaining channels is 0.

wherein the SNR improvement scaling factor assigned to a channel in which a signal having a magnitude equal to or greater than a predetermined ratio of the largest signal magnitude among the signals detected in each channel is detected is 1, the SNR improvement scaling factor assigned to a channel in which N smallest signals are detected is −1, and the SNR improvement scaling factor assigned to the remaining channels is 0.

wherein when the SNR improvement scaling factor assigned to the channel in which a signal having the magnitude equal to or greater than the predetermined ratio of the largest signal magnitude among the signals detected in each channel is detected is 1 and the number of channels in which the signal having the magnitude equal to or greater than the predetermined ratio is detected is N, the SNR improvement scaling factor assigned to the channel in which the smallest signal is detected is −N and the SNR improvement scaling factor assigned to the remaining channels is 0.

The touch input device further comprises: a touch sensor detecting a touched position, wherein the SNR improvement scaling factor assigned to N channels closest to the touch position is 1, the SNR improvement scaling factor assigned to the channel in which N smallest signals are detected is −1, and the SNR improvement scaling factor assigned to the remaining channels is 0.

The touch input device further comprises: a touch sensor detecting a touched position, wherein the SNR improvement scaling factor assigned to N channels closest to the touch position is 1, the SNR improvement scaling factor assigned to the channel in which smallest signals are detected is −N, and the SNR improvement scaling factor assigned to the remaining channels is 0.

wherein at least any one of the plurality of electrodes has a different area from other electrodes, and when the SNR improvement scaling factor assigned to the channel in which the N largest signals among the signals detected in each channel are detected is 1, the sum of the areas of the channels in which the N largest signals are detected is Amax, and the sum of the areas of the channels in which the N smallest signals are detected is Amin, the SNR improvement scaling factor assigned to the channel where the N smallest signals are detected is −Amax/Amin and the SNR improvement scaling factor assigned to the remaining channels is 0.

wherein at least any one of the plurality of electrodes has a different area from other electrodes, and when the SNR improvement scaling factor assigned to the channel in which the N largest signals among the signals detected in each channel are detected is 1, the sum of the areas of the channels in which the N largest signals are detected is Amax, and the areas of the channels in which the smallest signals are detected is A, the SNR improvement scaling factor assigned to the channel where the smallest signals are detected is −Amax/A and the SNR improvement scaling factor assigned to the remaining channels is 0.

wherein the electrical characteristic is a capacitance, and the magnitude of the pressure for the touch is detected based on the sum of values obtained by multiplying a change amount of the capacitance detected in the each channel and the SNR improvement scaling factor assigned to the each channel by each other.

wherein the electrical characteristic is the capacitance, and the magnitude of the pressure for the touch is detected based on the sum of values obtained by multiplying the change amount of the capacitance detected in the each channel, a sensitivity correction scaling factor previously assigned to the each channel and the SNR improvement scaling factor assigned to the each channel by each other.

wherein the sensitivity correction scaling factor assigned to the channel corresponding to a center of a display module is smaller than the sensitivity correction scaling factor assigned to the channel corresponding to an edge of the display module.

wherein the electrical characteristic is the capacitance, a volume change amount of the touch input device is estimated from the change amount of the capacitance detected in the each channel, and the magnitude of the pressure for the touch is detected based on the estimated volume change amount and the SNR improvement scaling factor assigned to the each channel.

wherein the magnitude of the pressure for the touch is detected based on the estimated volume change amount, the SNR improvement scaling factor assigned to the each channel, and a reference value corresponding to a predetermined touch position which is prestored.

wherein the volume change amount of the touch input device is estimated by calculating a distance change corresponding to the each channel from the change amount of the capacitance detected in the each channel.

Advantageous Effects

According to the embodiment of the present invention, it is possible to provide a pressure sensor constituting a plurality of channels for pressure detection, a touch input device including the same, and a pressure detection method using the same. Further, according to the embodiment of the present invention, it is possible to provide a pressure sensor constituting a plurality of channels having a high-pressure detection accuracy of the touch, and the touch input device including the same. In addition, according to the embodiment of the present invention, it is possible to provide a method and a device for detecting touch pressure, which are resistant to ambient noise.

DESCRIPTION OF DRAWINGS

FIG. 3a to FIG. 3h are cross-sectional views of an exemplary pressure sensor including a pressure electrode according to an embodiment of the present invention.

FIG. 14b is a cross-sectional view illustrating a form in which the touch input device is bent when a touch pressure is applied to the touch surface corresponding to the position A of FIG. 14a.

FIG. 14c is a cross-sectional view illustrating a form in which the touch input device is bent when a touch pressure is applied to the touch surface corresponding to the position C of FIG. 14a.

FIG. 16a is a graph for explaining a relationship between a magnitude of applied pressure and a volume change amount of a touch input device when a pressure is applied to the position shown in FIG. 14a.

FIG. 19a is a view for explaining a case in which pressure is applied to the position D of the pressure sensor shown in FIG. 14a.

FIG. 19b is a graph for explaining calculating a pressure value when a pressure is applied to the position D shown in FIG. 19a.

FIG. 22c and FIG. 22d are diagrams showing the amount of change in capacitance detected in each channel when pressure is applied to the position P of FIG. 22a.

MODE FOR INVENTION

Figure 1:
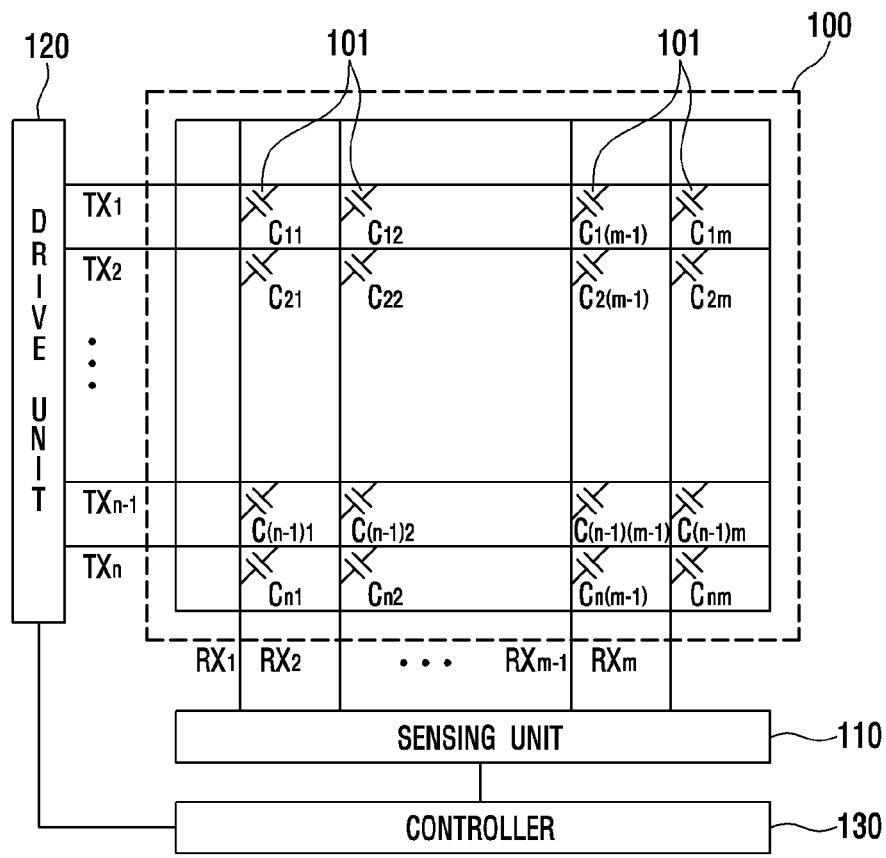
FIG. 1 is a schematic view of a configuration of the capacitance type touch sensor panel and an operation of the touch sensor panel.

The following detailed description of the present invention will be made with reference to the accompanying drawings which illustrate a specified embodiment in which the present invention may be implemented as an example. The embodiment will be described in enough detail so that those skilled in the art are able to embody the present invention. It should be understood that various embodiments of the present invention are different from each other and need not be mutually exclusive. Similar reference numerals in the drawings designate the same or similar functions in many aspects.

Hereinafter, a pressure sensor for pressure detection and a touch input device to which a pressure detection module including the pressure sensor can be applied according to an embodiment of the present invention will be described with reference to the accompanying drawings. Hereinafter, while a capacitance type touch sensor panel 100 is exemplified below, the touch sensor panel 100 capable of detecting a touch position in any manner may be applied.

FIG. 1 is a schematic view of a configuration of the capacitance type touch sensor panel 100 which may be applied to a pressure sensor and a touch input device 1000 to which a pressure detection module including the same may be applied, and an operation of the touch sensor panel. Referring to FIG. 1, the touch sensor panel 100 may include a plurality of drive electrodes TX1 to TXn and a plurality of receiving electrodes RX1 to RXm, and may include a drive unit 120 which applies a driving signal to the plurality of drive electrodes TX1 to TXn for the purpose of the operation of the touch sensor panel 100, and a sensing unit 110 which detects whether a touch occurs and/or a touch position by receiving a sensing signal including information on a capacitance change amount changing according to the touch on a touch surface of the touch sensor panel 100.

As illustrated in FIG. 1, the touch sensor panel 100 may include the plurality of drive electrodes TX1 to TXn and the plurality of receiving electrodes RX1 to RXm. While FIG. 1 illustrates that the plurality of drive electrodes TX1 to TXn and the plurality of receiving electrodes RX1 to RXm of the touch sensor panel 100 form an orthogonal array, the present invention is not limited thereto and the plurality of drive electrodes TX1 to TXn and the plurality of receiving electrodes RX1 to RXm may have arbitrary numbers of dimensions including a diagonal array, a concentric array, a 3-dimensional random array, etc., and an application array thereof. Here, "n" and "m" which are positive integers may be the same as each other or may have different from each other and magnitudes of the values may be changed depending on the embodiment.

As illustrated in FIG. 1, the plurality of drive electrodes TX1 to TXn and the plurality of receiving electrodes RX1 to RXm may be arranged to cross each other. The drive electrode TX may include the plurality of drive electrodes TX1 to TXn extending in a first axial direction and the receiving electrode RX may include the plurality of receiving electrodes RX1 to RXm extending in a second axial direction crossing the first axial direction.

In the touch sensor panel 100 according to the embodiment of the present invention, the plurality of drive electrodes TX1 to TXn and the plurality of receiving electrodes RX1 to RXm may be formed in the same layer. For example, the plurality of drive electrodes TX1 to TXn and the plurality of receiving electrodes RX1 to RXm may be formed on the same side of an insulation layer (not illustrated). Further, the plurality of drive electrodes TX1 to TXn and the plurality of receiving electrodes RX1 to RXm may be formed in the different layers. For example, the plurality of drive electrodes TX1 to TXn and the plurality of receiving electrodes RX1 to RXm may be formed on both sides of one insulation layer (not illustrated) respectively, or the plurality of drive electrodes TX1 to TXn may be formed on a side of a first insulation layer (not illustrated) and the plurality of receiving electrodes RX1 to RXm may be formed on a side of a second insulation layer (not illustrated) different from the first insulation layer.

The plurality of drive electrodes TX1 to TXn and the plurality of receiving electrodes RX1 to RXm may be made of a transparent conductive material (for example, indium tin oxide (ITO) or antimony tin oxide (ATO) which is made of tin oxide ($SnO_2$), and indium oxide ($In_2O_3$), etc.), or the like. However, this is only an example and the drive electrode TX and the receiving electrode RX may also be made of another transparent conductive material or an opaque conductive material. For instance, the drive electrode TX and the receiving electrode RX may be formed to include at least any one of silver ink, copper or carbon nanotube (CNT). Further, the drive electrode TX and the receiving electrode RX may be made of metal mesh or nano silver.

The drive unit 120 according to the embodiment of the present invention may apply a driving signal to the drive electrodes TX1 to TXn. In the embodiment of the present invention, one driving signal may be sequentially applied to one drive electrode at a time to the first drive electrode TX1 to the n-th drive electrode TXn. The driving signal may be applied again repeatedly. This is only an example and the driving signals may be applied to the plurality of drive electrodes at the same time in accordance with the embodiment.

Through the receiving electrodes RX1 to RXm, the sensing unit 110 receives the sensing signal including information on a capacitance (Cm) 101 generated between the receiving electrodes RX1 to RXm and the drive electrodes TX1 to TXn to which the driving signal has been applied, thereby detecting whether the touch has occurred and where the touch has occurred. For example, the sensing signal may be a signal obtained by coupling the drive signal applied to the drive electrode TX by the capacitance (CM) 101 generated between the drive electrode TX and the receiving electrode RX. As such, the process of sensing the driving signal applied from the first drive electrode TX1 to the n-th drive electrode TXn through the receiving electrodes RX1 to RXm can be referred to as a process of scanning the touch sensor panel 100.

For example, the sensing unit 110 may include a receiver (not shown) which is connected to each of the receiving electrodes RX1 to RXm through a switch. The switch becomes the on-state in a time interval during which the signal of the corresponding receiving electrode RX is sensed, thereby allowing the receiver to sense the sensing signal from the receiving electrode RX. The receiver may include an amplifier (not shown) and a feedback capacitor coupled between the negative (−) input terminal of the amplifier and the output terminal of the amplifier, i.e., coupled to a feedback path. In this case, the positive (+) input terminal of the amplifier may be connected to the ground or a reference voltage. Further, the receiver may further include a reset switch which is connected in parallel with the feedback capacitor. The reset switch may reset the conversion from current to voltage that is performed by the receiver. The negative input terminal of the amplifier is connected to the corresponding receiving electrode RX and receives and integrates a current signal including information on the capacitance (CM) 101, and then converts the integrated current signal into voltage. The sensing unit 110 may further include an analog-digital converter (ADC) (not shown) which converts the integrated data by the receiver into digital data. Later, the digital data may be input to a processor (not shown) and processed to obtain information on the touch on the touch sensor panel 100. The sensing unit 110 may include the ADC and the processor as well as the receiver.

A controller 130 may perform a function of controlling the operations of the drive unit 120 and the sensing unit 110. For example, the controller 130 generates and transmits a drive control signal to the drive unit 120, so that the driving signal may be applied to a predetermined drive electrode TX1 at a predetermined time. Further, the controller 130 generates and transmits the drive control signal to the sensing unit 110, so that the sensing unit 110 may receive the sensing signal from the predetermined receiving electrode RX at a predetermined time and perform a predetermined function.

In FIG. 1, the drive unit 120 and the sensing unit 110 may constitute a touch detection device (not illustrated) capable of detecting whether the touch has occurred on the touch sensor panel 100 according to the embodiment of the present invention or not and/or where the touch has occurred. The touch detection device according to the embodiment of the present invention may further include the controller 130. The touch detection device according to the embodiment of the present invention may be integrated and implemented on a touch sensing integrated circuit (IC, not shown) which is a touch sensing circuit in a touch input device 1000 including the touch sensor panel 100. The drive electrode TX and the receiving electrode RX included in the touch sensor panel 100 may be connected to the drive unit 120 and the sensing unit 110 included in the touch sensing IC through, for example, a conductive trace and/or a conductive pattern printed on a circuit board, or the like. The touch sensing IC may be located on a circuit board on which the conductive pattern has been printed. According to the embodiment, the touch sensing IC may be mounted on a main board for operation of the touch input device 1000.

As described above, a capacitance (C) with a predetermined value is generated at each crossing point of the drive electrode TX and the receiving electrode RX and when an object like a finger approaches the touch sensor panel 100, the value of the capacitance may be changed. In FIG. 1, the capacitance may represent a mutual capacitance (Cm). The sensing unit 110 senses such electrical characteristics, thereby being able to sense whether the touch has occurred on the touch sensor panel 100 and where the touch has occurred. For example, the sensing unit 110 is able to sense whether the touch has occurred on the surface of the touch sensor panel 100 comprised of a two-dimensional plane consisting of a first axis and a second axis.

More specifically, when the touch occurs on the touch sensor panel 100, the drive electrode TX to which the driving signal has been applied is detected, so that the position of the second axial direction of the touch may be detected. Likewise, when the touch occurs on the touch sensor panel 100, the capacitance change is detected from the reception signal received through the receiving electrode RX, so that the position of the first axial direction of the touch can be detected.

The mutual capacitance type touch sensor panel as the touch sensor panel 100 has been described in detail in the foregoing, but in the touch input device 1000 according to the embodiment of the present invention, the touch sensor panel 100 for detecting whether or not the touch has occurred and where the touch has occurred may be implemented by using not only the above-described method but also any touch sensing method such as a self-capacitance type method, a surface capacitance type method, a projected capacitance type method, a resistance film method, a surface acoustic wave (SAW) method, an infrared method, an optical imaging method, a dispersive signal technology, and an acoustic pulse recognition method, etc.

Hereinafter, a component corresponding to the drive electrode TX and the receiving electrode RX for detecting whether or not the touch has occurred and/or the touch position may be referred to as a touch sensor.

In the pressure sensor and the touch input device 1000 to which the pressure detection module including the pressure sensor can be applied according to an embodiment of the present invention, the touch sensor panel 100 may be positioned outside or inside a display panel 200A. The display panel 200A of the touch input device 1000 according to an embodiment of the present invention may be a display panel included in a liquid crystal display (LCD), a plasma display panel (PDP), an organic light emitting diode (OLED), etc. Accordingly, a user may perform the input operation by touching the touch surface while visually identifying an image displayed on the display panel. In this case, the display panel 200A may include a control circuit which receives an input from an application processor (AP) or a central processing unit (CPU) on a main board for the operation of the touch input device 1000 and displays the contents that the user wants on the display panel. In this case, the control circuit for the operation of the display panel 200A may be mounted on a second printed circuit board (hereafter, referred to as a second PCB) 210 in FIGS. 10a to 12d. In this case, the control circuit for the operation of the display panel 200A may include a display panel control IC, a graphic controller IC, and a circuit required to operate other display panels 200A.

FIGS. 2a to 2e are conceptual views illustrating a relative position of the touch sensor panel 100 with respect to the display panel 200A in the touch input device to which the pressure sensor 440 according to an embodiment of the present invention may be applied.

Figure 2A:
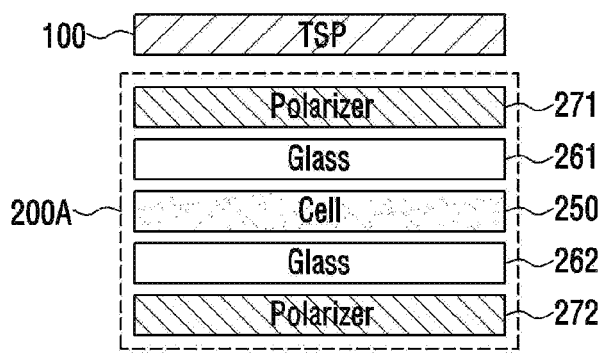
FIG. 2a to FIG. 2e are conceptual diagrams illustrating a relative position of a touch sensor panel with respect to a display panel in a touch input device according to an exemplary embodiment.
Figure 2B:
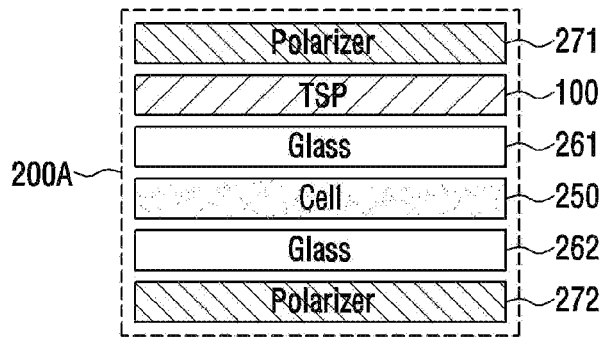
Figure 2C:
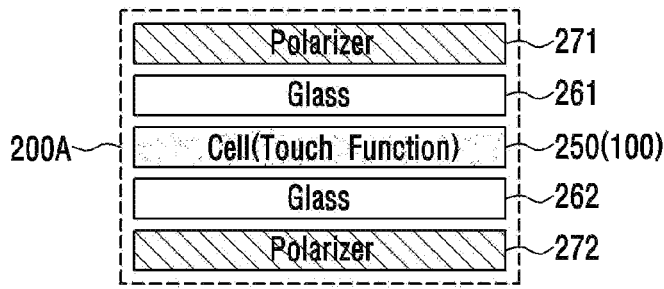

FIGS. 2a to 2c are diagrams for describing the relative position of the touch sensor panel 100 with respect to the display panel 200A using an LCD panel. As illustrated in FIGS. 2a to 2c, the LCD panel may include a liquid crystal layer 250 including a liquid crystal cell, a first substrate 261 and a second substrate 262 which are disposed on both ends of the liquid crystal layer 250 and include electrodes, a first polarizer layer 271 formed on a side of the first substrate 261 in a direction facing the liquid crystal layer 250, and a second polarizer layer 272 formed on a side of the second substrate 262. In this case, the first substrate 261 may be color filter glass, and the second substrate 262 may be TFT glass. Further, the first substrate 261 and/or the second substrate 262 may be a plastic substrate.

It is apparent to those skilled in the art that the LCD panel may further include other configurations for the purpose of performing the displaying function and may be transformed.

FIG. 2a illustrates that the touch sensor panel 100 of the touch input device 1000 is disposed outside the display panel 200A. The touch surface of the touch input device 1000 may be the surface of the touch sensor panel 100. In FIG. 2a, the top surface of the touch sensor panel 100 may be the touch surface. Further, according to the embodiment, the touch surface of the touch input device 1000 may be the outer surface of the display panel 200A. In FIG. 2a, an outer surface of the display panel 200A which may be the touch surface may be a bottom surface of the second polarizer layer 272 of the display panel 200A. In this case, in order to protect the display panel 200A, the bottom surface of the display panel 200A may be covered with a cover layer (not illustrated) like glass.

FIGS. 2b and 2c illustrate that the touch sensor panel 100 of the touch input device 1000 is disposed inside the display panel 200A. In this case, in FIG. 2b, the touch sensor panel 100 for detecting the touch position is disposed between the first substrate 261 and the first polarizer layer 271. The touch surface of the touch input device 1000 is the outer surface of the display panel 200A and may become the top surface or the bottom surface in FIG. 2b. FIG. 2c illustrates that the touch sensor panel 100 for detecting the touch position implemented to be included in the liquid crystal layer 250, that is, that the touch sensor panel 100 is disposed between the first substrate 261 and the second substrate 262. In this case, the touch surface of the touch input device 1000 is the outer surface of the display panel 200A and may become the top surface or the bottom surface in FIG. 2c. In FIGS. 2b and 2c, the top surface or bottom surface of the display panel 200A, which may be the touch surface, may be covered with a cover layer (not illustrated) like glass.

Figure 2D:
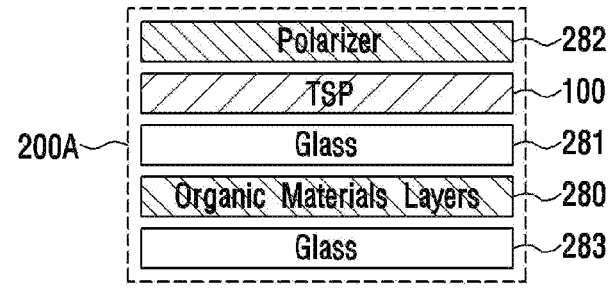
Figure 2E:
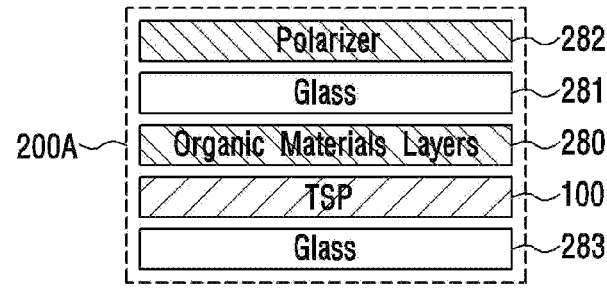

FIGS. 2d and 2e are diagrams for describing the relative position of the touch sensor panel 100 with respect to the display panel 200A using an OLED panel. In FIG. 2d, the touch sensor panel 100 is positioned between a polarizer layer 282 and a first substrate 281 and in FIG. 2e, the touch sensor panel 100 is positioned between an organic material layer 280 and a second substrate 283. Further, the touch sensor panel 100 may be positioned between the first substrate 281 and the organic material layer 280.

The first substrate 281 may be made of encapsulation glass and the second substrate 283 may be made of TFT glass. Further, the first substrate 281 and/or the second substrate 283 may be a plastic substrate. Since the touch sensing has been described above, the other configurations only will be briefly described.

The OLED panel is a self-light emitting display panel which uses a principle where, when current flows through a fluorescent or phosphorescent organic thin film and then electrons and electron holes are combined in the organic material layer, so that light is generated, and the organic matter constituting the light emitting layer determines the color of the light.

Specifically, the OLED uses a principle in which when an organic matter is applied on glass or plastic and electricity flows thereon, the organic matter emits light. That is, the principle is used in which holes and electrons are injected into the anode and cathode of the organic matter respectively and are recombined in the light emitting layer, so that a high energy exciton is generated and the exciton releases the energy while falling down to a low energy state and then light with a particular wavelength is generated. In this case, the color of the light is changed according to the organic matter of the light emitting layer.

The OLED includes a line-driven passive-matrix organic light-emitting diode (PM-OLED) and an individual driven active-matrix organic light-emitting diode (AM-OLED) in accordance with the operating characteristics of a pixel constituting a pixel matrix. Since none of them require a backlight, the OLED enables a very thin display module to be implemented, has a constant contrast ratio according to an angle and obtains a good color reproductivity depending on a temperature. Further, the OLEDs are very economical in that a non-driven pixel does not consume power.

In terms of operation, the PM-OLED emits light only during a scanning time at a high current, and the AM-OLED continuously maintains a light emitting state during a frame time at a low current. Therefore, the AM-OLED has a resolution higher than that of the PM-OLED and is advantageous for driving a large area display panel and consumes low power. Further, a thin film transistor (TFT) is embedded in the AM-OLED, and thus, each component may be individually controlled, so that it is easy to implement a delicate screen.

As illustrated in FIGS. 2d and 2e, basically, the OLED (particularly, AM-OLED) panel includes the polarizer layer 282, the first substrate 281, the organic material layer 280, and the second substrate 283. Here, the first substrate 281 may be made of encapsulation glass and the second substrate 283 may be made of TFT glass, but are not limited thereto and the first substrate 281 and/or the second substrate 283 may be plastic substrates.

Further, the organic material layer 280 may include a hole injection layer (HIL), a hole transport layer (HTL), an electron injection layer (EIL), an electron transport layer (ETL), and an emission material layer (EML).

Briefly describing each of the layers, HIL injects holes and is made of a material such as CuPc, etc. HTL functions to move the injected holes and mainly is made of a material having a good hole mobility. Arylamine, TPD, and the like may be used as the HTL. The EIL and ETL inject and transport electrons and the injected electrons and electron holes are combined in the EML to emit light. The EML as a material represents the color of the emitted light is composed of a host determining the lifespan of the organic matter and a dopant determining the color sense and efficiency. This just describes the basic structure of the organic material layer 280 include in the OLED panel and the present invention is not limited to the layer structure or material, etc., of the organic material layer 280.

The organic material layer 280 is inserted between an anode (not shown) and a cathode (not illustrated) and when the TFT becomes an on-state, a driving current is applied to the anode and the electron holes are injected, and the electrons are injected to the cathode and the electron holes and electrons move to the organic material layer 280 to emit the light.

Further, according to the embodiment, at least a portion of the touch sensors may be configured to be located within the display panel 200A and at least the remaining portion of the touch sensors may be configured to be located outside the display panel 200A. For example, any one of the drive electrode TX and the receiving electrode RX which constitute the touch sensor panel 100 may be configured to be located outside the display panel 200A and the other may be configured to be located within the display panel 200A. When the touch sensor is disposed within the display panel 200A, an electrode for the operation of the touch sensor may be further added. In addition, various components and/or electrodes disposed within the display panel 200A may also be used as the touch sensor for touch sensing.

Further, according to the embodiment, at least a portion of the touch sensor may be configured to be located between the first substrates 261 and 281 and the second substrates 262 and 283 and at least the remaining portion of the touch sensor may be configured to be located on the first substrates 261 and 281. For example, any one of the drive electrode TX and the receiving electrode RX which constitute the touch sensor panel 100 may be configured to be located on the first substrates 261 and 281 and the other may be configured to be located between the first substrate 261 and 281 and the second substrates 262 and 283. In this case, likewise, when the touch sensor is disposed between the first substrates 261 and 281 and the second substrates 262 and 283, an electrode for the operation of the touch sensor may be further added, but various components and/or electrodes located between the first substrates 261 and 281 and the second substrates 262 and 283 may be used as the touch sensor for touch sensing.

The second substrates 262 and 283 may be comprised of various layers including a data line, a gate line, TFT, a common electrode, and a pixel electrode, etc. Specifically, when the display panel 200A is the LCD panel, the electrical components may operate in such a manner as to generate a controlled electric field and orient liquid crystals located in the liquid crystal layer 250. Any one of the data line, the gate line, the common electrode, and the pixel electrode included in the second substrates 262 and 283 may be configured to be used as the touch sensor.

Hereinabove, the touch input device 1000 including the touch sensor panel 100 capable of detecting whether the touch has occurred and/or the touch position has been described. The pressure sensor 440 is applied to the aforementioned touch input device 1000, so that it is possible to easily detect a magnitude of a touch pressure as well as whether the touch has occurred and/or the touch position. Hereinafter, described in detail is an example of a case of detecting the touch pressure by applying the pressure sensor to the touch input device 1000. According to the embodiment, the touch input device to which the pressure detection module is applied may not have the touch sensor panel 100.

Figure 3A:
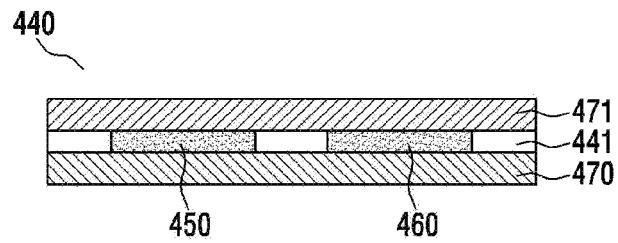

FIG. 3a is an exemplary cross sectional view of the pressure sensor including a pressure electrode. For example, the pressure sensor 440 may include an electrode layer 441 between a first insulation layer 470 and a second insulation layer 471. The electrode layer 441 may include a first electrode 450 and/or a second electrode 460. In this case, the first insulation layer 470 and the second insulation layer 471 may be made of an insulating material such as polyimide. The first electrode 450 and/or the second electrode 460 included in the electrode layer 441 may include a material such as copper. In accordance with a manufacturing process of the pressure sensor 440, the electrode layer 441 and the second insulation layer 471 may be adhered to each other by means of an adhesive (not illustrated) such as an optically clear adhesive (OCA). Further, according to the embodiment, the pressure electrodes 450 and 460 may be formed by positioning a mask, which has a through-hole corresponding to a pressure electrode pattern, on the first insulation layer 470, and then by spraying a conductive spray. According to the embodiment, the pressure sensor 440 may include only the first electrode 450. In this case, the pressure may be configured to be sensed by using a change in capacitance between the reference potential and the first electrode 450 spaced apart. In another embodiment, the pressure may be configured to be sensed by using a change in capacitance between a first pressure sensor including a first electrode and a second pressure sensor including a second electrode and disposed to be spaced apart.

Figure 4A:
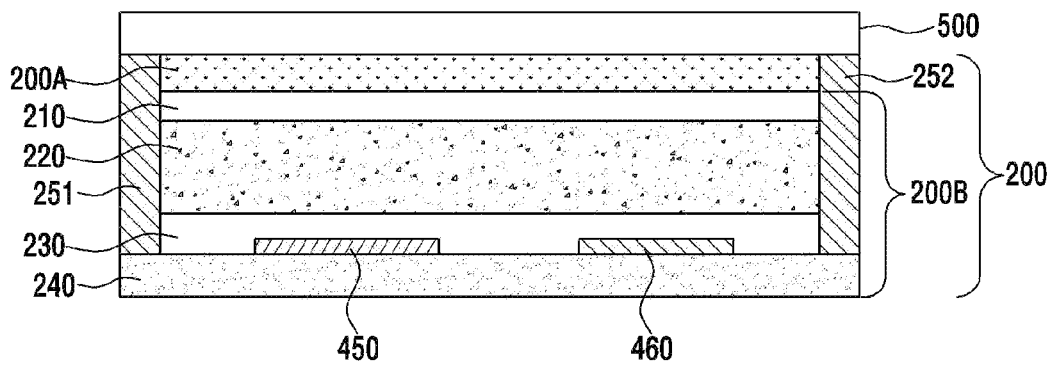
FIG. 4a is a cross-sectional view of a touch input device of a first example to which a pressure sensor and a pressure detection module according to an embodiment of the present invention can be applied.

FIG. 4a is a cross sectional view of the touch input device of a first example, to which the pressure sensor and the pressure detection module may be applied.

The cross sectional view of the touch input device 1000 illustrated in FIG. 4a may be a cross sectional view of a portion of the touch input device 1000. As illustrated in FIG. 4a, the touch input device 1000 according to the embodiment of the present invention may be configured to include a display panel 200A, a backlight unit 200B disposed under the display panel 200A, and a cover layer 500 disposed on the display panel 200A. In the touch input device 1000 according to the embodiment, the pressure sensors 450 and 460 may be formed on a cover 240. In this specification, the display panel 200A and the backlight unit 200B are included to be referred to as a display module 200. In FIG. 4a, it is illustrated that the pressure sensors 450 and 460 are attached on the cover 240, but according to the embodiment, the pressure sensors 450 and 460 may also be attached to a component which is included in the touch input device 1000 and performs the same or similar function as/to that of the cover 240. Further, the pressure sensors 450 and 460 may also have forms illustrated in FIG. 3a and an electrode may be directly formed on the cover 240, the display module 200, the display panel 200A, the substrate 300, and a flexible printed circuit board (FPCB) or in the display panel 200A by methods including patterning, printing, and the like.

The touch input device 1000 according to the embodiment may include an electronic device including the touch screen, for example, a cell phone, a personal data assistant (PDA), a smart phone, a tablet personal computer, an MP3 player, a laptop computer, etc.

The display panel 200A in the touch input device 1000 according to the embodiment may be a display panel in which at least a portion of the touch sensor is included within the display panel 200A. Further, according to the embodiment, the drive electrode and the receiving electrode which are for sensing the touch may be included within the display panel 200A.

FIG. 4a does not separately illustrate the touch sensor panel 100, but in the touch input device 1000 according to the first example of the present invention, the lamination is made between the touch sensor panel 100 and the display module 200 for detecting the touch position by an adhesive such as the optically clear adhesive (OCA) according to the embodiment. As a result, the display color clarity, visibility and optical transmittance of the display module 200, which may be recognized through the touch surface of the touch sensor panel 100, may be improved. In this case, the cover layer 500 may be disposed on the touch sensor panel 100.

The cover layer 500 according to the embodiment may be comprised of a cover glass which protects the front side of the display panel 200A and forms the touch surface. As illustrated in FIG. 4a, the cover layer 500 may be formed wider than the display panel 200A.

Since the display panel 200A such as the LCD panel according to the embodiment performs a function of only blocking or transmitting the light without emitting light by itself, the backlight unit 200B may be required. For example, the backlight unit 200B is disposed under the display panel 200A, includes a light source and throws the light on the display panel 200A, so that not only brightness and darkness but also information having a variety of colors is displayed on the screen. Since the display panel 200A is a passive device, it is not self-luminous. Therefore, the rear side of the display panel 200A requires a light source having a uniform luminance distribution.

The backlight unit 200B according to the embodiment may be configured to include an optical layer 220 for throwing the light on the display panel 200A. The optical layer 220 will be described in detail with reference to FIG. 4b.

The backlight unit 200B according to the embodiment may be configured to include the cover 240. The cover 240 may be made of a metallic material. When a pressure is applied from the outside through the cover layer 500 of the touch input device 1000, the cover layer 500, the display module 200, etc., may be bent. In this case, the bending causes a distance between the pressure sensors 450 and 460 and a reference potential layer located within the display module to be changed and the capacitance change caused by the distance change is detected through the pressure sensors 450 and 460, so that the magnitude of the pressure may be detected. In this case, when a pressure is applied to the cover layer 500 in order to precisely detect the magnitude of the pressure, the positions of the pressure sensors 450 and 460 need to be fixed without changing. Therefore, the cover 240 may perform a function of a support capable of fixing a pressure sensor without being relatively bent even by the application of pressure. According to the embodiment, the cover 240 is manufactured separately from the backlight unit 200B, and may be assembled together when the display module is manufactured.

In the touch input device 1000 according to the embodiment, a first air gap 210 may be included between the display panel 200A and the backlight unit 200B. This is intended to protect the display panel 200A and/or the backlight unit 200B from an external impact. This first air gap 210 may be configured to be included in the backlight unit 200B.

The optical layer 220 and the cover 240, which are included in the backlight unit 200B, may be configured to be spaced apart from each other. A second air gap 230 may be provided between the optical layer 220 and the cover 240. The second air gap 230 may be required in order to ensure that the pressure sensors 450 and 460 disposed on the cover 240 do not contact with the optical layer 220, and in order to prevent that the optical layer 220 contacts the pressure sensors 450 and 460 and deteriorates the performance of the optical layer 220 even though an external pressure is applied to the cover layer 500 and the optical layer 220, the display panel 200A, and the cover layer 500 are bent.

The touch input device 1000 according to the embodiment may further include supports 251 and 252 such that the display panel 200A, the backlight unit 200B, and the cover layer 500 are coupled to maintain a fixed shape. According to the embodiment, the cover 240 may be integrally formed with the supports 251 and 252. According to the embodiment, the supports 251 and 252 may form a portion of the backlight unit 200B.

The structures and functions of the LCD panel 200A and the backlight unit 200B are a publicly known art and will be briefly described below. The backlight unit 200B may include several optical parts.

Figure 4B:
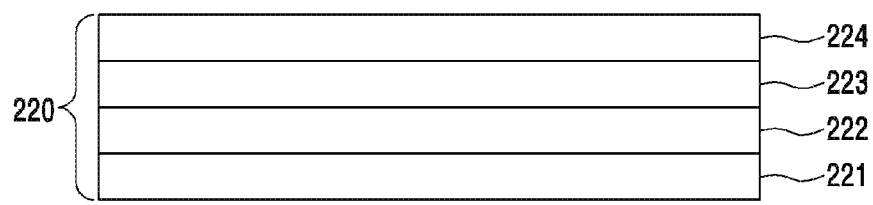
FIG. 4b illustrates an optical layer of a backlight unit in a touch input device according to an embodiment.

FIG. 4b illustrates the optical layer 220 of the backlight unit 200B in the touch input device according to the embodiment. FIG. 4b illustrates the optical layer 220 when the LCD panel is used as the display panel 200A.

In FIG. 4b, the optical layer 220 of the backlight unit 200B may include a reflective sheet 221, a light guide plate 222, a diffuser sheet 223, and a prism sheet 224. In this case, the backlight unit 200B may include a light source (not illustrated) which is formed in the form of a linear light source or point light source and is disposed on the rear and/or side of the light guide plate 222.

The light guide plate 222 may serve to generally convert light from the light source (not illustrated) in the form of a linear light source or point light source into light from a light source in the form of a surface light source, and allow the light to proceed to the LCD panel 200A.

A part of the light emitted from the light guide plate 222 may be emitted to a side opposite to the LCD panel 200A and be lost. The reflective sheet 221 may be positioned below the light guide plate 222 so as to cause the lost light to be incident again on the light guide plate 222, and may be made of a material having a high reflectance.

The diffuser sheet 223 functions to diffuse the light incident from the light guide plate 222. For example, light scattered by the pattern of the light guide plate 222 comes directly into the eyes of the user, and thus, the pattern of the light guide plate 222 may be shown as it is. Moreover, since such a pattern may be clearly sensed even after the LCD panel 200A is mounted, the diffuser sheet 224 may serve to offset the pattern of the light guide plate 222.

After the light passes through the diffuser sheet 223, the luminance of the light is rapidly reduced. Therefore, the prism sheet 224 may be included in order to improve the luminance of the light by focusing the light again. The prism sheet 224 may include, for example, a horizontal prism sheet and a vertical prism sheet.

The backlight unit 200B according to the embodiment may include a configuration different from the above-described configuration in accordance with the technical change and development and/or the embodiment and the backlight unit 200B may further include an additional configuration other than the foregoing configuration. Further, in order to protect the optical configuration of the backlight unit 200B from external impacts and contamination, etc., due to the introduction of the foreign substance, the backlight unit 200B according to the embodiment may further include, for example, a protection sheet on the prism sheet 224. The backlight unit 200B may also further include a lamp cover in accordance with the embodiment so as to minimize the optical loss of the light source. The backlight unit 200B may further include a frame which maintains a shape enabling the light guide plate 222, the diffuser sheet 223, the prism sheet 224, a lamp (not illustrated), and the like, which are main components of the backlight unit 200B, to be exactly combined together in accordance with an allowed dimension. Further, the each of the configurations may be comprised of at least two separate parts.

According to the embodiment, an additional air gap may be positioned between the light guide plate 222 and the reflective sheet 221. As a result, the lost light from the light guide plate 222 to the reflective sheet 221 can be incident again on the light guide plate 222 by the reflective sheet 221. In this case, between the light guide plate 222 and the reflective sheet 221, for the purpose of maintaining the additional air gap, the double-sided adhesive tape (DAT) may be included on the edges of the light guide plate 222 and the reflective sheet 221.

As described above, the backlight unit 200B and the display module including the backlight unit 200B may be configured to include in itself the air gap such as the first air gap 210 and/or the second air gap 230. Alternatively, the air gap may be included between a plurality of layers included in the optical layer 220. Although the foregoing has described that the LCD panel 200A is used, the air gap may also be included within the structure of another display panel.

Figure 4C:
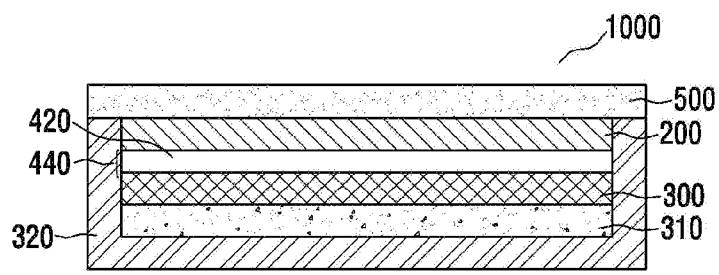
FIG. 4c is a cross-sectional view of a touch input device of a second example to which a pressure sensor and a pressure detection module according to an embodiment of the present invention can be applied.

FIG. 4c is a cross sectional view of the touch input device of a second example, to which the pressure sensor and pressure detection module according to the embodiment of the present invention may be applied. FIG. 4c illustrates a cross section of the touch input device 1000 that further includes a substrate 300 as well as the display module 200. In the touch input device 1000 according to the embodiment, the substrate 300, together with a second cover 320 which is an outermost device of the touch input device 1000, may function as, for example, a housing which surrounds a mounting space 310, etc., where the circuit board and/or battery for operation of the touch input device 1000 are located. In this case, on the circuit board for operation of the touch input device 1000 as a main board, a central processing unit (CPU), an application processor (AP), or the like may be mounted. Due to the substrate 300, the display module 200 is separated from the circuit board and/or battery for operation of the touch input device 1000 and due to the substrate 300, electrical noise generated from the display module 200 may be blocked. According to the embodiment, the substrate 300 may be referred to as a mid-frame in the touch input device 1000.

In the touch input device 1000, the cover layer 500 may be formed wider than the display module 200, the substrate 300, and the mounting space 310. As a result, the second cover 320 may be formed in such a manner as to surround the display module 200, the substrate 300, and the mounting space 310 where the circuit board is located. Further, according to the embodiment, the pressure sensor 440 may be included between the display module 200 and the substrate 300.

As in FIG. 4a, FIG. 4c does not separately illustrate the touch sensor panel 100, but the touch input device 1000 according to the embodiment may detect the touch position through the touch sensor panel 100. Further, according to the embodiment, at least a portion of the touch sensor may be included in the display panel 200A.

The pressure sensor 440 may be attached to the substrate 300, may be attached to the display module 200, or may be attached to the display module 200 and the substrate 300.

As illustrated in FIGS. 4a and 4c, since the pressure sensor 440 in the touch input device 1000 is disposed within the display module 200 or is disposed between the display module 200 and the substrate 300 and the electrodes 450 and 460 included in the pressure sensor 440 may be made of not only a transparent material but also an opaque material.

Hereinafter, in the touch input device 1000 according to the embodiment of the present invention, the principle and structure for detecting the magnitude of touch pressure by using the pressure sensor 440 will be described in detail. In FIGS. 5a to 5e, for convenience of description, the electrodes 450 and 460 included in the pressure sensor 440 are referred to as a pressure sensor.

Figure 5A:
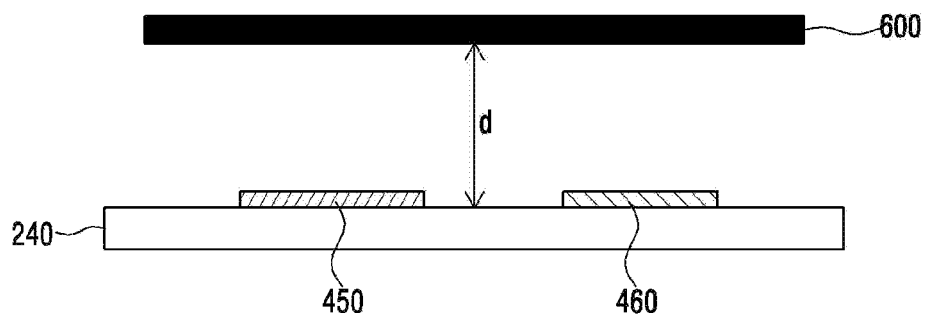
FIGS. 5a and 5b illustrate a relative distance between a pressure sensor of a first example and a reference potential layer included in the touch input device and a case in which pressure is applied thereto.
Figure 5B:
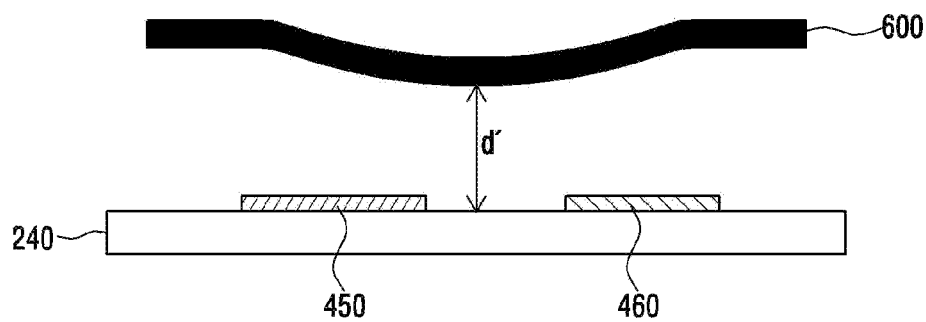

FIGS. 5a and 5b illustrate a relative distance between the reference potential layer and the pressure sensor of the first example, which are included in the touch input device, and illustrate a case where a pressure is applied to the touch input device. In the touch input device 1000 according to the embodiment, the pressure sensors 450 and 460 may be attached on the cover 240 which may constitute the backlight unit 200B. In the touch input device 1000, the pressure sensors 450 and 460 and the reference potential layer 600 may be spaced apart from each other by a distance "d".

In FIG. 5a, the reference potential layer 600 and the pressure sensor 450 and 460 may be spaced apart from each other with a spacer layer (not illustrated) placed therebetween. In this case, as described with reference to FIGS. 4a and 4b, the spacer layer may be the first air gap 210, the second air gap 230, and/or an additional air gap which are included in the manufacture of the display module 200 and/or the backlight unit 200B. When the display module 200 and/or the backlight unit 200A include one air gap, the one air gap is able to perform the function of the spacer layer. When the display module 200 and/or the backlight unit 200A include a plurality of air gaps, the plurality of air gaps may collectively perform the function of the spacer layer.

In the touch input device 1000 according to the embodiment, the spacer layer may be located between the reference potential layer 600 and the pressure sensors 450 and 460. As a result, when a pressure is applied to the cover layer 500, the reference potential layer 600 is bent, so that a relative distance between the reference potential layer 600 and the pressure sensors 450 and 460 may be reduced. The spacer layer may be implemented by the air gap. According to the embodiment, the spacer layer may be made of an impact absorbing material. Here, the impact absorbing material may include sponge and a graphite layer. The spacer layer may be filled with a dielectric material in accordance with the embodiment. The spacer layer may be formed through a combination of the air gap, the impact absorbing material, and the dielectric material.

In the touch input device 1000 according to the embodiment, the display module 200 may be bent or pressed by the touch applying the pressure. The display module may be bent or pressed in such a manner as to show the biggest transformation at the touch position. When the display module is bent or pressed according to the embodiment, a position showing the biggest transformation may not match the touch position, but the display module may be shown to be bent or pressed at least at the touch position. For example, when the touch position approaches the border, edge, etc., of the display module, the most bent or pressed position of the display module may not match the touch position. The border or edge of the display module may not be shown to be bent very little depending on the touch.

In this case, since the display module 200 in the touch input device 1000 according to the embodiment of the present invention may be bent or pressed by the application of the pressure, the components (a double-sided adhesive tape, an adhesive tape 430, the supports 251 and 252, etc.) which are disposed at the border in order to maintain the air gaps 210 and 310 and/or the spacer layer 420 may be made of an inelastic material. That is, even though the components which are disposed at the border in order to maintain the air gaps 210 and 310 and/or the spacer layer 420 are not compressed or pressed, the touch pressure can be detected by the bending, etc., of the display module 200.

When the cover layer 500, the display panel 200A, and/or the back light unit 200B are bent or pressed at the time of touching the touch input device 1000 according to the embodiment, the cover 240 positioned below the spacer layer, as shown in FIG. 4b, may be less bent or pressed due to the spacer layer. While FIG. 5b illustrates that the cover 240 is not bent or pressed at all, this is just an example and the lowest portion of the cover 240 to which the pressure sensors 450 and 460 have been attached may be bent or pressed, but the degree to which the lowest portion of the cover 240 is bent or pressed may be reduced by the spacer layer.

According to the embodiment, the spacer layer may be implemented as the air gap. The spacer layer may be made of an impact absorbing material in accordance with the embodiment. The spacer layer may be filled with a dielectric material in accordance with the embodiment.

FIG. 5b shows that a pressure is applied to the structure of FIG. 5a. For example, when the external pressure is applied to the cover layer 500 shown in FIG. 4a, it can be seen that a relative distance between the reference potential layer 600 and the pressure sensors 450 and 460 is reduced from "d" to "d'". Accordingly, in the touch input device 1000 according to the embodiment, when the external pressure is applied, the reference potential layer 600 is configured to be more bent than the cover 240 to which the pressure sensors 450 and 460 have been attached, so that it is possible to detect the magnitude of touch pressure.

FIGS. 4a, 5a, and 5b illustrate that a first electrode 450 and a second electrode 460 are included as the pressure sensors 450 and 460 for detecting the pressure. In this case, the mutual capacitance may be generated between the first electrode 450 and the second electrode 460. In this case, any one of the first and the second electrodes 450 and 460 may be a drive electrode and the other may be a receiving electrode. A driving signal is applied to the drive electrode, and a sensing signal may be obtained through the receiving electrode. When voltage is applied, the mutual capacitance may be generated between the first electrode 450 and the second electrode 460.

The reference potential layer 600 may have any potential which causes the change of the mutual capacitance generated between the first electrode 450 and the second electrode 460. For instance, the reference potential layer 600 may be a ground layer having a ground potential. The reference potential layer 600 may be any ground layer which is included in the display module. According to the embodiment, the reference potential layer 600 may be a ground potential layer which is included in itself during the manufacture of the touch input device 1000. For example, in the display panel 200A shown in FIGS. 2a to 2c, an electrode (not shown) for blocking noise may be included between the first polarizer layer 271 and the first substrate 261. This electrode for blocking the noise may be composed of ITO and may function as the ground. Further, according to the embodiment, a plurality of the common electrodes included in the display panel 200A constitutes the reference potential layer 600. Here, the potential of the common electrode may be a reference potential.

When a pressure is applied to the cover layer 500 by means of an object in touch, at least a portion of the cover layer 500, the display panel 200A, and/or the backlight unit 200B is bent, so that a relative distance between the reference potential layer 600 and the first and second electrodes 450 and 460 may be reduced from "d" to "d'". In this case, the smaller the distance between the reference potential layer 600 and the first and second electrodes 450 and 460 is, the smaller the value of the mutual capacitance between the first electrode 450 and the second electrode 460 may be. This is because the distance between the reference potential layer 600 and the first and second electrodes 450 and 460 is reduced from "d" to "d'", so that a fringing capacitance of the mutual capacitance is absorbed in the reference potential layer 600 as well as in the object. When the touch object is a nonconductive object, the change of the mutual capacitance is simply caused by only the change of the distance "d-d'" between the reference potential layer 600 and the electrodes 450 and 460.

Hereinabove, it has been described that the pressure sensor 440 includes the first electrode 450 and the second electrode 460 and the pressure is detected by the change of the mutual capacitance between the first electrode 450 and the second electrode 460. The pressure sensor 440 may be configured to include only any one of the first electrode 450 and the second electrode 460 (for example, the first electrode 450).

Figure 5C:
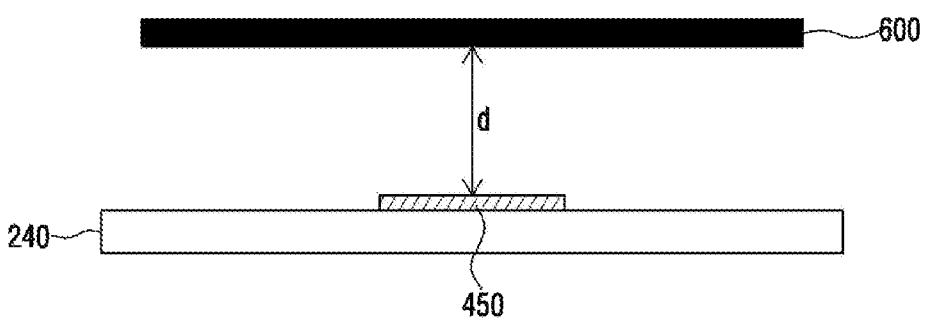
FIGS. 5c and 5d illustrate a relative distance between a pressure sensor of a second example and a reference potential layer included in the touch input device and a case in which pressure is applied thereto.
Figure 5D:
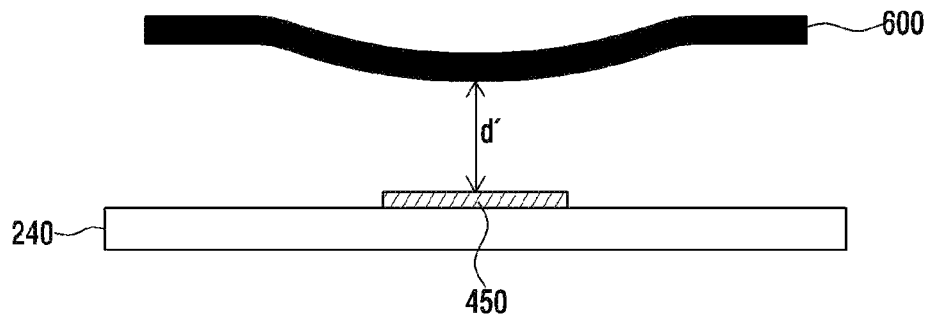

FIGS. 5c and 5d illustrate a relative distance between a reference potential layer and a pressure sensor of a second example which are included in the touch input device, and illustrate that a pressure is applied to the touch input device. In this case, it is possible to detect the magnitude of touch pressure by detecting the self-capacitance between the first electrode 450 and the reference potential layer 600. In this case, the change of the self-capacitance between the first electrode 450 and the reference potential layer 600 is detected by applying the driving signal to the first electrode 450 and by receiving the reception signal from the first electrode 450, so that the magnitude of the touch pressure is detected.

For example, the magnitude of the touch pressure may be detected by the change of the capacitance between the first electrode 450 and the reference potential layer 600, which is caused by the distance change between the reference potential layer 600 and the first electrode 450. Since the distance "d" is reduced with the increase of the touch pressure, the capacitance between the reference potential layer 600 and the first electrode 450 may be increased with the increase of the touch pressure.

FIGS. 4a and 5a to 5d illustrate that the first electrode 450 and/or the second electrode 460 are relatively thick and the first electrode 450 and the second electrode 460 are directly attached to the cover 240, but this is just only for convenience of description. According to the embodiment, the first electrode 450 and/or the second electrode 460 which are/is the integral sheet-type pressure sensor 440 may be attached to the cover 240 and may have a relatively small thickness.

Although it has been described that the pressure sensor 440 is attached to the cover 240 by referencing the touch input device 1000 illustrated in FIG. 4a, the pressure sensor 440 may be disposed between the display module 200 and the substrate 300 in the touch input device 1000 illustrated in FIG. 4c. According to the embodiment, the pressure sensor 440 may be attached under the display module 200 and in this case, the reference potential layer 600 may be any potential layer which is disposed on the substrate 300 or within the display module 200. Further, according to the embodiment, the pressure sensor 440 may be attached to the substrate 300 and in this case, the reference potential layer 600 may be any potential layer which is disposed on or within the display module 200.

Figure 5E:
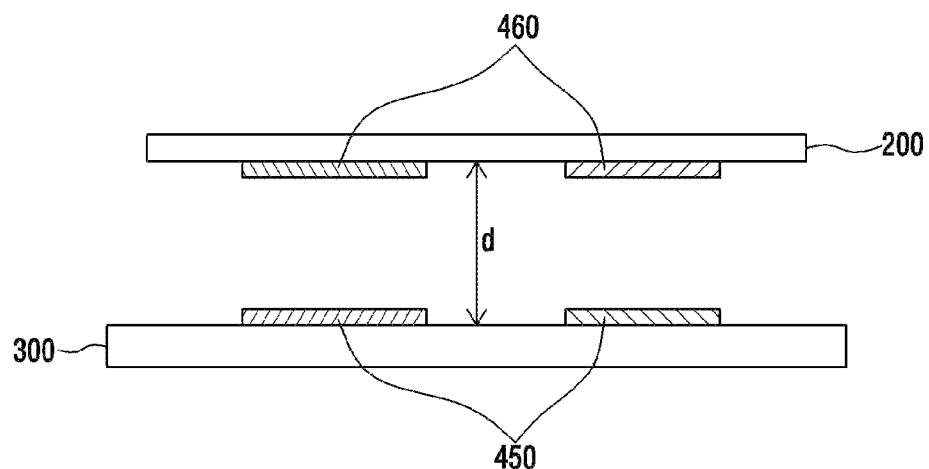
FIG. 5e illustrates the arrangement of a pressure sensor of a third example included in the touch input device.

FIG. 5e illustrates the arrangement of pressure sensors of a third example which is included in the touch input device. As illustrated in FIG. 5e, the first electrode 450 may be disposed on the substrate 300, and the second electrode 460 may be disposed under the display module 200. In this case, a separate reference potential layer may not be required. When a pressure touch is performed on the touch input device 1000, a distance between the display module 200 and the substrate 300 may be changed, and thus, the mutual capacitance between the first electrode 450 and the second electrode 460 may be increased. Through the capacitance change, the magnitude of the touch pressure may be detected. In this case, the first electrode 450 and the second electrode 460 may be manufactured to be included in the first pressure sensor 440-1 and the second pressure sensor 440-2 respectively and attached to the touch input device 1000.

Hereinabove, it has been described that the reference potential layer 600 is located to be spaced apart from the components to which the pressure sensor 440 is attached in the touch input device 1000. It will be described with reference to FIGS. 6a to 6c that the component itself to which the pressure sensor 440 is attached in the touch input device 1000 functions as the reference potential layer.

Figure 6A:
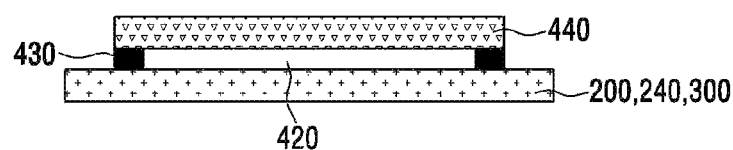
FIG. 6a is a cross-sectional view of a portion of a touch input device in which a pressure sensor is attached to the touch input device according to a first method.

FIG. 6a is a cross sectional view of a portion of the touch input device to which the pressure sensor 440 is attached according to a first method. FIG. 6a illustrates that the pressure sensor 440 is attached on the substrate 300, the display module 200, or the cover 240.

Figure 6B:
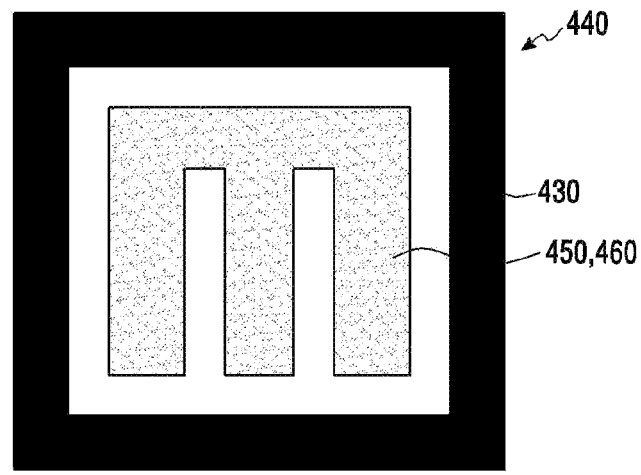
FIG. 6b is a plan view of a pressure sensor for attaching the pressure sensor to the touch input device according to the first method.

As illustrated in FIG. 6b, the adhesive tape 430 having a predetermined thickness may be formed along the border of the pressure sensor 440 so as to maintain the spacer layer 420. Though FIG. 6b illustrates that the adhesive tape 430 is formed along the entire border (for example, four sides of a quadrangle) of the pressure sensor 440, the adhesive tape 430 may be formed only on a portion (for example, three sides of a quadrangle) of the border of the pressure sensor 440. In this case, as illustrated in FIG. 6b, the adhesive tape 430 may not be formed on an area including the electrodes 450 and 460. As a result, when the pressure sensor 440 is attached to the substrate 300 or the display module 200 through the adhesive tape 430, the pressure electrodes 450 and 460 may be spaced apart from the substrate 300 or the display module 200 at a predetermined distance. According to the embodiment, the adhesive tape 430 may be formed on the top surface of the substrate 300, the bottom surface of the display module 200, or the surface of the cover 240. Further, the adhesive tape 430 may be a double-sided adhesive tape. FIG. 6b illustrates only one of the pressure electrodes 450 and 460.

Figure 6C:
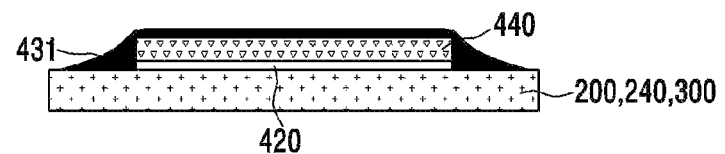
FIG. 6c is a cross-sectional view of a portion of a touch input device in which a pressure sensor is attached to the touch input device according to a second method.

FIG. 6c is a partial cross sectional view of the touch input device to which the pressure sensor is attached according to a second method. In FIG. 6c, after the pressure sensor 440 is placed on the substrate 300, the display module 200, or the cover 240, the pressure sensor 440 may be fixed to the substrate 300, the display module 200, or the cover 240 by means of the adhesive tape 430. To this end, the adhesive tape 431 may come in contact with at least a portion of the pressure sensor 440 and at least a portion of the substrate 300, the display module 200, or the cover 240. FIG. 6c illustrates that the adhesive tape 431 continues from the top of the pressure sensor 440 to the exposed surface of the substrate 300, the display module 200, or the cover 240. In this case, only a side of the adhesive tape 430, which contacts with the pressure sensor 440, may have adhesive strength. Therefore, in FIG. 6c, the top surface of the adhesive tape 430 may not have the adhesive strength.

As illustrated in FIG. 6c, even if the pressure sensor 440 is fixed to the substrate 300, the display module 200, or the cover 240 by using the adhesive tape 431, a predetermined space, i.e., air gap may be created between the pressure sensor 440 and the substrate 300, the display module 200, or the cover 240. This is because the substrate 300, the display module 200, or the cover 240 is not directly attached to the pressure sensor 440 by means of the adhesive and the pressure sensor 440 includes the pressure electrodes 450 and 460 having a pattern, so that the surface of the pressure sensor 440 may not be flat. The air gap of FIG. 6c may also function as the spacer layer 420 for detecting the touch pressure.

Figure 7A:
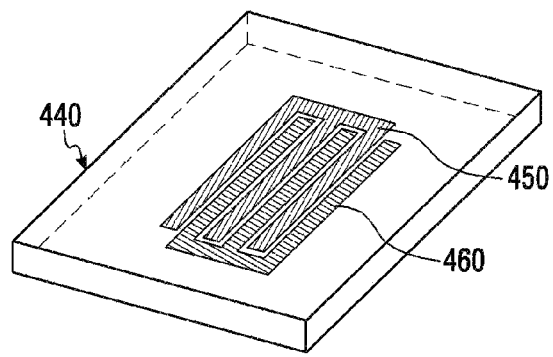
FIG. 7a to FIG. 7e illustrate a pressure electrode pattern included in a pressure sensor for pressure detection according to an embodiment of the present invention.
Figure 7B:
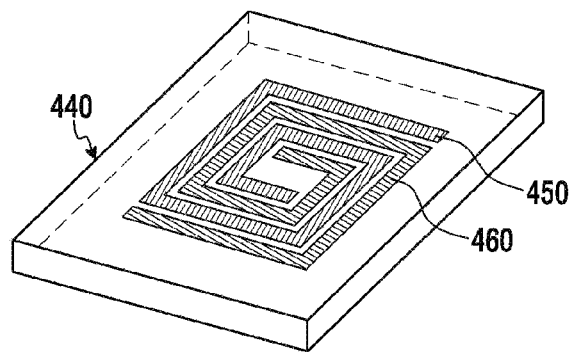
Figure 7C:
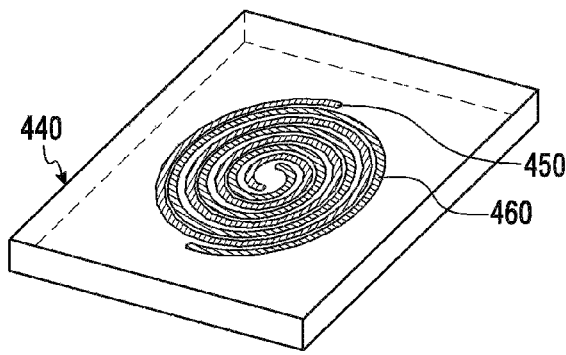

FIGS. 7a to 7e illustrate pressure electrode patterns included in the pressure sensor for pressure detection according to the embodiment of the present invention. FIGS. 7a to 7c illustrate the patterns of the first electrode 450 and the second electrode 460 included in the pressure sensor 440. The pressure sensor 440 including the pressure electrode patterns shown in FIGS. 7a to 7c may be formed on the cover 240 and the substrate 300 or in the bottom surface of the display module 200. The capacitance between the first electrode 450 and the second electrode 460 may be changed depending on a distance between the reference potential layer 600 and the electrode layer including both the first electrode 450 and the second electrode 460.

When the magnitude of the touch pressure is detected as the mutual capacitance between the first electrode 450 and the second electrode 460 is changed, it is necessary to form the patterns of the first electrode 450 and the second electrode 460 so as to generate the range of the capacitance required to improve the detection accuracy. With the increase of a facing area or facing length of the first electrode 450 and the second electrode 460, the size of the capacitance that is generated may become larger. Therefore, the pattern can be designed by adjusting the size of the facing area, facing length and facing shape of the first electrode 450 and the second electrode 460 in accordance with the range of the necessary capacitance. FIGS. 7a to 7c illustrate that the first electrode 450 and the second electrode 460 are formed in the same layer, and show that the pressure electrode is formed such that the facing length of the first electrode 450 and the second electrode 460 becomes relatively longer. The patterns of the pressure electrodes 450 and 460 illustrated in FIGS. 7a to 7c can be used to detect the pressure in the principle described in FIGS. 5a and 5b.

Figure 7D:
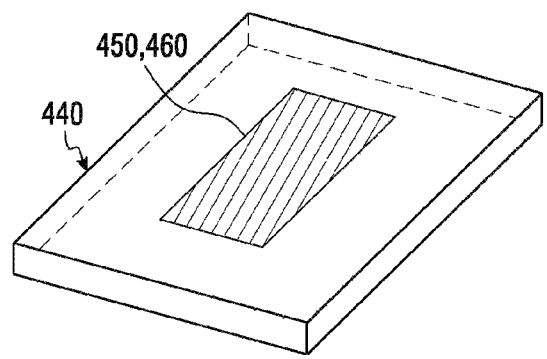

The electrode pattern illustrated in FIG. 7d can be used to detect the pressure in the principle described in FIGS. 5c and 5d. In this case, the pressure electrode need not have a comb teeth shape or a trident shape, which is required to improve the detection accuracy of the mutual capacitance change amount and the pressure electrode may have, as illustrated in FIG. 7d, a plate shape (e.g., quadrangular plate).

Figure 7E:
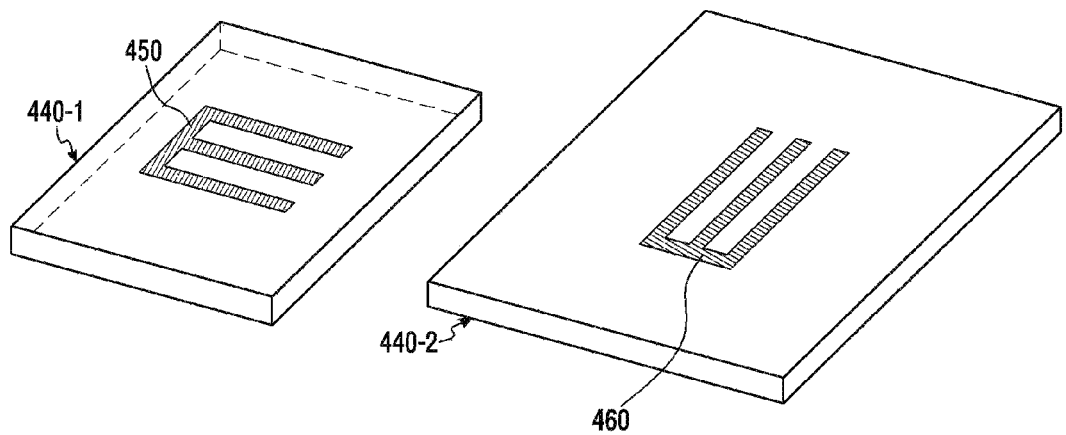

The electrode pattern illustrated in FIG. 7e may be used to detect the pressure in the principle described in FIG. 5e. In this case, as illustrated in FIG. 7e, the first electrode 450 and the second electrode 460 are disposed orthogonal to each other, so that the capacitance change amount detection sensitivity may be enhanced.

Figure 8A:
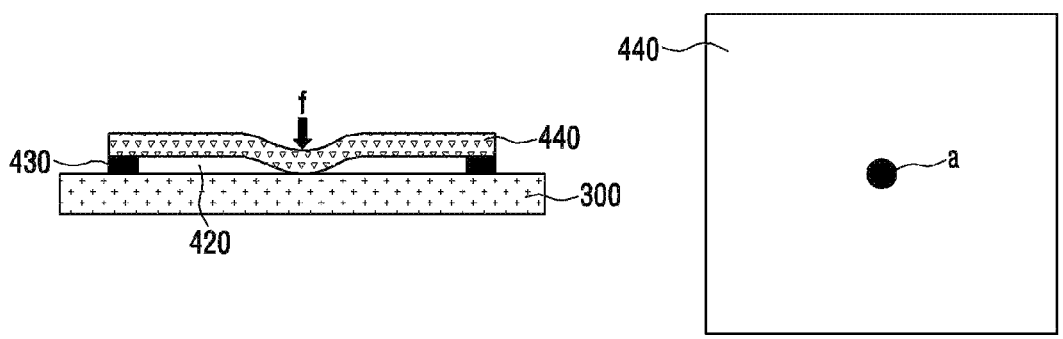
FIG. 8a and FIG. 8b illustrate a relationship between a magnitude of a touch pressure and a saturation area in a touch input device to which a pressure sensor is applied according to an exemplary embodiment of the present invention.
Figure 8B:
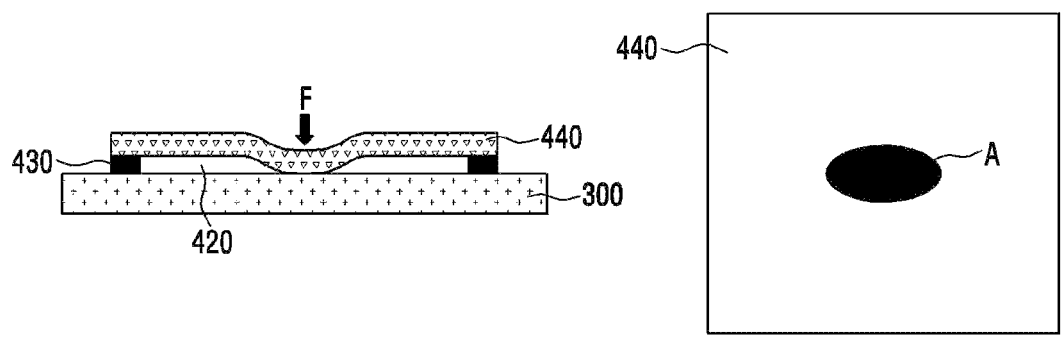

FIGS. 8a and 8b illustrate a relation between a magnitude of a touch pressure and a saturated area in the touch input device to which the pressure sensor 440 is applied according to the present invention. Although FIGS. 8a and 8b illustrate that the pressure sensor 440 is attached to the substrate 300, the following description may be applied in the same manner to a case where the pressure sensor 440 is formed in the display module 200 or attached to or directly formed in the display module 200, the cover 240, or FPCB.

The touch pressure with a sufficient magnitude may make a state where the distance between the pressure sensor 440 and the substrate 300 may not be reduced any more at a predetermined position. Hereafter, the state is referred to as a 'saturation state'. For instance, as illustrated in FIG. 8a, when the touch input device 1000 is pressed by a force "f", the pressure sensor 440 contacts the substrate 300, and thus, the distance between the pressure sensor 440 and the substrate 300 may not be reduced any more. In this case, as shown on the right of FIG. 8a, the contact area between the pressure sensor 440 and the substrate 300 may be indicated by "a".

However, even in this case, when the magnitude of the touch pressure becomes larger, the contact area between the pressure sensor 440 and the substrate 300 in the saturation state where the distance between the pressure sensor 440 and the substrate 300 is not reduced any more may become greater. For example, as illustrated in FIG. 8b, when the touch input device 1000 is pressed by a force "F" greater than the force "f", the contact area between the pressure sensor 440 and the substrate 300 may become greater. As shown on the right of FIG. 8b, the contact area between the pressure sensor 440 and the substrate 300 may be indicated by "A". The greater the contact area, the more the mutual capacitance between the first electrode 450 and the second electrode 460 may be reduced. Hereafter, it will be described that the magnitude of the touch pressure is calculated by the change of the capacitance according to the distance change, but this case may include that the magnitude of the touch pressure is calculated by the change of the saturation area in the saturation state.

FIGS. 8a and 8b are described with reference to the example illustrated in FIG. 6a, but it is apparent that the description with reference to FIGS. 8a and 8b may be applied in the same manner to other examples, for example, the examples described with reference to FIGS. 4a, 4c, 5a to 5e, and 6c. More specifically, the magnitude of the touch pressure can be calculated by the change of the saturation area in the saturation state where the distance between the pressure sensor 440 and either the ground layer or the reference potential layer 600 cannot be reduced any more. The top surface of the substrate 300 may also have the ground potential in order to block the noise.

Figure 9:
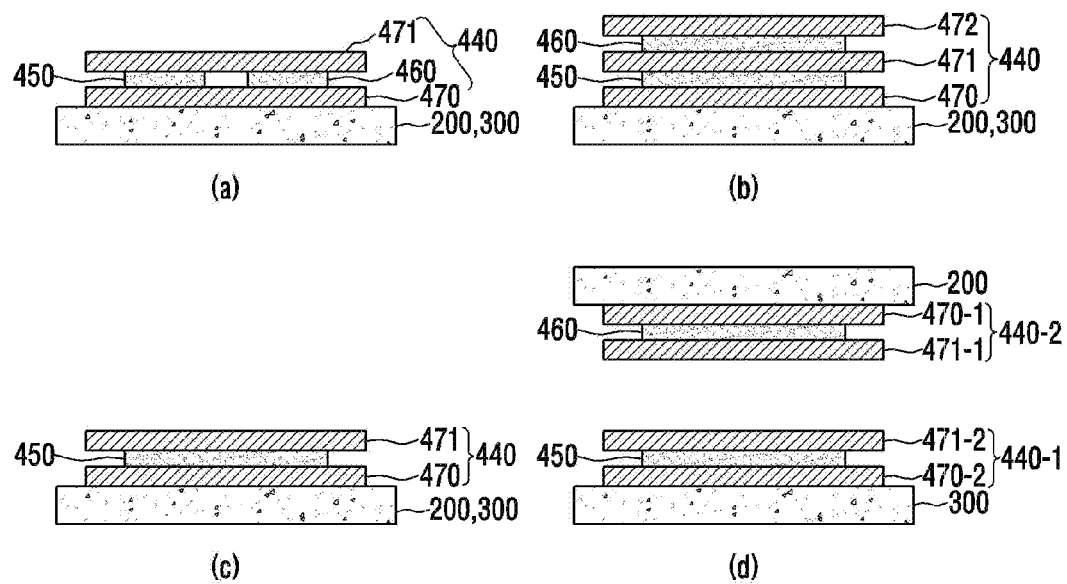
FIG. 9 illustrates a cross-section of a pressure sensor according to some embodiments of the present invention.

FIG. 9 illustrates a partial cross section of the pressure sensor which is attached to the touch input device according to the embodiment of the present invention.

FIG. 9(a) illustrates a cross section when the pressure sensor 440 including the pressure electrodes 450 and 460 is attached to the substrate 300 or the display module 200. In the pressure sensor 440, since the pressure electrodes 450 and 460 are disposed between the first insulation layer 470 and the second insulation layer 471, a short-circuit may be prevented from occurring between the pressure electrodes 450 and 460 and either the substrate 300 or the display module 200. Further, depending on the kind and/or implementation method of the touch input device 1000, the substrate 300 or the display module 200 on which the pressure electrodes 450 and 460 are attached may not have the ground potential or may have a weak ground potential. In this case, the touch input device 1000 may further include a ground electrode (not illustrated) between the first insulation layer 470 and either the substrate 300 or the display module 200. According to the embodiment, another insulation layer (not illustrated) may be included between the ground electrode and either the substrate 300 or the display module 200. In this case, the ground electrode (not illustrated) is able to prevent the size of the capacitance generated between the first electrode 450 and the second electrode 460, which are pressure electrodes, from increasing excessively.

Figure 13A:
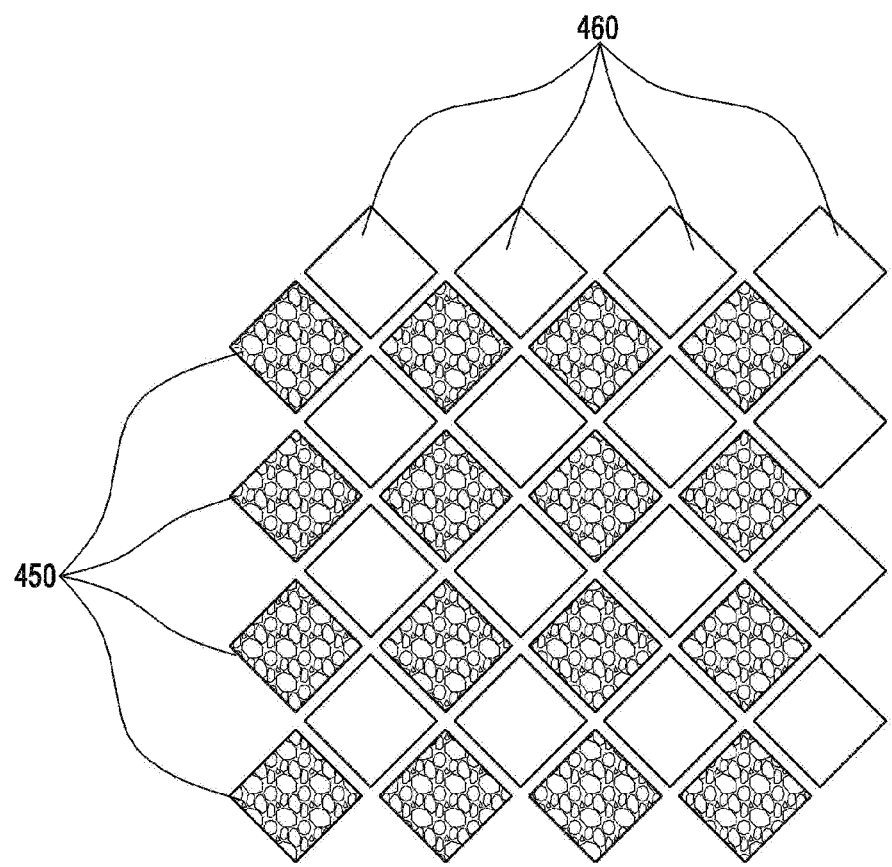
FIG. 13a to FIG. 13c illustrate the shapes of the first electrode and the second electrode included in the pressure sensor according to an embodiment of the present invention.

FIG. 9(a) illustrates that the first electrode 450 and the second electrode 460 included in the pressures sensor 440 are formed in the same layer. Each of the first electrode 450 and the second electrode 460 illustrated in FIG. 9(a) may be, as illustrated in FIG. 13a, composed of a plurality of lozenge-shaped electrodes. Here, the plurality of the first electrodes 450 are connected to each other in a first axial direction, and the plurality of the second electrodes 460 are connected to each other in a second axial direction orthogonal to the first axial direction and the plurality of lozenge-shaped electrodes of at least one of the first and the second electrodes 450 and 460 are connected to each other through a bridge, so that the first electrode 450 and the second electrode 460 may be insulated from each other. Further, the first electrode 450 and the second electrode 460 illustrated in FIG. 9(a) may be composed of an electrode having a form illustrated in FIG. 13b. According to the embodiment, the first electrode 450 and the second electrode 460 may be disposed in the display module 200.

The first electrode 450 and the second electrode 460 of the pressure sensor 440 may be implemented in different layers according to the embodiment and constitute the electrode layer. FIG. 9(b) illustrates a cross section when the first electrode 450 and the second electrode 460 are formed in different layers. As illustrated in FIG. 9(b), the first electrode 450 may be formed on the first insulation layer 470, and the second electrode 460 may be formed on the second insulation layer 471 positioned on the first electrode 450. According to the embodiment, the second electrode 460 may be covered with a third insulation layer 472. In other words, the pressure sensor 440 may include the first to the third insulation layers 470 to 472, the first electrode 450, and the second electrode 460. In this case, since the first electrode 450 and the second electrode 460 are disposed in different layers, the first electrode 450 and the second electrode 460 may be implemented so as to overlap each other. For example, the first electrode 450 and the second electrode 460 may be formed similarly to the pattern of the drive electrode TX and receiving electrode RX which are arranged in the form of M×N array as illustrated in FIG. 13c. In this case, M and N may be natural numbers of 1 or more. Alternatively, as illustrated in FIG. 13a, the lozenge-shaped first and the second electrodes 450 and 460 may be disposed in different layers, respectively.

Figure 12A:
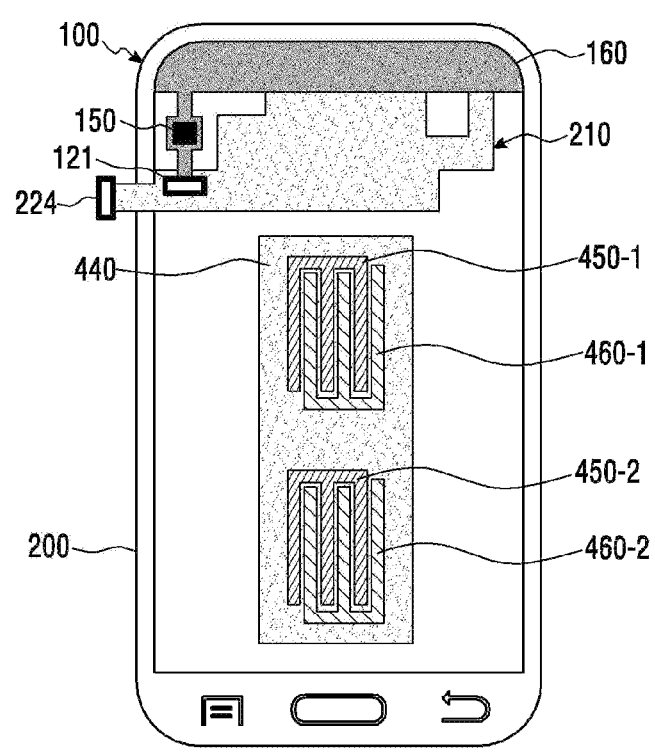
FIG. 12a to FIG. 12d illustrate a configuration in which a pressure sensor according to an embodiment of the present invention includes a plurality of channels.
Figure 12B:
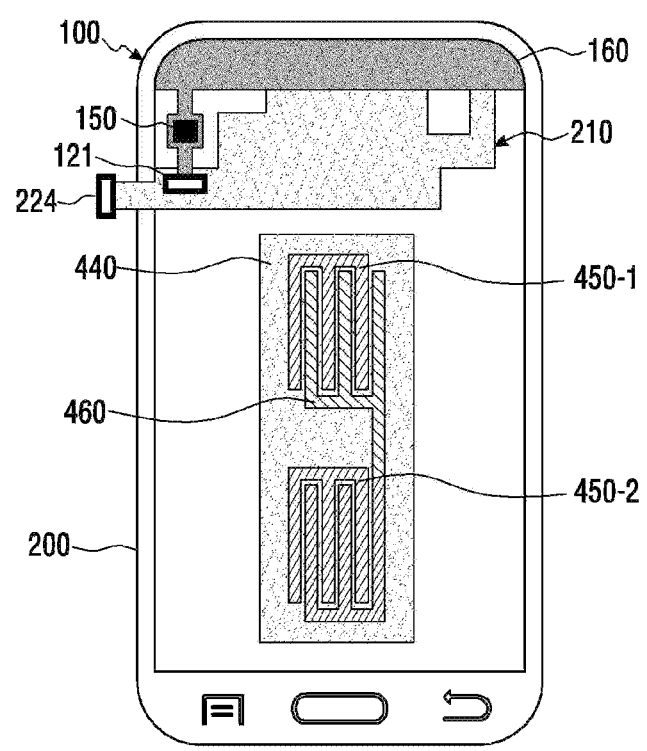
Figure 12C:
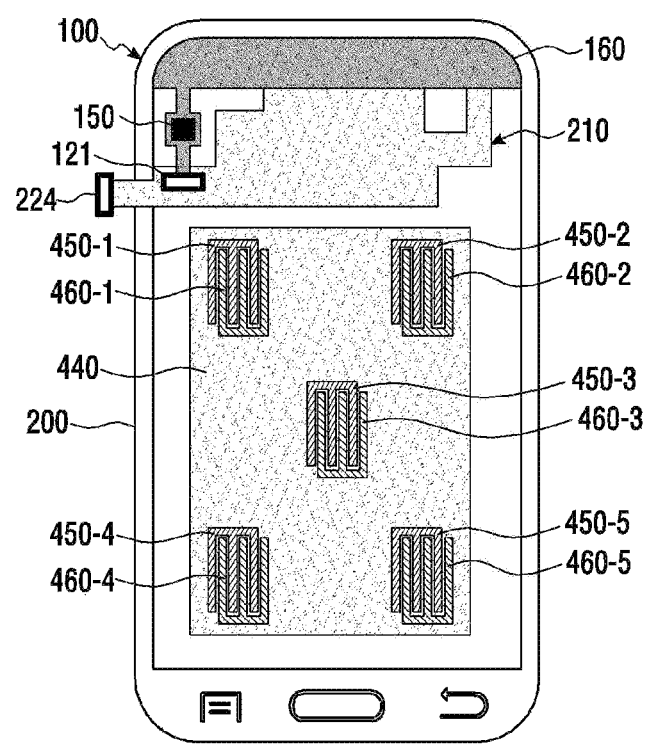
Figure 12D:
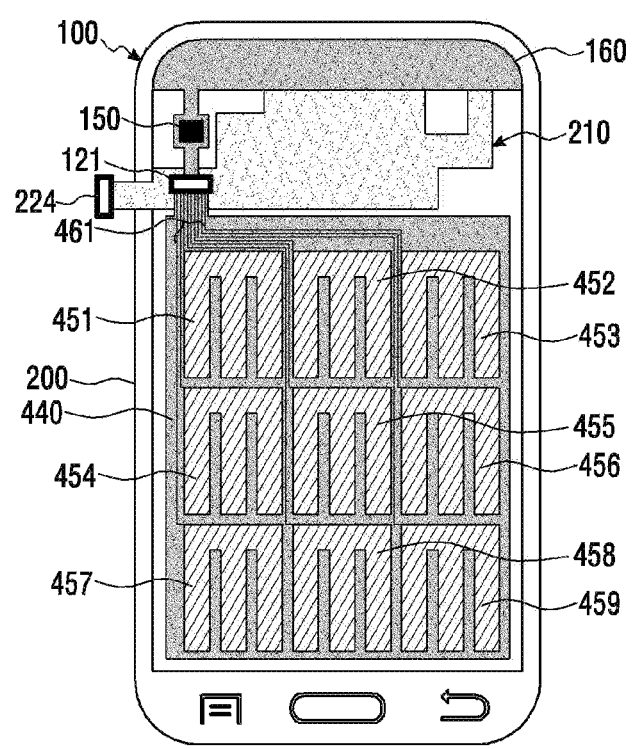

FIG. 9(c) illustrates a cross section when the pressure sensor 440 is formed to include only the first electrode 450. The pressure sensor 440 including the first electrode 450 may be disposed on the substrate 300 or on the display module 200. For example, the first electrode 450 may be disposed as illustrated in FIG. 12d. According to the embodiment, the first electrode 450 may be disposed in the display module 200.

FIG. 9(d) illustrates a cross section when the first pressure sensor 440-1 including the first electrode 450 is attached to the substrate 300 and the second pressure sensor 440-2 including the second electrode 460 is attached to the display module 200. The first pressure sensor 440-1 including the first electrode 450 may be disposed on the substrate 300. Further, the second pressure sensor 440-2 including the second electrode 460 may be disposed on the bottom surface of the display module 200. According to the embodiment, the second electrode 460 may be disposed in the display module 200.

When substrate 300, the display module 200, or the cover 240 on which the pressure sensors 450 and 460 are attached may not have the ground potential or may have a weak ground potential, the pressure sensor 440 may further include a ground electrode (not illustrated) under the first insulation layers 470, 470-1, and 470-2 disposed to contact the substrate 300, the display module 200, or the cover 240 in FIG. 9. In this case, the pressure sensor 440 may further include an additional insulation layer (not illustrated) which is positioned to face the first insulation layers 470, 470-1, and 470-2 with the ground electrode (not shown) interposed therebetween.

Hereinabove, a case where the touch pressure is applied to the top surface of the touch input device 1000 has been described, but even when the touch pressure 440 according to the embodiment of the present invention is applied to the bottom surface of the touch input device 1000, the pressure sensor 440 may detect the touch pressure in the same manner.

As illustrated in FIGS. 4 to 9, in the case where the pressure sensor 440 according to the present invention is attached to the touch input device, when a pressure is applied to the touch input device by the object 500, the display module 200 or the substrate 300 is bent or pressed, so that the magnitude of the touch pressure may be calculated. In this case, in order to describe the change of the distance between the reference potential layer 600 and the pressure sensor 440, FIGS. 4 to 9 illustrate that the display module 200, the substrate 300, or only a portion of the display module 200 to which the pressure is directly applied by the object 500 is bent or pressed, but the member to which the pressure is not directly applied by the object 500 is also actually bent or pressed together. However, since how much the member to which the pressure is directly applied is bent or pressed is more than how much the member to which the pressure is not directly applied is bent or pressed, the descriptions of FIGS. 4 to 9 are possible. As such, when the pressure is applied to the touch input device, the pressure sensor 440 attached to the touch input device may also be bent or pressed. In this case, when the pressure applied to the touch input device is released, the display module 200 or the substrate 300 is restored to its original state, and thus, the pressure sensor 440 attached to the touch input device should also be able to maintain an original shape thereof. Further, when the original shape of the pressure sensor 440 is difficult to maintain, there may be difficulties in the process of attaching the pressure sensor 440 to the touch input device. Therefore, it is recommended that the pressure sensor 440 has a rigidity to maintain its original shape.

When the pressure electrodes 450 and 460 included in the pressure sensor 440 are made of soft conductive metal such as Al, Ag, and Cu, the pressure electrodes 450 and 460 have a low rigidity and a thickness of only several micrometers and therefore, it is difficult to maintain the original shape of the pressure sensor 440 only by the pressure electrodes 450 and 460. Accordingly, it is recommended that the first insulation layer 470 or the second insulation layer 471 which is disposed on or under the pressure electrodes 450 and 460 has a rigidity enough to maintain the original shape of the pressure sensor 440.

Figure 3B:
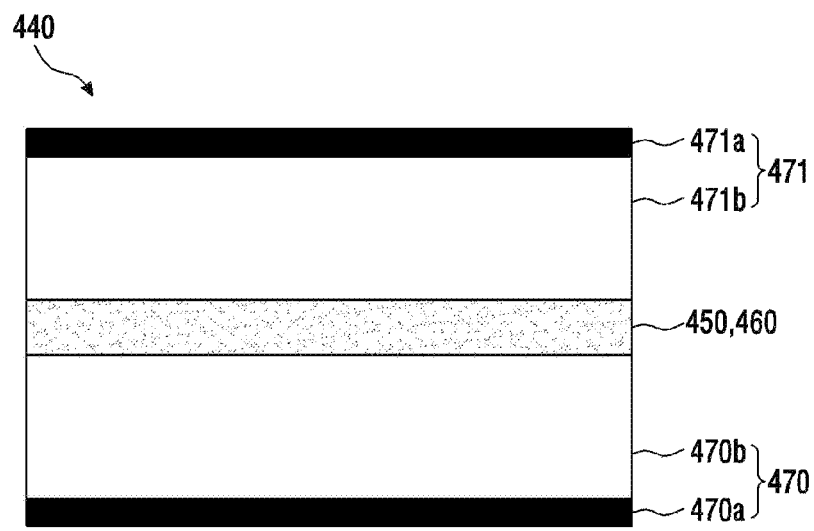

Specifically, as illustrated in FIG. 3b, the pressure sensor 440 according to the present invention may include the electrode layer and support layers 470b and 471b. In this case, the electrode layer may be constituted by the pressure electrodes 450 and 460 including the first electrode 450 and the second electrode 460. In this case, the pressure sensor 440 may be used to detect the change of the capacitance between the first electrode 450 and the second electrode 460, which is changed according to a relative distance change between the electrode layer and the reference potential layer 600 which is positioned apart from the pressure sensor 440. Further, the electrode layer may be constituted by the pressure electrodes 450 and 460 including only one electrode. In this case, the pressure sensor 440 may be used to detect the capacitance change between the electrode layer and the reference potential layer 600, which is changed according to the relative distance change between the electrode layer and the reference potential layer 600 which is disposed apart from the pressure sensor 440.

In this case, when the reference potential layer 600 which is disposed apart from the pressure sensor 440 does not have a uniform reference potential according to each input position, or when the distance change between the reference potential layer and the electrode layer is not uniform for the pressure having the same magnitude in accordance with the input position, for example, when the surface of the reference potential layer 600 which is disposed apart from the pressure sensor 440 is not uniform, it may be difficult to use the capacitance change amount between the electrode layer and the reference potential layer 600 which is disposed apart from the pressure sensor 440. As illustrated in FIG. 3h, the pressure sensor 440 according to the embodiment of the present invention may include a first electrode layer including the first electrode 450 and include a second electrode layer which includes the second electrode 460 and is disposed apart from the first electrode layer. In this case, the pressure sensor 440 may be used to detect the capacitance change between the first electrode layer and the second electrode layer, which is changed according to a relative distance change between the first electrode layer and the second electrode layer. Any one of the first electrode layer and the second electrode layer may be the reference potential layer. As such, the capacitance change between the electrode layers is detected, which is changed according to the distance change between the electrode layers located within the pressure sensor 440, so that it is possible to apply a uniform capacitance change even when, as described above, the uniform capacitance change may not be detected from the reference potential layer located outside the pressure sensor 440. An elastic layer 480 which has a restoring force and absorbs the impact may be further included between the first electrode layer and the second electrode layer in order to provide uniformity of the distance change between the first electrode layer and the second electrode layer. Further, as illustrated in FIG. 9(d), the pressure sensor 440 may include the first pressure sensor including the first electrode layer and a first support layer and the second pressure sensor including the second electrode layer and a second support layer. In this case, the pressure sensor 440 may be used to detect the capacitance change between the first electrode layer and the second electrode layer, which is changed according to the relative distance change between the first electrode layer and the second electrode layer.

The support layers 470b and 471b may be made of a material, for example, a resin material, highly rigid metal, paper, or the like, which has a rigidity capable of maintaining the shape of the pressure sensor 440 even when the distance change occurs between the pressure sensor 440 and the reference potential layer 600.

The pressure sensor 440 may further include the first insulation layer 470 and the second insulation layer 471. In this case, the electrode layer may be located between the first insulation layer 470 and the second insulation layer 471, and the support layers 470b and 471b may be included in at least any one of the first insulation layer 470 and the second insulation layer 471.

The first insulation layer 470 or the second insulation layer 471 may further include electrode covering layers 470a and 471a. The electrode covering layers 470a and 471a may function to insulate the electrode layer and may function to protect the electrode layer, for example, to prevent the electrode from being oxidized, scraped, cracked, or the like. Further, the electrode covering layers 470a and 471a are formed of or coated with a material with a color, thereby preventing the pressure sensor 440 from being degraded due to exposure to the sun during the distribution of the pressure sensor 440. In this case, the electrode covering layers 470a and 471a may be adhered to the electrode layer or to the support layers 470b and 471b by means of an adhesive or may be printed or coated on the electrode layer or the support layers 470b and 471b. The electrode covering layers 470a and 471a may be also made of a highly rigid resin material, but since the thickness of the electrode covering layer is only several micrometers, it is difficult to maintain the original shape of the pressure sensor 440 of about 100 μm.

Figure 3C:
Figure 3D:
Figure 3E:
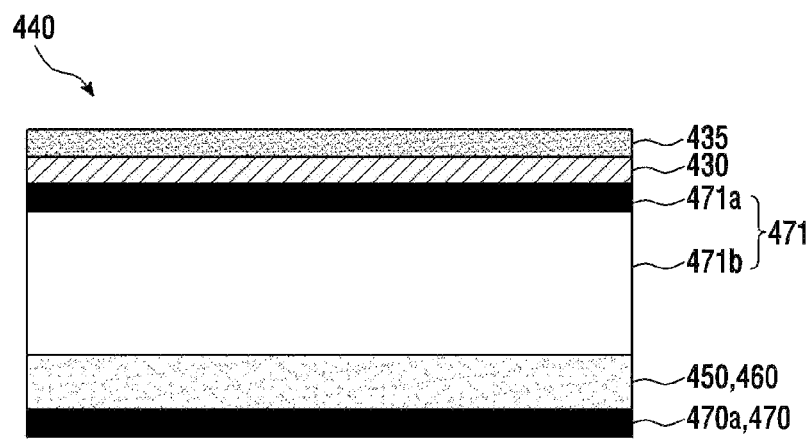
Figure 3F:
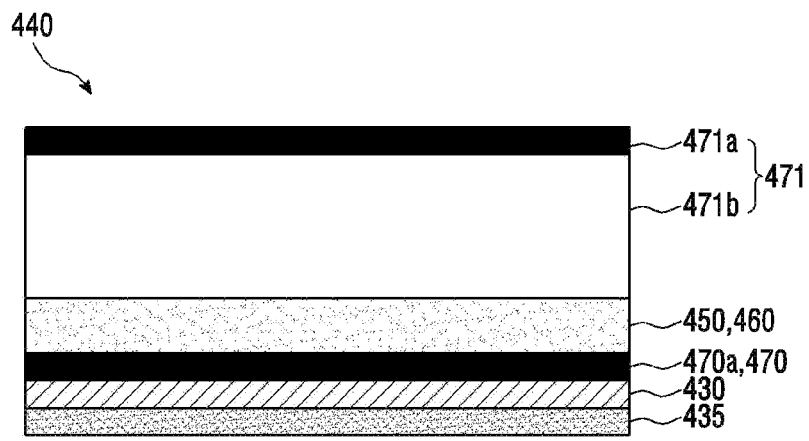

Further, as illustrated in FIGS. 3e and 3f, the pressure sensor 440 according to the present invention may further include the adhesive layer 430 and a protective layer 435 outside either the first insulation layer 470 or the second insulation layer 471. Though it has been described in FIGS. 4 to 9 that the adhesive layer 430 is formed separately from the pressure sensor 440, the adhesive layer 430 may be manufactured as one component included in the pressure sensor 440. The protective layer 435 functions to protect the adhesive layer 430 before the pressure sensor 440 is attached to the touch input device and when the pressure sensor 440 is attached to the touch input device, the protective layer 435 is removed and the pressure sensor 440 may be attached to the touch input device by using the adhesive layer 430.

As illustrated in FIG. 3c, the electrode covering layers 470a and 471a may not be formed on the side where the support layers 470b and 471b are formed. The support layers 470b and 471b made of a resin material, paper, or the like may insulate and protect the electrode layer. In this case, likewise, the support layers 470b and 471b may be formed of or coated with a material with a color.

Figure 3I:
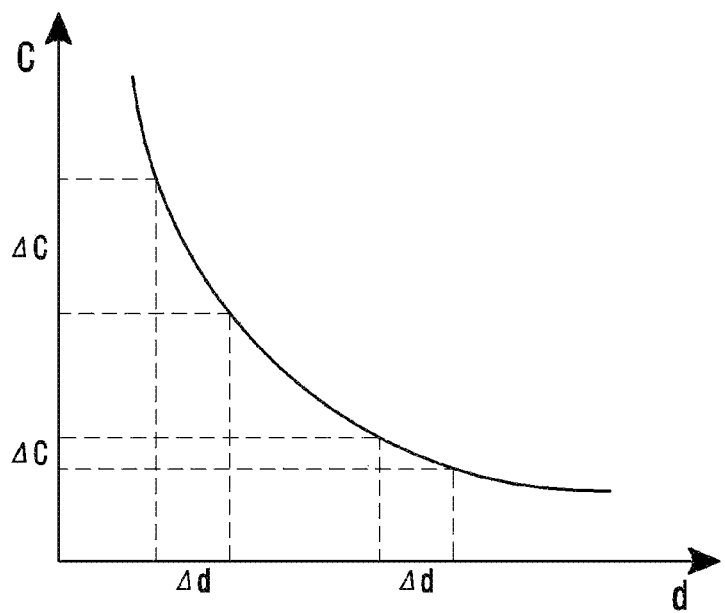
FIG. 3i is a diagram illustrating a change in capacitance according to a change in distance between an electrode layer and a reference potential layer according to an embodiment of the present invention.

As illustrated in FIG. 3d, any one of the first insulation layer 470 and the second insulation layer 471 may have a thickness smaller than that of the other. Specifically, since the capacitance (C) is inversely proportional to the distance "d" between the electrode layer and the reference potential layer 600, FIG. 3i shows that, for the same distance change, the smaller the distance between the electrode layer and the reference potential layer 600 is, the greater the capacitance change amount becomes, and then it becomes easier to precisely detect the pressure. Therefore, the pressure sensor 440 is attached to the touch input device including the cover 240, the substrate 300 and/or the display module 200, and the thickness of one of the first and second insulation layers 470 and 471, which is closer to the reference potential layer 600 than the other, may be smaller than that of the other which is further from the reference potential layer 600 than the one.

Preferably, only one of the first and second insulation layers 470 and 471 may include the support layers 470b and 471b. Specifically, in the state where the pressure sensor 440 is attached to the touch input device, only one of the first and second insulation layers 470 and 471, which is farther from the reference potential layer 600 than the other, may include the support layers 470b and 471b.

Likewise, as illustrated in FIG. 9(d), when the first pressure sensor 440-1 is attached to the substrate 300 and the second pressure sensor 440-2 is attached to the display module 200, the thickness of the second insulation layer 471-1 which is closer to the second electrode 460 between the first and the second insulation layers 470-1 and 471-1 may be smaller than the thickness of the first insulation layer 470-1, the thickness of the fourth insulation layer 471-2 which is closer to the first electrode 450 between the third and the fourth insulation layers 470-2 and 471-2 may be less than the thickness of the third insulation layer 470-2. Preferably, only the first and the third insulation layers 470-1 and 470-2 may include the support layer 470b.

As illustrated in FIG. 3h, even when the pressure sensor 440 includes the first electrode layer including the first electrode 450 and includes the second electrode layer which includes the second electrode 460 and is disposed apart from the first electrode layer, the thickness of any one of the first insulation layer 470 and the second insulation layer 471 may be less than that of the other. Specifically, in a case where the pressure sensor 440 is attached to the display module 200 or the substrate 300, when a pressure is applied to the touch input device, a distance between the pressure sensor 440 and the member to which the pressure sensor 440 has been attached is not changed, but a distance between the pressure sensor 440 and the member to which the pressure sensor 440 has not been attached is changed. In this case, since the capacitance change according to the distance change between the pressure sensor 440 and the reference potential layer 600 located outside the pressure sensor 440 is not desired, it is preferable to minimize such a capacitance change. Therefore, in a state where the pressure sensor 440 is attached to the touch input device including the substrate 300 and the display module 200, but the pressure sensor 440 is attached to any one of a side of the substrate 300, which is opposite to the display module 200 and a side of the display module 200, which is opposite to the substrate 300 and the pressure sensor 440 is attached to the touch input device, the thickness of one of the first and second insulation layers 470 and 471, which is closer to the side to which the pressure sensor 440 has been attached than the other, may be less than that of the other which is further from a side to which the pressure sensor 440 is attached than the one.

Preferably, only one of the first and second insulation layers 470 and 471 may include the support layers 470*b* and 471*b*. Specifically, in the state where the pressure sensor 440 is attached to the touch input device, only one of the first and second insulation layers 470 and 471, which is farther from the side to which the pressure sensor 440 is attached than the other, may include the support layers 470*b* and 471*b*.

The pressure sensor 440 illustrated in FIG. 3*e* is attached to the cover 240, the substrate 300 or the display module 200 toward the side on which the adhesive layer 430 is formed, the pressure sensor 440 illustrated in FIG. 3*e* is used to detect the magnitude of the pressure according to the distance change between the electrode layer and the reference potential layer 600 formed in or on the member to which the pressure sensor 440 is not attached, the pressure sensor 440 illustrated in FIG. 3*f* is attached to the cover 240, the substrate 300 or the display module 200 toward the side on which the adhesive layer 430 is formed, and the pressure sensor 440 illustrated in FIG. 3*f* is used to detect the magnitude of the pressure according to the distance change between the electrode layer and the reference potential layer 600 formed on the member to which the pressure sensor 440 is attached.

A space in which the pressure sensor 440 is disposed, for example, an interval between the display module 200 and the substrate 300 depends on the touch input device, but is about 100 to 500 µm, and as a result, the thicknesses of the pressure sensor 440 and the support layers 470*b* and 471*b* are limited according to the interval. As illustrated in FIG. 3*g*, when the pressure sensor is attached to the display module 200 and a distance between the display module 200 and the substrate 300 is 500 µm, it is desirable that the pressure sensor 440 has a thickness of 50 µm to 450 µm. If the thickness of the pressure sensor 440 is less than 50 µm, the thickness of the support layers 470*b* and 471*b* having a relatively high rigidity also becomes smaller, so that the original shape of the pressure sensor 440 is difficult to maintain. If the thickness of the pressure sensor 440 is larger than 450 µm, an interval between the pressure sensor 440 and the substrate 300, i.e., the reference potential layer, is significantly small as 50 µm or less, so that it is difficult to measure the pressure with a wide range.

The pressure sensor 440 is disposed in the touch input device. Therefore, as with the touch input device, the pressure sensor 440 is required to meet a given reliability under a predetermined condition, for example, temperature, humidity, etc. In order to meet the reliability that the appearance and characteristics are less changed under a harsh condition of 85 to −40° C., a humidity condition of 85%, etc., it is desirable that the support layers 470*b* and 471*b* are made of a resin material. Specifically, the support layers 470*b* and 471*b* may be formed of polyimide (PI) or polyethylene terephthalate (PET). Further, polyethylene terephthalate costs less than polyimide. The material of the support layers 470*b* and 471*b* may be determined in terms of cost and reliability.

As described above, in order to detect the pressure through the touch input device 1000 to which the pressure sensor 440 is applied according to the embodiment of the present invention, it is necessary to sense the capacitance change occurring in the pressure electrodes 450 and 460. Therefore, it is necessary to apply the driving signal to the drive electrode out of the first and second electrodes 450 and 460, and it is required to detect the touch pressure by the capacitance change amount by obtaining the sensing signal from the receiving electrode. According to the embodiment, it is possible to additionally include a pressure detection device in the form of a pressure sensing IC for the operation of the pressure detection. The pressure detection module (not illustrated) according to the embodiment of the present invention may include not only the pressure sensor 440 for pressure detection but also the pressure detection device.

In this case, the touch input device redundantly has a configuration similar to the configuration of FIG. 1 including the drive unit 120, the sensing unit 110, and the controller 130, so that there may be a problem in that the area and volume of the touch input device 1000 increase.

According to the embodiment, the touch detection device 1000 may apply the driving signal for pressure detection to the pressure sensor 440 by using the touch detection device for the operation of the touch sensor panel 100, and may detect the touch pressure by receiving the sensing signal from the pressure sensor 440. Hereafter, the description will be provided by assuming that the first electrode 450 is the drive electrode and the second electrode 460 is the receiving electrode.

To this end, in the touch input device 1000 to which the pressure sensor 440 is applied according to the embodiment of the present invention, the driving signal may be applied to the first electrode 450 from the drive unit 120, and the second electrode 460 may transmit the sensing signal to the sensing unit 110. The controller 130 may perform the scanning of the touch sensor panel 100, and simultaneously perform the scanning of the pressure detection, or the controller 130 performs the time-sharing, and then may generate a control signal such that the scanning of the touch sensor panel 100 is performed in a first time interval and the scanning of the pressure detection is performed in a second time interval different from the first time interval.

Therefore, in the embodiment of the present invention, the first electrode 450 and the second electrode 460 should be electrically connected to the drive unit 120 and/or the sensing unit 110. In this case, it is common that the touch detection device for the touch sensor panel 100 corresponds to the touch sensing IC 150 and is generally formed on one end of the touch sensor panel 100 or on the same plane with the touch sensor panel 100. The pressure electrode 450 and 460 included in the pressure sensor 440 may be electrically connected to the touch detection device of the touch sensor panel 100 by any method. For example, the pressure electrode 450 and 460 may be connected to the touch detection device through a connector by using the second PCB 210 included in the display module 200. For example, conductive traces 461 which electrically extend from the first electrode 450 and the second electrode 460 respectively may be electrically connected to the touch sensing IC 150 through the second PCB 210, etc.

Figure 10A:
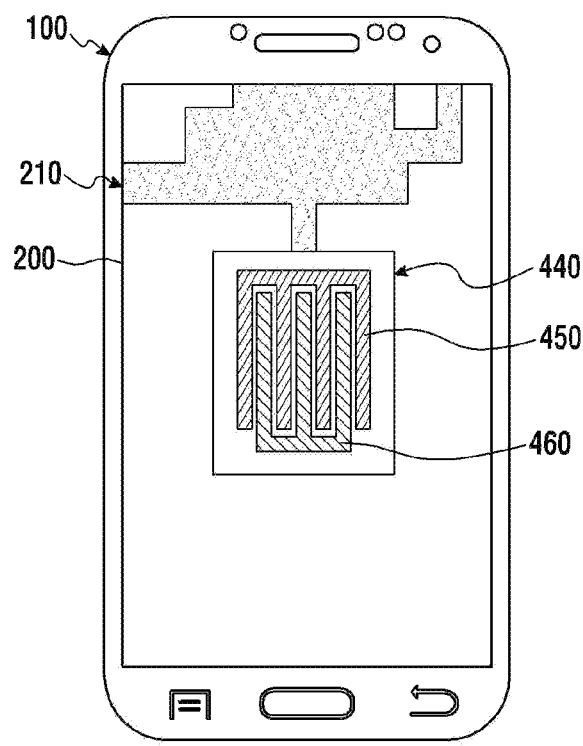
FIG. 10a and FIG. 10b illustrate a method of attaching a pressure sensor according to an embodiment of the present invention.
Figure 10B:
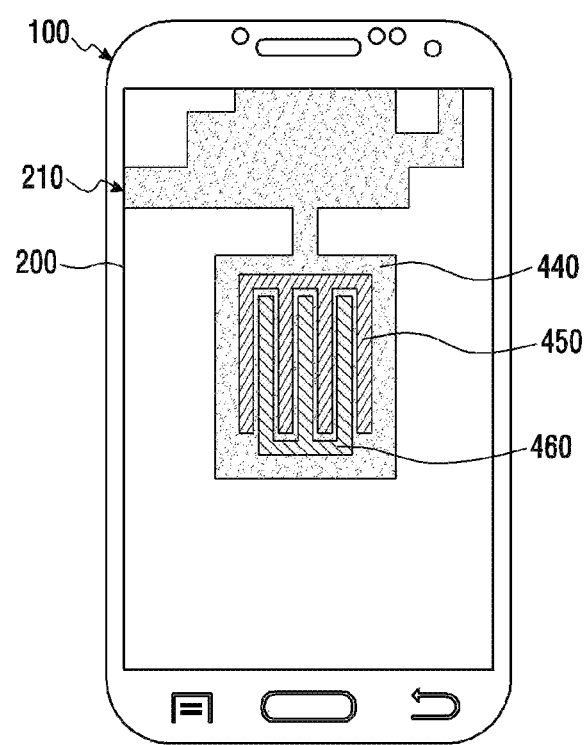

FIGS. 10*a* and 10*b* illustrate that the pressure sensor 440 including the pressure electrodes 450 and 460 is attached to the bottom surface of the display module 200. In FIGS. 10*a* and 10*b*, the second PCB 210 on which a circuit for the operation of the display panel is mounted is disposed on a portion of the bottom surface of the display module 200.

FIG. 10a illustrates that the pressure sensor 440 is attached to the bottom surface of the display module 200 such that the first electrode 450 and the second electrode 460 are connected to one end of the second PCB 210 of the display module 200. The first electrode 450 and the second electrode 460 may be connected to the one end of the second PCB 210 by using a double-sided conductive tape. Specifically, since the thickness of the pressure sensor 440 and an interval between the substrate 300 and the display module 200 where the pressure sensor 440 is disposed are very small, it is effective that the thickness may be reduced by connecting both the first electrode 450 and the second electrode 460 to the one end of the second PCB 210 by using the double conductive tape rather than by using a separate connector. A conductive pattern may be printed on the second PCB 210 in such a manner as to electrically connect the pressure electrodes 450 and 460 to a necessary component like the touch sensing IC 150, etc. The detailed description of this will be provided with reference to FIGS. 11a to 11c. An attachment method of the pressure sensor 440 including the pressure electrodes 450 and 460 illustrated in FIG. 10a may be applied in the same manner to the substrate 300 and the cover 240.

FIG. 10b illustrates that the pressure sensor 440 including the first electrode 450 and the second electrode 460 is not separately manufactured but is integrally formed on the second PCB 210 of the display module 200. For example, when the second PCB 210 of the display module 200 is manufactured, a certain area 211 is given to the second PCB, and then not only the circuit for the operation of the display panel but also the pattern corresponding to the first electrode 450 and the second electrode 460 may be printed on the area. A conductive pattern may be printed on the second PCB 210 in such a manner as to electrically connect the first electrode 450 and the second electrode 460 to a necessary component like the touch sensing IC 150, etc.

Figure 11A:
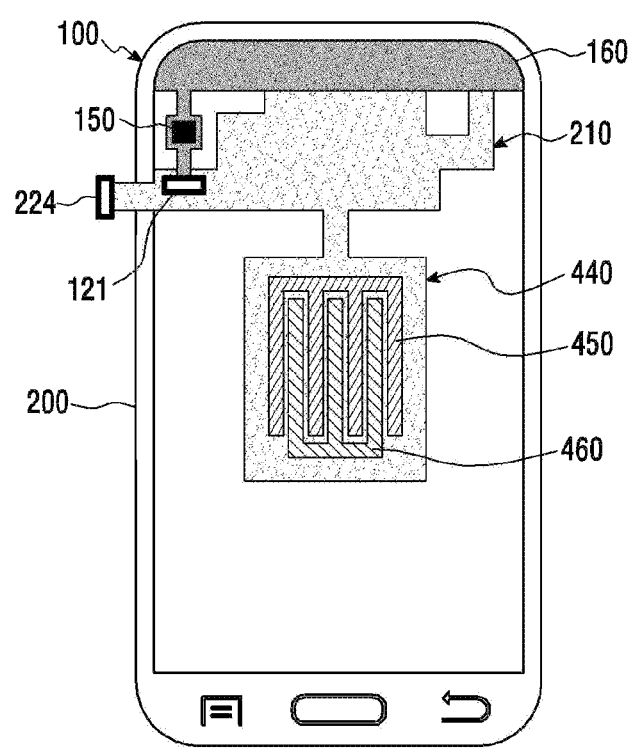
FIG. 11a to FIG. 11c illustrate a method of connecting a pressure sensor to a touch sensing circuit according to an embodiment of the present invention.
Figure 11B:
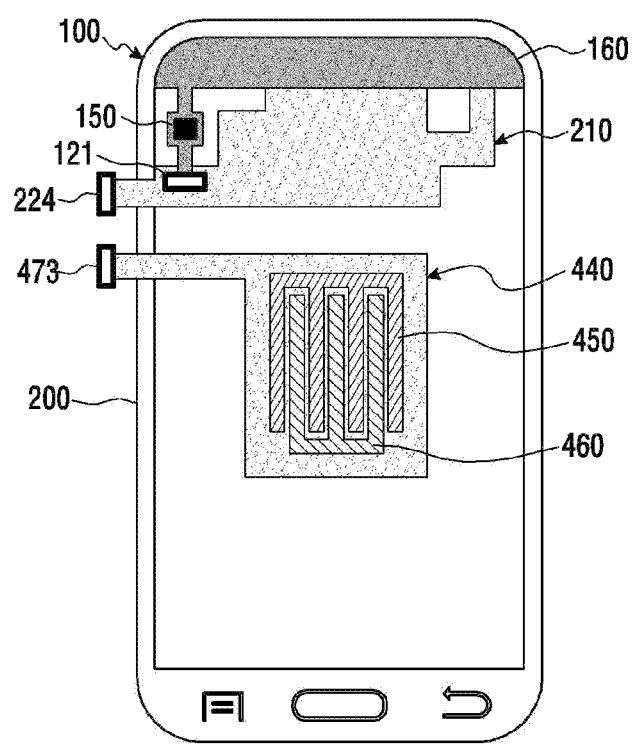
Figure 11C:
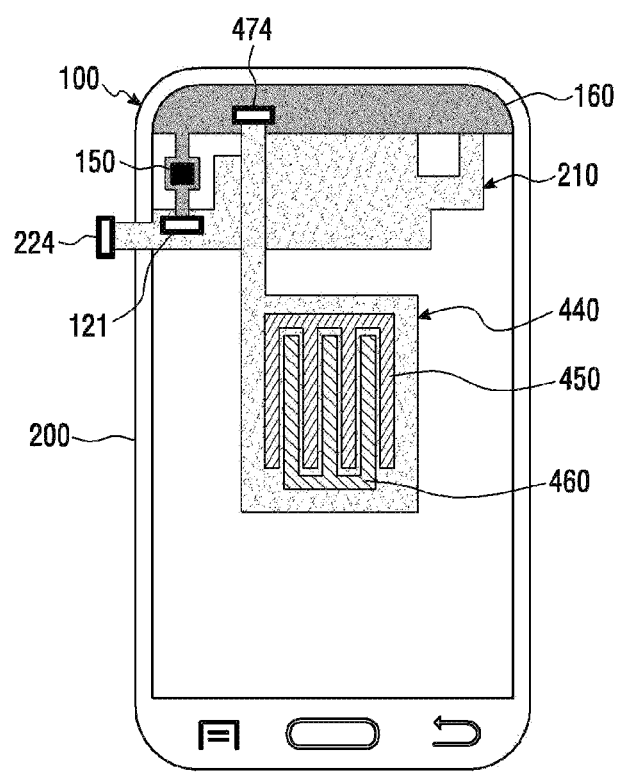

FIGS. 11a to 11c illustrate a method for connecting the pressure electrodes 450 and 460 included in the pressure sensor 440 to the touch sensing IC 150. In FIGS. 11a to 11c, the touch sensor panel 100 is included outside the display module 200. FIGS. 12a to 12c illustrate that the touch detection device of the touch sensor panel 100 is integrated in the touch sensing IC 150 mounted on the first PCB 160 for the touch sensor panel 100.

FIG. 11a illustrates that the pressure electrodes 450 and 460 included in the pressure sensor 440 attached to the display module 200 are connected to the touch sensing IC 150 through a first connector 121. As illustrated in FIG. 11a, in a mobile communication device such as a smart phone, the touch sensing IC 150 is connected to the second PCB 210 for the display module 200 through the first connector 121. The second PCB 210 may be electrically connected to the main board through a second connector 224. Therefore, through the first connector 121 and the second connector 224, the touch sensing IC 150 may transmit and receive a signal to and from the CPU or AP for the operation of the touch input device 1000.

While FIG. 11a illustrates that the pressure sensor 440 is attached to the display module 200 by the method illustrated in FIG. 10b, FIG. 11a illustrates even a case where the pressure sensor 440 is attached to the display module 200 by the method illustrated in FIG. 10a. A conductive pattern may be printed on the second PCB 210 in such a manner as to electrically connect the pressure electrodes 450 and 460 to the touch sensing IC 150 through the first connector 121.

FIG. 11b illustrates that the pressure electrodes 450 and 460 included in the pressure sensor 440 attached to the display module 200 are connected to the touch sensing IC 150 through a third connector 473. In FIG. 11b, the pressure electrodes 450 and 460 may be connected to the main board for the operation of the touch input device 1000 through the third connector 473, and in the future, may be connected to the touch sensing IC 150 through the second connector 224 and the first connector 121. The pressure electrodes 450 and 460 may be printed on the additional PCB separated from the second PCB 210. Alternatively, according to the embodiment, the pressure electrodes 450 and 460 may be attached to the touch input device 1000 in the form of the pressure sensor 440 illustrated in FIGS. 3a to 3h and may be connected to the main board through the connector 473 by extending the conductive trace, etc., from the pressure electrodes 450 and 460.

FIG. 11c illustrates that the pressure electrodes 450 and 460 are directly connected to the touch sensing IC 150 through a fourth connector 474. In FIG. 11c, the pressure electrodes 450 and 460 may be connected to the first PCB 160 through the fourth connector 474. A conductive pattern may be printed on the first PCB 160 in such a manner as to electrically connect from the fourth connector 474 to the touch sensing IC 150. As a result, the pressure electrodes 450 and 460 may be connected to the touch sensing IC 150 through the fourth connector 474. In this case, the pressure electrodes 450 and 460 may be printed on the additional PCB separated from the second PCB 210. The second PCB 210 may be insulated from the additional PCB so as not to be short-circuited with each other. Alternatively, according to the embodiment, the pressure electrodes 450 and 460 may be attached to the touch input device 1000 in the form of the pressure sensor 440 illustrated in FIGS. 3a to 3h and may be connected to the first PCB 160 through the connector 474 by extending the conductive trace, etc., from the pressure electrodes 450 and 460.

The connection method of FIGS. 11b and 11c may also be applied to the case where the pressure sensor 440 including the pressure electrode 450 and 460 is formed on the substrate 300 or on the cover 240 as well as on the bottom surface of the display module 200.

In FIGS. 11a to 11c, a chip on board (COB) structure is assumed and described in which the touch sensing IC 150 is formed on the first PCB 160. However, this is just an example and the present invention may be applied to the chip on board (COB) structure in which the touch sensing IC 150 is mounted on the main board within the mounting space 310 of the touch input device 1000. It will be apparent to those skilled in the art from the descriptions of FIGS. 11a to 11c that the connection of the pressure electrodes 450 and 460 through the connector can be also applied to another embodiment.

Hereinabove, the pressure electrodes 450 and 460 have been described in which the first electrode 450 as the drive electrode constitutes one channel and the second electrode 460 as the receiving electrode constitutes one channel. However, this is just an example and according to the embodiment, each of the drive electrode and the receiving electrode constitutes a plurality of channels. If each of the drive electrode and the receiving electrode constitutes a plurality of channels, when the pressure for the touch is detected, the accuracy may be enhanced and it may be possible to detect multiple pressures for multiple touches.

FIGS. 12a to 12d illustrate that the pressure electrode of the present invention constitutes the plurality of channels. FIG. 12a illustrates that first electrodes 450-1 and 450-2 and second electrodes 460-1 and 460-2 constitute two channels, respectively. FIG. 12a illustrates that all of the first electrodes 450-1 and 450-2 and the second electrodes 460-1 and 460-2 which constitute the two channels are included in one pressure sensor 440. FIG. 12b illustrates that the first electrode 450 constitutes two channels 450-1 and 450-2 and the second electrode 460 constitutes one channel FIG. 12c illustrates the first electrode 450-1 to 450-5 constitute five channels and the second electrode 460-1 and 460-5 constitute five channels. Even in this case, all of the electrodes constituting the five channels may also be included in one pressure sensor 440. FIG. 12d illustrates that first electrodes 451 to 459 constitute nine channels and all of the first electrodes 451 to 459 are included in one pressure sensor 440.

As illustrated in FIGS. 12a to 12d and 13a to 13d, when the plurality of channels are formed, a conductive pattern which is electrically connected to the touch sensing IC 150 from each of the first electrode 450 and/or the second electrode 460 may be formed.

Here, described is a case in which the plurality of channels illustrated in FIG. 12d is constituted as an example. In this case, since a plurality of conductive patterns 461 should be connected to the first connector 121 with a limited width, a width of the conductive pattern 461 and an interval between the adjacent conductive patterns 461 should be small. Polyimide is more suitable for a fine process of forming the conductive pattern 461 with such a small width and interval than polyethylene terephthalate.

Specifically, the support layers 470b and 471b of the pressure sensor 440, in which the conductive pattern 461 is formed, may be made of polyimide. Further, a soldering process may be required to connect the conductive pattern 461 to the first connector 121 and for a soldering process which is performed at a temperature higher than 300° C., polyimide resistant to heat is more suitable than polyethylene terephthalate relatively vulnerable to heat. In this case, for the purpose of reducing production costs, a portion of the support layers 470b and 471b, in which the conductive pattern 461 is not formed, may be made of polyethylene terephthalate, and a portion of the support layers 470b and 471b, in which the conductive pattern 461 is formed, may be made of polyimide.

FIGS. 12a to 12d and 13a to 13d illustrate that the pressure electrode constitutes a single or a plurality of channels and the pressure electrode may be constituted by a single or a plurality of channels by a variety of methods in addition to the illustrated case. While FIGS. 12a to 12d and 13a to 13d do not illustrate that the pressure electrodes 450 and 460 are electrically connected to the touch sensing IC 150, the pressure electrodes 450 and 460 may be connected to the touch sensing IC 150 by the method shown in FIGS. 11a to 11c and other methods.

Hereinabove, the first connector 121 or the fourth connector 474 may be a double conductive tape. Specifically, since the first connector 121 or the fourth connector 474 may be disposed at a very small interval, the thickness may be effectively reduced by using the double conductive tape rather than a separate connector. Further, according to the embodiment, the functions of the first connector 121 and the fourth connector 474 may be implemented by a Flex-on-Flex Bonding (FOF) method capable of achieving a small thickness.

Hereinafter, various methods will be described in which the pressure sensor 440 detects the magnitude of the pressure of the touch on the basis of the capacitance change amount detected from the plurality of channels when the pressure sensor 440 is configured to form the plurality of channels.

Figure 20A:
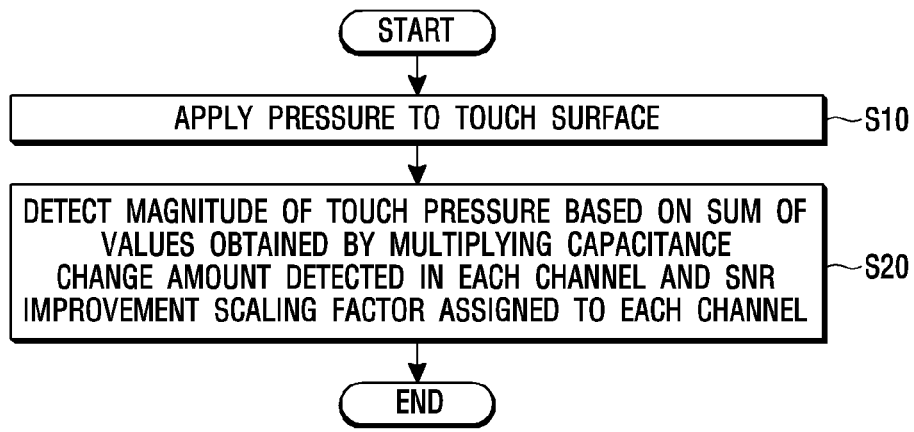
FIG. 20a to FIG. 20c are flowcharts illustrating an example of a method of detecting the magnitude of a touch pressure using a plurality of channels in a touch input device according to an embodiment of the present invention.

First method example FIG. 20a is a flowchart for describing an example of a method for detecting the magnitude of the touch pressure by using a plurality of channels in the touch input device according to the embodiment of the present invention.

When a pressure is applied to the touch surface (S10), the magnitude of the touch pressure is detected based on the sum of values obtained by multiplying the change amounts of the capacitances detected in the respective channels and SNR improvement scaling factors assigned to the respective channels (S20). For example, the magnitude of the touch pressure may be detected based on the sum of values obtained by multiplying the change amounts of the capacitances detected in the respective fifteen first electrodes 450 in the pressure sensor 440 illustrated in FIG. 13d and the SNR improvement scaling factors assigned to the respective channels. As such, by using a sum of values obtained by multiplying the pressure magnitudes detected from the respective channels (or the capacitance values corresponding thereto) and SNR improvement scaling factors assigned to the respective channels, or by using an average value of the sum, the accuracy of the pressure magnitude detected by using the plurality of channels may be further improved than the accuracy of the pressure magnitude detected by using a single channel.

Second Method Example

Depending on the position of the pressure sensor, a difference may occur in the magnitude of capacitance detected for the same touch pressure. For example, the amount of change in capacitance detected by the pressure electrode located in the center may be greater than the amount of change in capacitance detected by the pressure electrode located in the vicinity. The first method example may be applied when the sensitivity difference according to the position is negligible or when the sensitivity difference is compensated by hardware. The second method example is a method that may be applied when the difference in sensitivity is compensated by software.

Figure 13B:
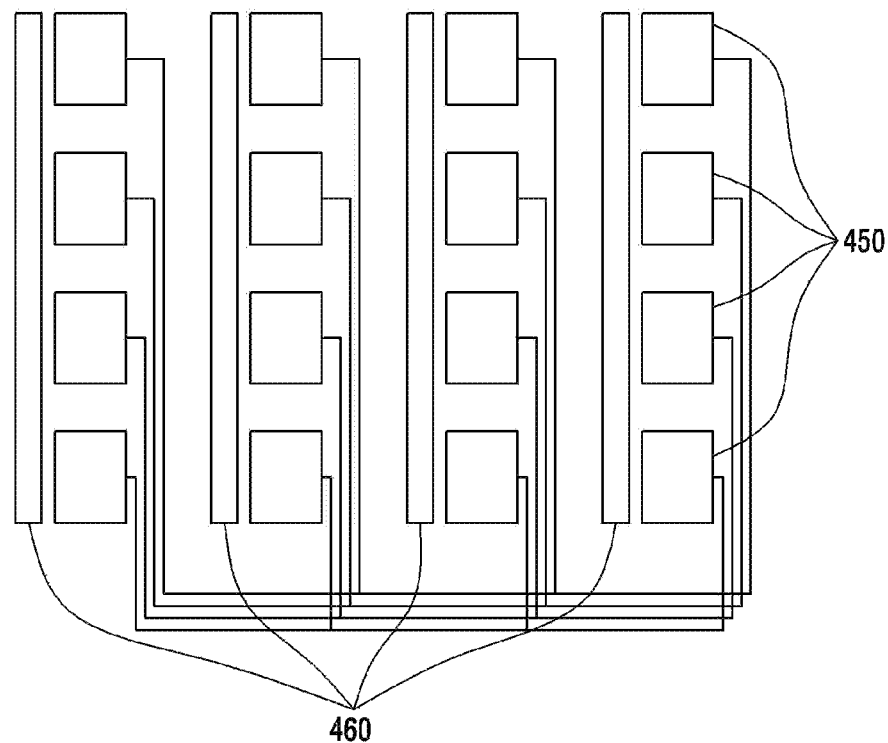
Figure 13C:
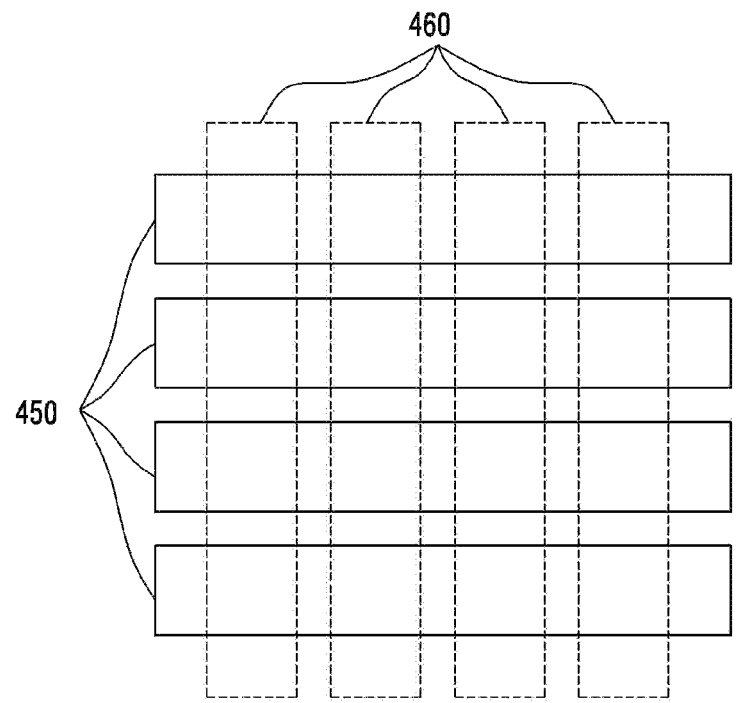
Figure 13D:
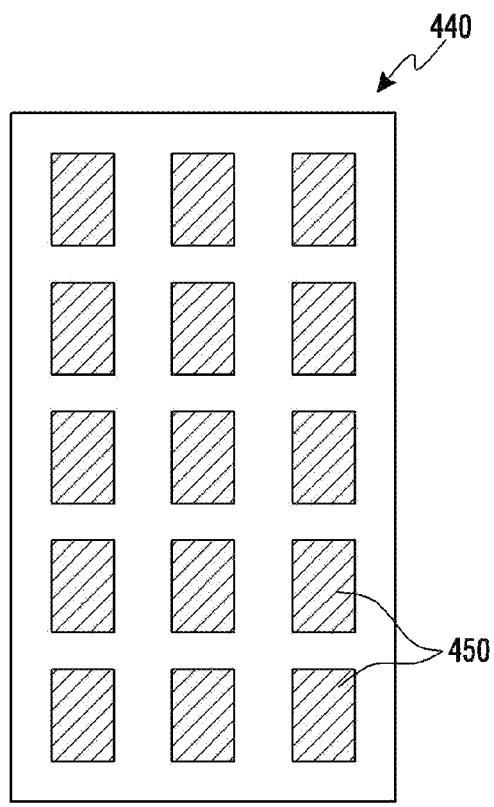
FIG. 13d illustrates a shape of a first electrode included in a pressure sensor according to an embodiment of the present invention.
Figure 14A:
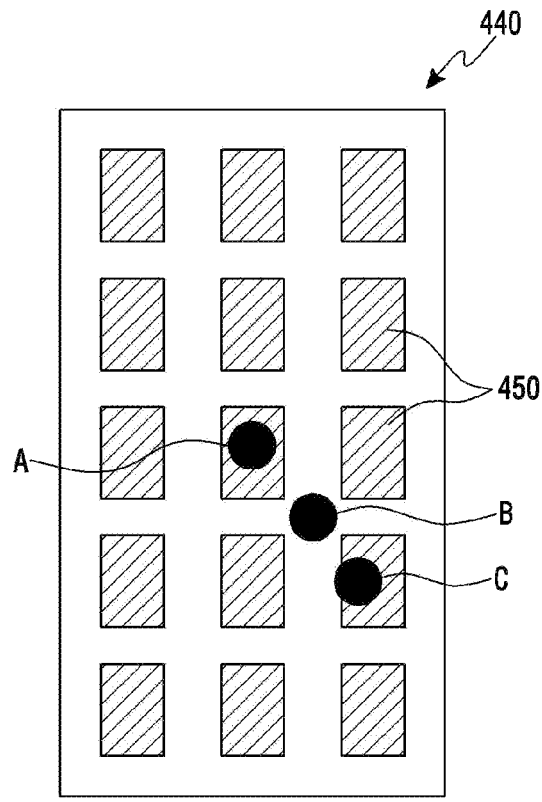
FIG. 14a is a diagram illustrating a case in which pressure is applied to a predetermined position in the pressure sensor shown in FIG. 13d.
Figure 14B:
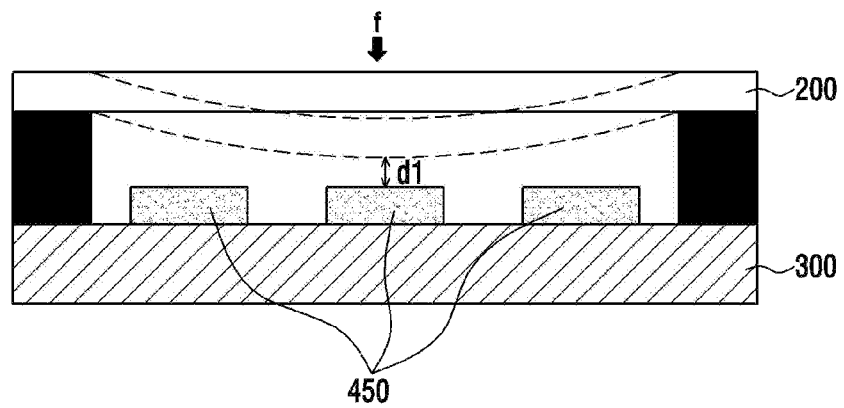
Figure 14C:
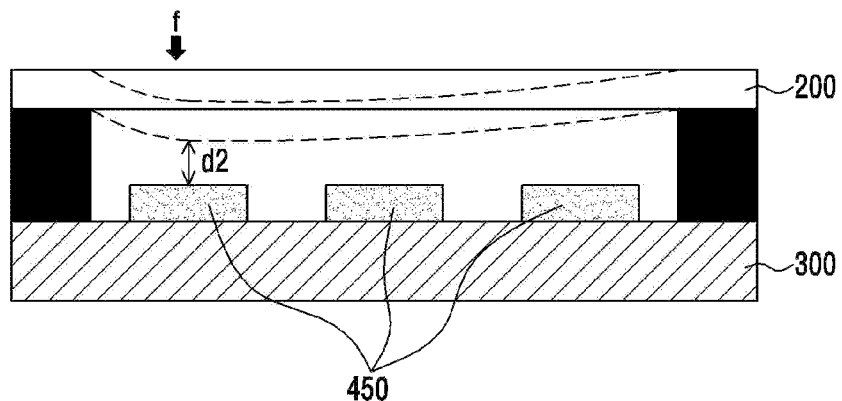

FIG. 14a is a diagram illustrating that a pressure is applied to a predetermined position in the pressure sensor shown in FIG. 13d, FIG. 14b is a cross sectional view illustrating a form in which the touch input device is bent when the touch pressure is applied to a touch surface corresponding to a position "A" of FIG. 14a, and FIG. 14c is a cross sectional view illustrating a form in which the touch input device is bent when the touch pressure is applied to a touch surface corresponding to a position "C" of FIG. 14a.

When the touch pressure is applied to the touch surface corresponding to a position "A" illustrated in FIG. 14a, that is, when the touch pressure is applied to the central portion of the display module 200, the degree of bending of the display module 200 may be relatively high as illustrated in FIG. 14b. On the other hand, when the touch pressure is applied to the touch surface corresponding to a position "C" illustrated in FIG. 14a, that is, when the touch pressure is applied to the edge of the display module 200, the degree of bending of the edge of the display module 200 may be relatively smaller than the bending degree of the display module 200 as illustrated in FIG. 14c. Specifically, as illustrated in FIGS. 14b and 14c, when the same touch pressure is applied, the distance d1 between the pressure electrode 450 and the position where the display module 200 is most bent when the touch pressure is applied to the central portion of the display module 200 may be smaller than the distance d2 between the pressure electrode 450 and the position where the display module 200 is most bent when the touch pressure is applied to the edge of the display module 200. As such, even though the same touch pressure is applied, the capacitance change amounts detected in the respective channels are different according to the position where the touch pressure is applied. Therefore, there is a need for a method capable of detecting a more accurate pressure value than the pressure value detected by using the sum or average of values obtained by multiplying the pressure magnitudes detected from the respective channels or the capacitances corresponding to the pressure magnitudes by the SNR improvement scaling factors assigned to the respective channels.

Figure 15:
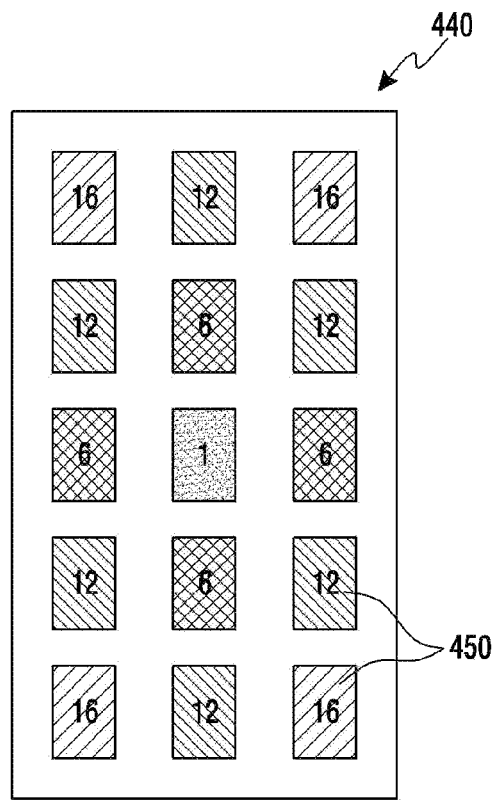
FIG. 15 is a diagram illustrating a scaling factor assigned to each first electrode in the pressure sensor shown in FIG. 13d.
Figure 20B:
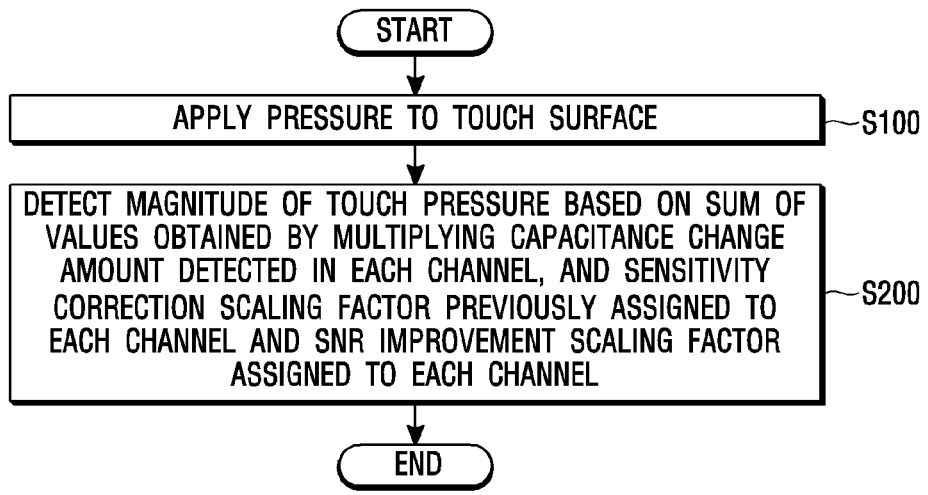

FIG. 20*b* is a flowchart for describing another example of the method for detecting the magnitude of the touch pressure by using a plurality of channels in the touch input device according to the embodiment of the present invention and FIG. 15 is a diagram illustrating a sensitivity correction scaling factor assigned to each first electrode in the pressure sensor shown in FIG. 13*d*.

When a pressure is applied to the touch surface (S100), the magnitude of the touch pressure is detected based on the sum of values obtained by multiplying the change amounts of the capacitances detected in the respective channels, the sensitivity correction scaling factors assigned previously to the respective channels, and the SNR improvement scaling factor assigned to the respective channels (S200). For example, as shown in FIG. 15, the sensitivity correction scaling factor of 1 may be assigned to the first electrode 450 located at the central portion of the display module 200, a scaling factor of 6 may be assigned to the first electrodes 450 adjacent to the first electrode 450 located at the central portion, and sensitivity correction scaling factors of 12 and 16 may be respectively assigned to the first electrodes 450 located at the edge further therethan. As described above, when a smaller sensitivity correction scaling factor is assigned to the channel corresponding to the central portion of the display module 200 and a larger sensitivity correction scaling factor is assigned to the channel corresponding to the edge of the display module 200, the central portion of the display module 200 is, as shown in FIGS. 14*b* and 14*c*, bent more than the edge of the display module 200 when the same pressure is applied, and as a result, it is possible to offset that the change amount of the capacitance detected at the central portion of the display module 200 becomes greater than the change amount of the capacitance detected at the edge of the display module 200. Therefore, a more accurate pressure value may be calculated.

Third Method Example

In the third method example, a total volume change amount is estimated using the distance change value calculated from the amount of change in capacitance detected in each channel, and the magnitude of the touch pressure is calculated using the change amount.

Figure 16A:
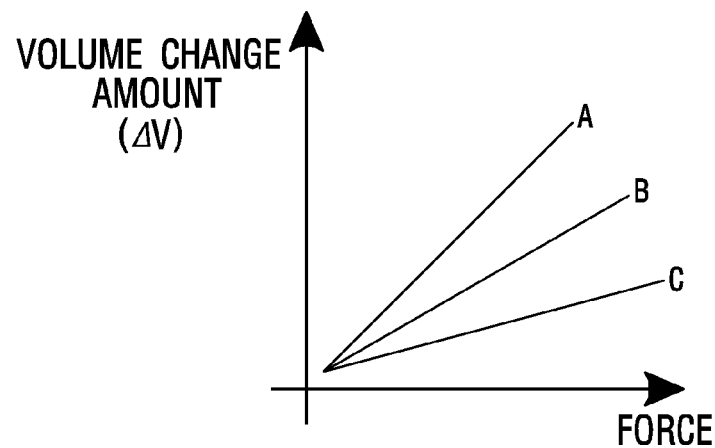
Figure 16B:
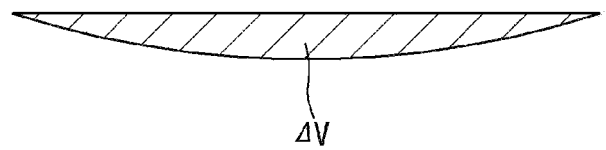
FIG. 16b is a cross-sectional view illustrating a volume change amount of the touch input device illustrated in FIG. 14b.
Figure 16C:
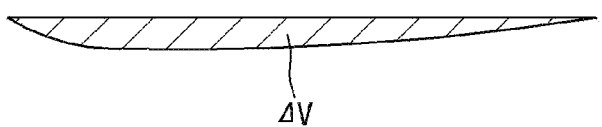
FIG. 16c is a cross-sectional view illustrating a volume change amount of the touch input device illustrated in FIG. 14c.

FIG. 16*a* is a graph for describing, when the pressure is applied to the position illustrated in FIG. 14*a*, a relation between a volume change amount of the touch input device and the magnitude of the applied pressure, FIG. 16*b* is a cross sectional view illustrating the volume change amount of the touch input device illustrated in FIG. 14*b*, and FIG. 16*c* is a cross sectional view illustrating the volume change amount of the touch input device illustrated in FIG. 14*c*.

When the same touch pressure is applied, a volume (hereinafter, referred to as volume change amount) at which the touch input device 1000 is deformed when the touch pressure is applied to the central portion of the display module 200 may be greater than the volume change amount of the touch input device 1000 when the touch pressure is applied to the edge of the display module 200. In other words, when it is compared that the same touch pressure is applied to the touch surfaces corresponding to the positions "A", "B", and "C" shown in FIG. 14*a*, as shown in FIGS. 16*a* to 16*c*, the volume change amount of the touch input device 1000 when the touch pressure is applied to the position "A", the central portion of the display module 200, is greater than the volume change amount of the touch input device 1000 when the touch pressure is applied the position "C" located at the edge relatively to the position "A" of the display module 200.

When the touch pressure is applied to the same position, the magnitude of the applied pressure and the volume change amount of the touch input device 1000 have a linear relationship. In other words, when it is compared that the touch pressures having different magnitudes are applied to any one of the positions "A", "B", and "C" illustrated in FIG. 14*a*, the volume change amount of the touch input device 1000 is, as illustrated in FIG. 16*a*, changed in proportion to the magnitude of the applied pressure.

Therefore, the magnitude of the pressure may be detected by estimating the volume change amount of the touch input device 1000.

First, when a pressure having a predetermined magnitude is applied to a predetermined touch position of the display module 200, a reference value corresponding to the touch position is stored in a memory (not illustrated) on the basis of the capacitance detected from each channel. In this case, the reference value may be the volume change amount of the touch input device 1000 calculated based on the capacitance detected from each channel. Alternatively, the reference value may be a normalized pressure value having a linear relationship with the volume change amount of the touch input device 1000, or may be a slope in the graph shown in FIG. 16*a*. Such a method is repeatedly performed for each touch position, and the reference value for all positions of the entire area of the display module 200 when a pressure having a predetermined magnitude is applied is stored in the memory. In this case, since it is difficult to generate the reference value for all positions of the entire area of the display module 200, the reference value may be generated and stored only for a plurality of representative positions spaced apart by a predetermined interval. For example, the volume change amounts of 432 calculated based on each capacitance change amount detected when a pressure of 800 g is applied to each of the touch positions of 432 (18×24) spaced apart at regular intervals of the display module 200 may be stored in the memory.

Next, a method for detecting the magnitude of the touch pressure by using the reference value is illustrated.

Figure 17A:
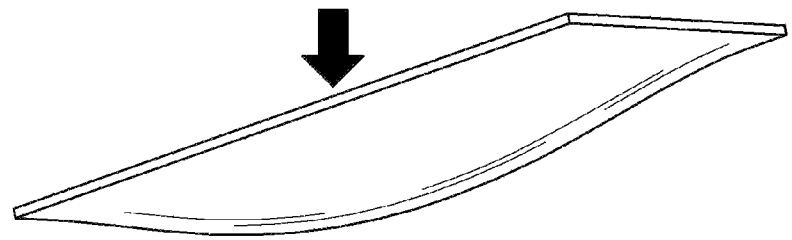
FIG. 17a is a partial perspective view for explaining a form in which the touch input device is deformed when pressure is applied to the touch input device.
Figure 17B:
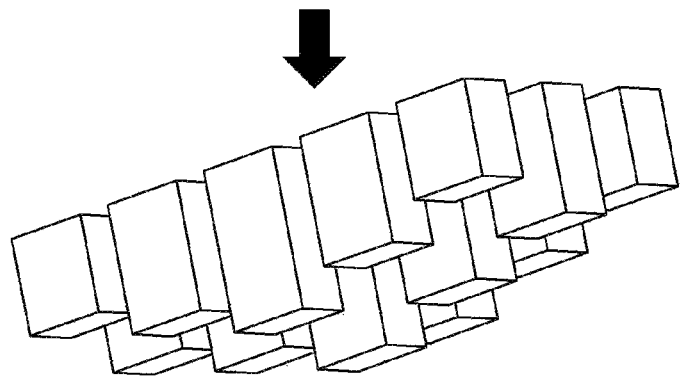
FIG. 17b is a diagram for explaining estimating a volume change amount of the touch input device when pressure is applied to the touch input device.
Figure 17C:
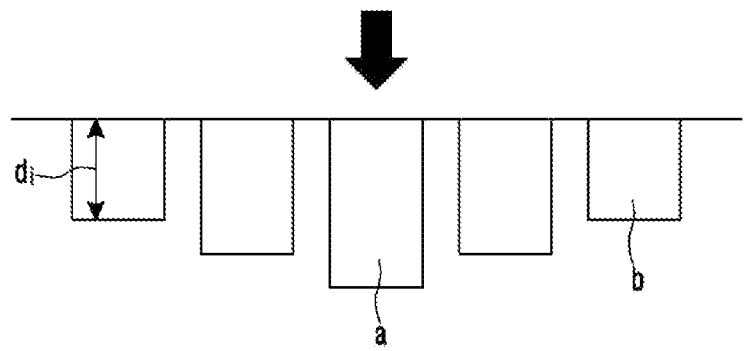
FIG. 17c is a cross-sectional view of the diagram shown in FIG. 17b.
Figure 20C:
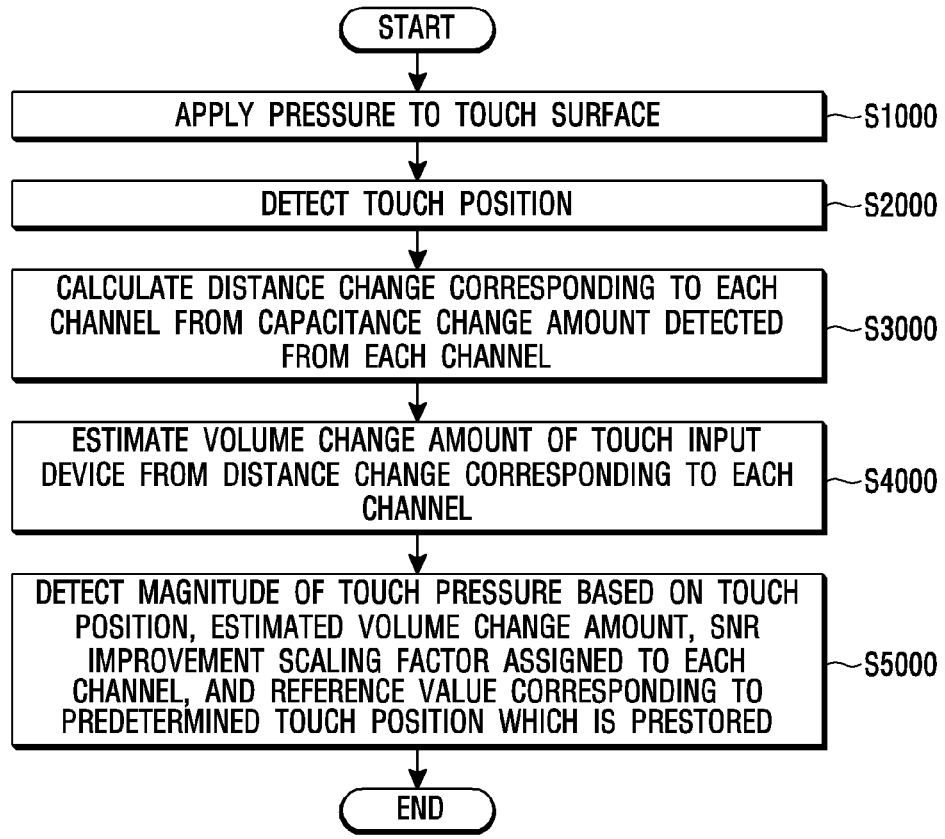

FIG. 20*c* is a flowchart for describing further another example of a method for detecting the magnitude of the touch pressure by using a plurality of channels in the touch input device according to the embodiment of the present invention, and FIG. 17*a* is a partial perspective view for describing a form in which the touch input device is deformed when the pressure is applied to the touch input device, FIG. 17*b* is a diagram for describing the estimation of the volume change amount of the touch input device when the pressure is applied to the touch input device, and FIG. 17*c* is a cross sectional view of a diagram illustrated in FIG. 17*b*.

When a pressure is applied to the touch surface (S1000), the touch position is detected (S2000), and a distance change corresponding to each channel is calculated from the change amount of the capacitance detected in each channel (S3000).

The value of capacitance detected in each channel depends on the configuration of the pressure electrode or the configuration of the circuit for sensing the touch pressure, but when the touch pressure is applied, the value of capacitance can be represented by a function of the distance change "di" corresponding to each channel shown in FIG. 17c, and therefore, it is possible to calculate the distance change "di" corresponding to each channel by performing an inverse calculation on the capacitance value detected from each channel Here, the distance change "di" corresponding to each channel means a distance which corresponds to each channel and at which the surface of the touch input device is deformed after the pressure is applied with respect to the time before the pressure is applied.

Figure 18A:
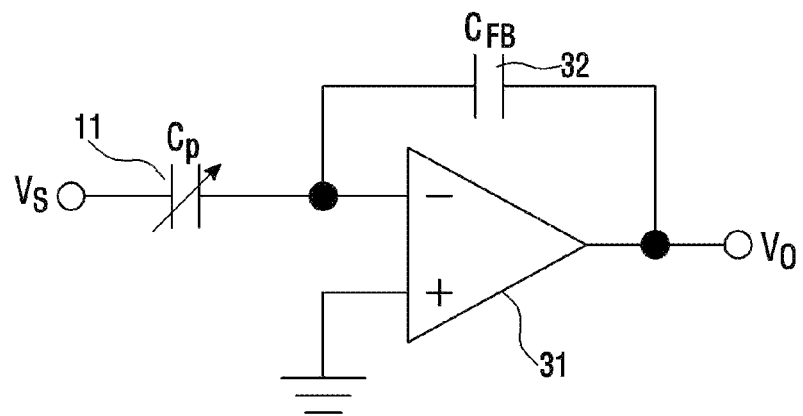
FIG. 18a illustrates an equivalent circuit of a device for sensing pressure capacitance with respect to the pressure sensor of the type shown in FIGS. 13a to 13c.

FIG. 18a illustrates an equivalent circuit of a device for sensing a pressure capacitance 11 between the first electrode 450 and the second electrode 460 when, as shown in FIGS. 13a to 13c, the first electrode 450 is composed of the drive electrode TX and the second electrode 460 is composed of the receiving electrode RX, so that the magnitude of the touch pressure is detected from the change of the mutual capacitance between the first electrode 450 and the second electrode 460. Here, a relational expression between the driving signal Vs and the output signal Vo may be expressed by Equation 1.

$$V_0 = -\frac{C_P}{C_{FB}} \cdot V_S \qquad \text{[Equation 1]}$$

In this case, of the capacitances of the first electrode 450 and the second electrode 460, the capacitance which is taken by a reference potential layer is fringing capacitance. In this case, the pressure capacitance 11 may be expressed as in Equation 2.

$$C_P = C_O + C_{fringing} = C_O + \alpha f(d)$$

Here, Co represents a fixed capacitance value generated between the first electrode 450 and the second electrode 460, $C_{fringing}$ represents a capacitance value generated by fringing effect between the first electrode 450 and the second electrode 460, and Equation (2) represents the value of $C_{fringing}$ by the distance "d" and a coefficient "α". The fixed capacitance means a capacitance generated by the first electrode 450 and the second electrode 460 irrespective of the distance "d" between the reference potential layer and the electrode.

When a random pressure is applied to any position of the display module 200, the distance change "di" corresponding to each channel may be calculated by performing an inverse calculation on the capacitance change amounts detected in each of the channels, Equation (1), and Equation (2).

Figure 18B:
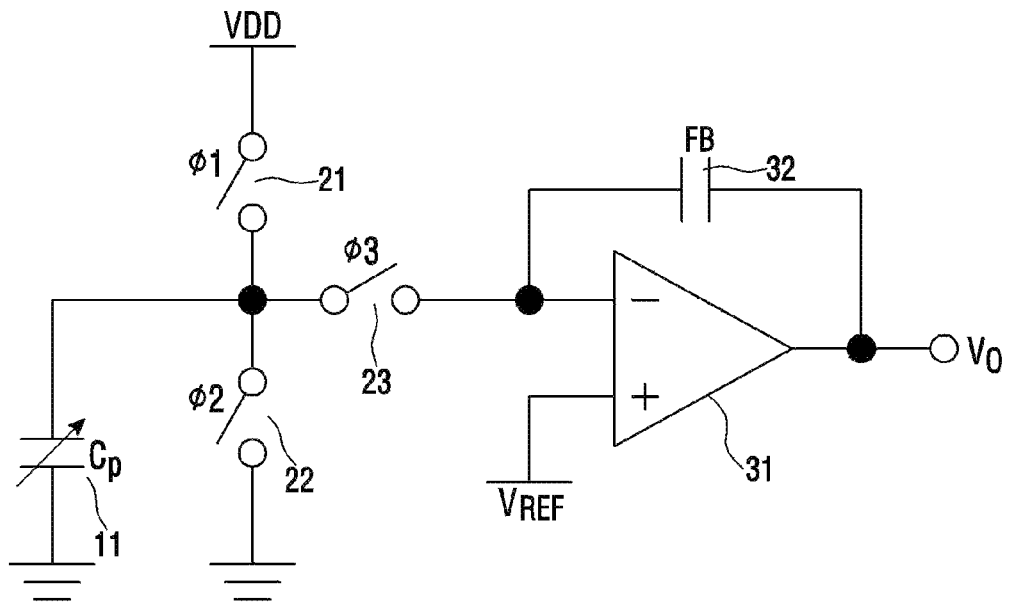
FIG. 18b illustrates an equivalent circuit of a device for sensing pressure capacitance with respect to the pressure sensor shown in FIG. 13d.

Further, FIG. 18b illustrates an equivalent circuit of a device for sensing the capacitance 11 between the first electrode 450 and the reference potential layer when, as illustrated in FIG. 13d, the driving signal is applied to the first electrode 450 and the reception signal is detected from the first electrode 450, so that the magnitude of the touch pressure is detected from the change of the self-capacitance of the first electrode 450.

When a first switch 21 is turned on, the pressure capacitor 11 is charged to a power supply voltage VDD to which one end of the first switch 21 is connected. When a third switch 23 is turned on immediately after the first switch 21 is turned off, the electric charges charged in the pressure capacitor 11 are transferred to an amplifier 31 to obtain the output signal Vo corresponding thereto. When a second switch 22 is turned on, all the electric charges remaining in the pressure capacitor 11 are discharged. When the third switch 23 is turned on immediately after the second switch 22 is turned off, the electric charges are transferred to the pressure capacitor 11 through a feedback capacitor 32 to obtain the output signal corresponding thereto. In this case, the output signal Vo of the circuit shown in FIG. 18b can be expressed by Equation 3.

$$V_0 = -\frac{C_P}{C_{FB}} \cdot V_{DD} \qquad \text{[Equation 3]}$$

$$V_0 = -\frac{\varepsilon A}{C_{FB}} \cdot \frac{1}{d} \cdot V_{DD}$$

Here, ε represents a dielectric constant $\varepsilon_o \varepsilon_r$ of the material filled between the first electrode 450 and the reference potential layer, and "A" represents the area of the first electrode 450.

When a random pressure is applied to any position of the display module 200, the distance change "di" corresponding to each channel can be calculated by performing an inverse calculation on the capacitance change amounts detected in each of the channels and Equation (3).

The volume change amount of the touch input device is estimated by using the calculated distance change "di" corresponding to each channel (S4000). Specifically, when the touch pressure is applied, the surface of the touch input device 1000 is deformed as illustrated in FIG. 17a, and the volume change amount of the touch input device 1000 due to the deformation of the surface of the touch input device 1000 may be estimated as the sum of the volume change amounts corresponding to the respective channels illustrated in FIGS. 17b and 17c. In this case, when the areas corresponding to the respective channels are the same, for example, when the areas of the first electrodes 450 shown in FIG. 13d are the same, the sum of the volume change amounts corresponding to the respective channels may be a value obtained by multiplying the sum of the distance changes "di" corresponding to the respective channels by the area "A" of the first one electrode 450.

In this case, when the touch pressure is applied to a predetermined position, the magnitude of the applied pressure and the volume change amount of the touch input device 1000 have, as illustrated in FIG. 16a, a linear relationship, and as a result, the magnitude of the applied pressure is calculated on the basis of the estimated volume change amount of the touch input device 1000, the SNR improvement scaling factors assigned to the respective channels, and the reference value which is stored in the memory and corresponds to the touch position (S5000).

For example, on the assumption that the SNR improvement scaling factors assigned to the respective channels are all 1, when the estimated volume change amount of the touch input device 1000 is 1000 and the volume change amount stored in the memory as a reference value corresponding to the touch position for a pressure of 800 g is 2000, the magnitude of the applied pressure is 400 g.

Meanwhile, according to the embodiment, the reference value corresponding to the touch position may be configured to be set for each channel.

Further, when the reference value corresponding to the input touch position is not stored in the memory, the pressure value can be calculated through various interpolation methods such as linear interpolation, bi-cubic interpolation, etc., by using the reference value which is stored in the memory and corresponds to a touch position adjacent to the input touch position.

Figure 19A:
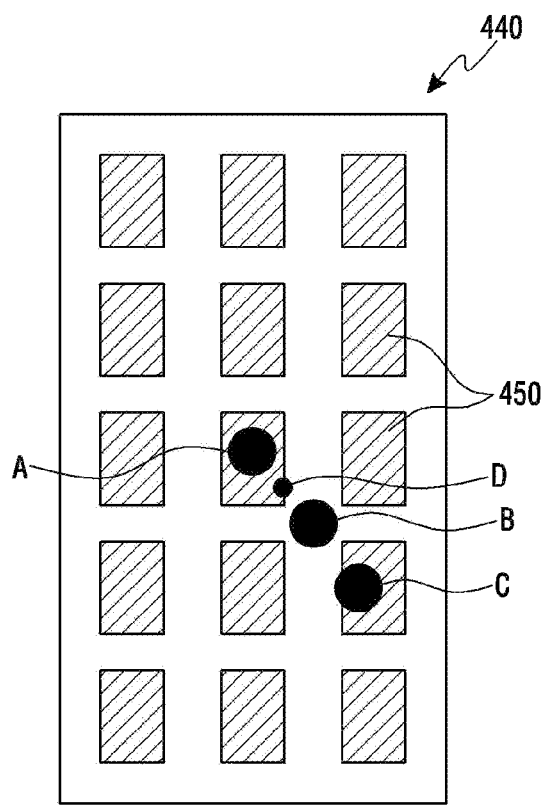
Figure 19B:
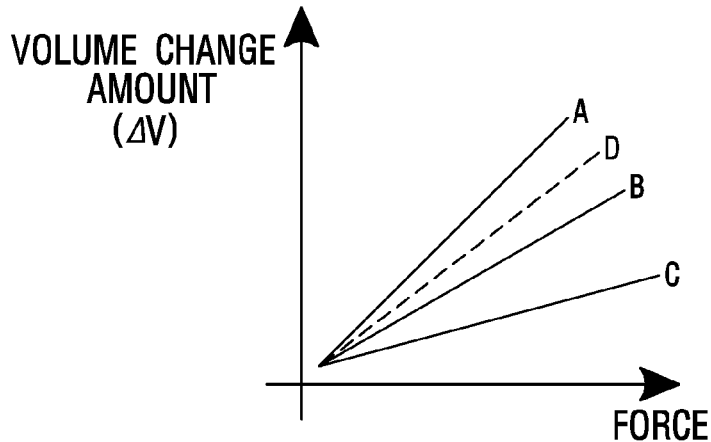

FIG. 19a is a diagram for describing a case where a pressure is applied to a position "D" of the pressure sensor shown in FIG. 14a, and FIG. 19b is a graph for describing the calculation of the pressure value when the pressure is applied to the position "D" illustrated in FIG. 19a.

For example, when reference values corresponding to the position "A" and the position "B" illustrated in FIG. 19a are stored in the memory and when a reference value corresponding to the position "D" which is a mid-point between the position "A" and the position "B" is not stored in the memory, the reference value of the position "D" may be, as shown in FIG. 19b, estimated by linearly interpolating the reference values of the position "A" and the position "B", that is to say, by taking an intermediate value between the reference value of the position "A" and the reference value of the position "B", and the magnitude of the pressure applied to the position "D" may be calculated by using the estimated reference value of the position "D".

As described above, by calculating the magnitude of the pressure on the basis of the volume change amount by the touch pressure, it is possible to detect a more accurate pressure magnitude and the accurate magnitude of the pressure may be detected even though the reference potential layer or the pressure sensor is deformed from an initial position.

Hereinafter, a method for calculating the SNR improvement scaling factor will be described.

Figure 21A:
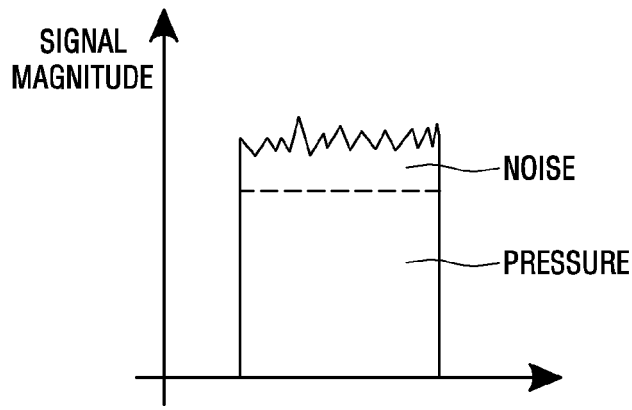
FIG. 21a is a graph showing the magnitude of a signal including information on capacitance detected in a channel corresponding to a position a in FIG. 17c.
Figure 21B:
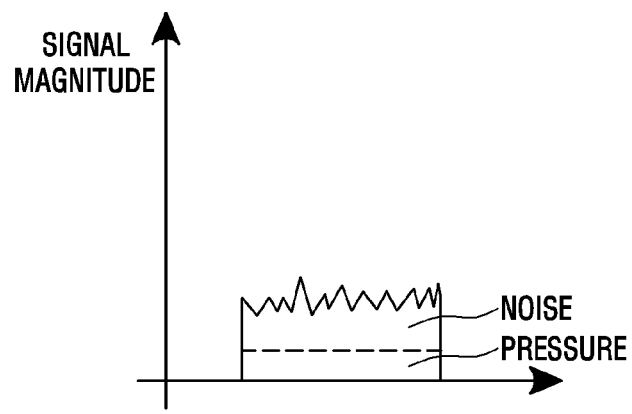
FIG. 21b is a graph showing the magnitude of a signal including information on capacitance detected in a channel corresponding to position b of FIG. 17c.

FIG. 21a is a graph showing a magnitude of a signal including information on the capacitance detected in the channel corresponding to the position "a" of FIG. 17c and FIG. 21b is a graph showing a magnitude of a signal including information on the capacitance detected in the channel corresponding to the position "b" of FIG. 17c.

As shown in FIG. 17c, when a touch pressure is applied to the central portion of the display module, the magnitude of the signal including information on the capacitance detected in the channel corresponding to the position "a" may be greater than the magnitude of the signal including information on the capacitance detected in the channel corresponding to the position "b". In this case, the capacitance detected in each channel may be changed by various factors such as the change in an electric field or a magnetic field around the touch input device 1000, temperature variation, and the like, as well as the pressure applied to the touch input device 1000. The capacitance change due to the factors other than the pressure applied to the touch input device 1000 corresponds to noise to be removed in the detection of the magnitude of the pressure. As shown in FIGS. 21a and 21b, the signal including information on the capacitance detected in each channel is detected in a form in which a signal due to the applied pressure and a signal due to noise are combined. In this case, as shown in FIG. 21a, a proportion occupied by the magnitude of the signal due to the pressure among the signals detected at the position "a" corresponding to the central portion of the display module, that is to say, the position to which the pressure is applied, occupies is larger than a proportion occupied by the magnitude of the signal due to noise. On the other hand, as shown in FIG. 21b, a proportion occupied by the magnitude of the signal due to the pressure among the signals detected at the position "b" corresponding to the edge of the display module, which is far from the position to which the pressure is applied, is relatively smaller than a proportion occupied by the magnitude of the signal due to noise. In this case, since the magnitude of the signal due to noise is generally constant irrespective of the position to which the pressure is applied, the magnitude of the signal due to noise detected in each channel is generally constant, but since the magnitude of the signal due to the pressure is different depending on the position to which the pressure is applied, the magnitude of the signal due to the pressure detected in each channel is different depending on the position to which the pressure is applied.

Therefore, in the detection of the pressure magnitude, by excluding a signal which is detected in a channel where the magnitude of the signal due to noise is relatively larger than the magnitude of the signal due to the pressure, or by reducing how much the signal contributes to the detection of the magnitude of the pressure, how much the magnitude of the signal due to noise is reduced is higher than how much the magnitude of the signal due to the pressure is reduced in overall. Therefore, overall SNR may be improved. Specifically, overall SNR at the time of detecting the pressure may be improved by assigning an appropriate SNR improvement scaling factor to each channel.

In this case, the position to which the pressure is applied and the position where the display module shows the largest deformation do not particularly match each other, but generally, the display module is more greatly deformed at the position to which the pressure is applied than other positions, and therefore, the magnitude of the signal including information on the capacitance detected in the channel corresponding to the position to which the pressure is applied is generally greater than the magnitude of the signal including information on the capacitance detected in the channel corresponding to the other positions. Therefore, the SNR improvement scaling factor which is assigned to each channel may be calculated according to the magnitude of the signal including information on the capacitance detected at the position to which the pressure is applied, i.e., the touch position or detected in each channel.

Figure 22A:
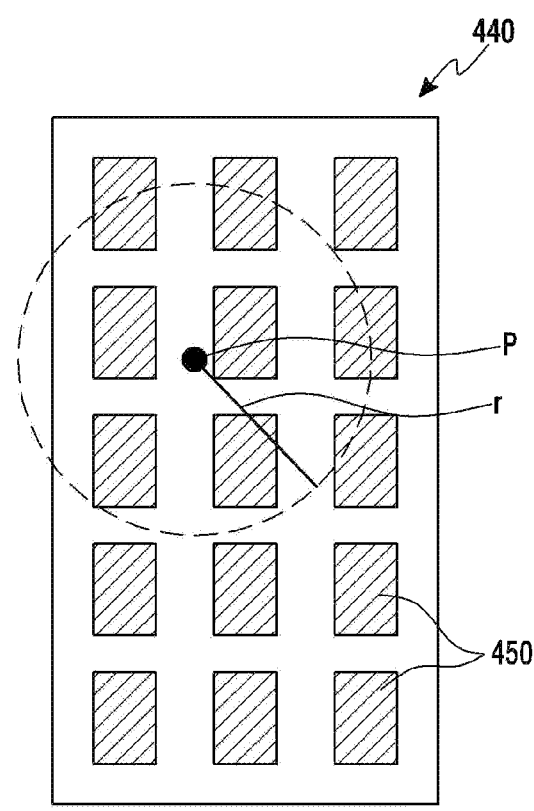
FIG. 22a and FIG. 22b are diagrams for explaining an SNR improvement scaling factor allocated to each channel when pressure is applied to the P position.
Figure 22B:
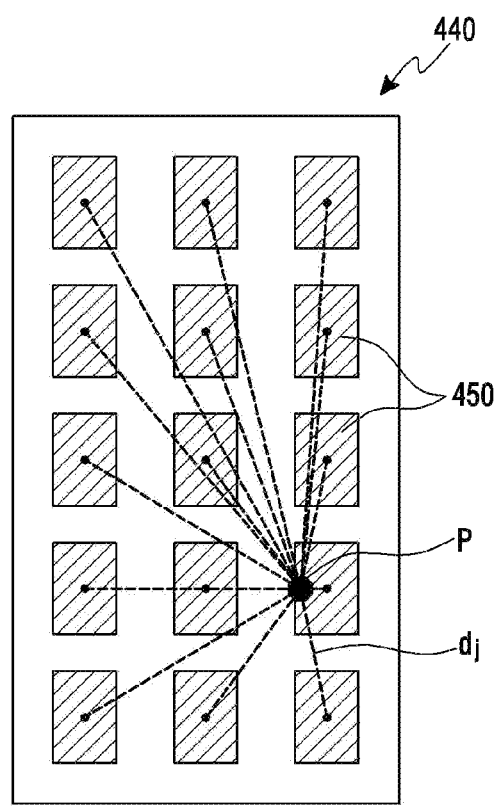
Figure 22C:
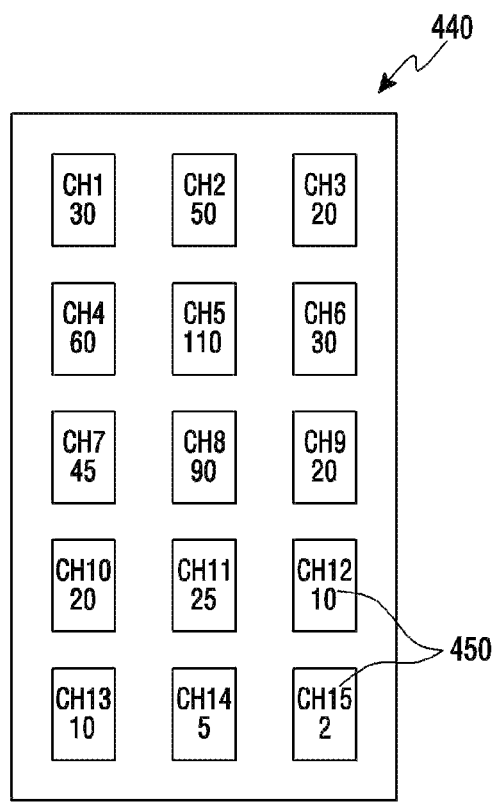

FIGS. 22a and 22b are diagrams for describing the SNR improvement scaling factor which is assigned to each channel when a pressure is applied to a position "P" and FIG. 22c is a diagram illustrating capacitance change amounts detected in the respective channels when the pressure is applied to the position "P" of FIG. 22a.

First, a method for calculating the SNR improvement scaling factor on the basis of the magnitude of the signal including information on the capacitance detected in each channel will be described.

The SNR improvement scaling factor of 1 may be assigned to N channels in which the signal with the largest magnitude is detected among the signals detected in the respective channels, and the SNR improvement scaling factor of 0 may be assigned to the remaining channels. In this case, the pressure is detected by using only some channels in which the signal with a large magnitude is detected among the total channels, and SNR may be improved by excluding the channel having the signal with a small magnitude in detecting the pressure. In this case, N is a natural number equal to or greater than 1 and equal to or smaller than the total number of the channels. Specifically, when a pressure is applied to the position "P" of FIG. 22a and N is four, the SNR improvement scaling factor of 1 is assigned to the channels CH2, CH4, CH5, and CH8 of FIG. 22c in which the four signals with the largest magnitude are detected, and the SNR improvement scaling factor of 0 is assigned to the remaining channels. Here, by applying the SNR improvement scaling factor to the above-described example of the first method, the magnitude of the pressure can be detected by using 310 that is a sum of the capacitance change amounts detected in CH2, CH4, CH5, and CH8. Further, the SNR improvement scaling factor of 1 may be assigned to a channel in which a signal with a magnitude equal to or greater than a predetermined ratio of the magnitude of the signal with the largest magnitude among the signals detected in the respective channels is detected, and the SNR improvement scaling factor of 0 may be assigned to the remaining channels. Similarly even in this case, the pressure is detected by using only some channels in which the signal with a large magnitude is detected among the total channels, and SNR can be improved by excluding the channel having the signal with a small magnitude in detecting the pressure. Specifically, when a pressure is applied to the position "P" of FIG. 22a and the predetermined ratio is 50%, the SNR improvement scaling factor of 1 is assigned to the channels CH4, CH5, and CH8 shown in FIG. 22c, in which a signal with a magnitude equal to or greater than 55 that is 50% of the magnitude of the signal output from the channel CH5 in which the signal with the largest magnitude is detected is detected and the SNR improvement scaling factor of 0 is assigned to the remaining channels. Here, by applying the SNR improvement scaling factor to the above-described example of the first method, the magnitude of the pressure may be detected by using 260 that is a sum of the capacitance change amounts detected in CH4, CH5, and CH8.

Further, a method for calculating the SNR improvement scaling factor on the basis of the touch position will be described.

The SNR improvement scaling factor of 1 may be assigned to N channels which are closest to the touch position, and the SNR improvement scaling factor of 0 may be assigned to the remaining channels. In this case, the magnitude of the signal detected in the channel close to the touch position is generally greater than the magnitude of the signal detected in the channel relatively far from the touch position. Therefore, the pressure is detected by using only some channels in which the signal with a large magnitude is detected among the total channels, and SNR may be improved by excluding the channel having the signal with a small magnitude in detecting the pressure. In this case, N is a natural number equal to or greater than 1 and equal to or smaller than the total number of the channels. Specifically, when a pressure is applied to the position "P" of FIG. 22a and N is four, the SNR improvement scaling factor of 1 is assigned to the four channels CH4, CH5, CH7, and CH8 of FIG. 22c, which are closest to the touch position, and the SNR improvement scaling factor of 0 is assigned to the remaining channels. Here, by applying the SNR improvement scaling factor to the above-described example of the first method, the magnitude of the pressure can be detected by using 305 that is a sum of the capacitance change amounts detected in CH4, CH5, CH7, and CH8.

Further, the SNR improvement scaling factor of 1 is assigned to the channel located within a predetermined distance from the touch position, and the SNR improvement scaling factor of 0 is assigned to the remaining channels. Similarly even in this case, the pressure is detected by using only some channels in which the signal with a large magnitude is detected among the total channels, and SNR can be improved by excluding the channel having the signal with a small magnitude in detecting the pressure. Specifically, when a touch is input into the position "P" of FIG. 22a and the predetermined distance is "r" shown in FIG. 22a, the SNR improvement scaling factor of 1 is assigned to the channels CH1, CH2, CH4, CH5, CH6, CH7, and CH8 which are, as shown in FIG. 22c, located within the distance "r" from the touch position, and the SNR improvement scaling factor of 0 is assigned to the remaining channels. Here, by applying the SNR improvement scaling factor to the above-described example of the first method, the magnitude of the pressure can be detected by using 385 that is a sum of the capacitance change amounts detected in CH1, CH2, CH4, CH5, CH6, CH7, and CH8.

Further, the SNR improvement scaling factor which is assigned to each channel may be calculated based on a distance between the touch position and each channel. As an embodiment, the distance between the touch position and each channel may be inversely proportional to the SNR improvement scaling factor which is assigned to each channel. In this case, SNR may be improved by reducing how much the signal with a small magnitude among the total channels contributes to the detection of the pressure. Specifically, when the touch is input into the position "P" of FIG. 22b and a distance between the touch position and the channel j is "dj", the SNR improvement scaling factor proportional to "1/dj" may be assigned to the channel j. For example, when "d1" to "d15" shown in FIG. 22b have values of 15, 13.5, 13.3, 11.3, 9.3, 8.8, 8.5, 5.3, 4.5, 7.3, 3.3, 1, 8.5, 5.3, and 4.5, "1/dj"s of 0.067, 0.074, 0.075, 0.088, 0.108, 0.114, 0.118, 0.189, 0.122, 0.137, 0.303, 1, 0.118, 0.189, and 0.222 are assigned as the SNR improvement scaling factor to CH1 to CH15 respectively. By applying the SNR improvement scaling factor to the above-described example of the first method, the magnitude of the pressure may be detected by using a sum of values obtained by multiplying the capacitance change amounts detected in the respective channels by the SNR improvement scaling factor.

Hereinabove, the example of applying the SNR improvement scaling factor to the above-described example of the first method has been described, but it is possible to detect the magnitude of the pressure by applying the SNR improvement scaling factor to the example of the second method or the third method in the same manner.

Although the pressure sensor 440 having the type shown in FIG. 13d has been described above, the embodiment of the present invention is not limited thereto and the embodiment of the present invention may be applied to another type of pressure sensor, e.g., a pressure sensor including the pressure electrode having the types illustrated in FIGS. 13a to 13c.

When the pressure sensor 440 is configured to form a plurality of channels, multi pressure detection of a multi touch may be achieved. This may be performed, for example, by using the pressure magnitudes obtained from the channels of the pressure electrodes 450 and 460 disposed at a position corresponding to each of the multiple touch positions obtained from the touch sensor panel 100. Alternatively, when the pressure sensor 440 is configured to form a plurality of channels, the touch position can be directly detected by the pressure sensor 440, and multi pressure may also be detected by using the pressure magnitudes obtained from the channels of the pressure electrodes 450 and 460 disposed at the corresponding position.

Next, an additional SNR improvement method will be described.

In the above-described method for calculating the SNR improvement scaling factor, as i) 1 is assigned to a channel in which N largest signals are detected among the signals detected in each channel, and 1 is assigned as the SNR improvement scaling factor, and 0 is assigned to the remaining channels as the SNR improvement scaling factor, ii) 1 is assigned to a channel in which a signal having a magnitude equal to or greater than a predetermined ratio of the largest signal magnitude among the signals detected in each channel is detected as the SNR improvement scaling factor and 0 is assigned to the remaining channels as the SNR improvement enhancement scaling factor, iii) 1 is assigned to N channels closest to the touch position as the SNR improvement enhancement scaling factor and 0 is assigned to the remaining channels as the SNR improvement scaling factor, or iv) 1 is assigned to a channel located within a predetermined distance from the touch position as the SNR improvement scaling factor and 0 is assigned to the remaining channels as the SNR improvement scaling factor, the pressure is detected by only some channels in which the magnitude of the detected signal is large among all channels and channels having a small magnitude are excluded at the time of detecting the pressure, thereby improving the SNR.

However, even when using this method, the noise component illustrated in FIG. 21a is added to the pressure value. For example, when the pressure value is calculated using the signals from four channels where the largest signal is detected, the pressure value is calculated using a signal in which noise signal having a magnitude equal to four times the noise component illustrated in FIG. 21a is added, and as a result, when the pressure is detected at a time when a lot of noise is generated, for example when driving an image signal on the display panel, a lot of errors may occur in the pressure value detected under the influence of noise.

In the embodiment, in consideration of this point, the magnitude of pressure is calculated using the SNR improvement scaling factor calculated using the above-described method, and the calculated pressure magnitude is corrected based on the value detected in the channel with the lowest pressure detected, and as a result, the influence of the noise is further reduced.

Figure 21C:
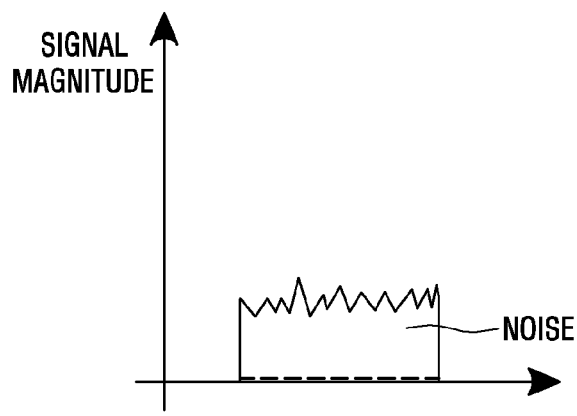
FIG. 21c is a graph showing the magnitude of a signal including information on capacitance detected in a channel having the smallest magnitude of the detected pressure.

As illustrated in FIG. 21, since the deformation due to the pressed pressure hardly occurs in the channel having the smallest detected pressure, the magnitude of the signal including information on the capacitance detected in this channel is mostly constituted by noise components.

Therefore, the above-described method for calculating the SNR improvement scaling factor may be modified and applied as follows.

i) 1 is assigned to a channel in which N largest signals are detected among the signals detected in each channel as the SNR improvement scaling factor, −1 is assigned to a channel in which N smallest signals are detected as the SNR improvement scaling factor, and 0 is assigned to the remaining channels as the SNR improvement scaling factor ii) 1 is assigned to a channel in which a signal having a magnitude equal to or greater than a predetermined ratio of the largest signal magnitude among the signals detected in each channel is detected as the SNR improvement scaling factor and when the number of channels in which the signal having the magnitude equal to or greater than the predetermined ratio is detected is N, −1 is assigned to a channel in which N smallest signals are detected as the SNR improvement scaling factor and 0 is assigned to the remaining channels as the SNR improvement scaling factor iii) 1 is assigned to N channels closest to the touch position as the SNR improvement scaling factor, −1 is assigned to the channel in which N smallest signals are detected as the SNR improvement scaling factor, and 0 is assigned to the remaining channels as the SNR improvement scaling factor iv) 1 as the SNR improvement scaling factor is assigned to the channel located within the predetermined distance from the touch position and when the number of channels located with the predetermined distance is N, −1 is assigned to the channel in which N smallest signals are detected as the SNR improvement scaling factor and 0 is assigned to the remaining channels as the allocated SNR improvement scaling factor.

For example, in the case of i) to iv), when the total number of channels is referred to as M, the electrode areas of all channels are equal, and a value calculated in a k-th channel (i.e., in the case of a channel in which the calculated value is largest, k=1 and in the case of a channel in which the calculated value is smallest, k=M, hereinafter, referred to as a 'k-th channel') in which the magnitude of the calculated value is k-th) is set to $S_k$, a pressure value P may be obtained by Equation 4.

$$P = \sum_{k=1}^{N} S_k - \sum_{k=M-N+1}^{M} S_k \qquad \text{[Equation 4]}$$

Here, $S_k$ may correspond to the amount of change in capacitance of the k-th channel in the case of the first method (FIG. 20a), may be a value obtained by multiplying the amount of change in capacitance of the k-th channel by the sensitivity compensation scaling factor previously assigned to the channel in the case of the second method (FIG. 20b), and may become a value (i.e., a volume change amount estimated for the k-th channel) obtained by reflecting a reference value corresponding to the touch position onto a value obtained by multiplying a distance change value calculated for the k-th channel by the area of the channel in the case of the third method (FIG. 20c).

For example, assuming that a measured value in the k-th channel is constituted by a component $P_k$ by an actual pressure and a component no by the noise, the sum of all signals measured from four channels having the largest signals is $(P_1+n_0)+(P_2+n_0)+(P_3+n_0)+(P_4+n_0)=P_1+P_2+P_3+P_4+4n_0$, and assuming that the component by the actual pressure in four channels having the smallest signal is 0, the sum of all signals detected from the four channels having the smallest signals becomes $4n_0$, and as a result, when the sum is substituted into Equation 4, $P=P_1+P_2+P_3+P_4+4n_0-4n_0=P_1+P_2+P_3+P_4$, only a pure pressure signal value with all noise components removed is left.

For example, when the signal is detected as illustrated in FIG. 22c, N=4 and if the method of i) is used, by adding the values detected in four channels having the largest signal, 110+90+60+50=310 and by adding the values detected in four channels having the smallest value, 2+5+10+10=27, and as a result, the pressure value P is 310-27=283 in Equation 4. For example, even when surrounding noise suddenly increases and the values detected in four channels having the largest signals increase by 80 and become 390, the values detected in four channels having the smallest signals also increase by approximately 80 due to the noise, and as a result, 107 will be detected. Therefore, the pressure value P is 390-107=283 in Equation 4, so that the same or almost similar value is detected regardless of noise.

According to the embodiment, instead of assigning −1 as the SNR improvement scaling factor to the channel where the N smallest signals are detected, −N as the SNR improvement scaling factor may be assigned to the channel where the smallest signal is detected. In other words, in the embodiment, the pressure value P may be obtained by Equation 5.

$$P = \sum_{k=1}^{N} S_k - N \times S_M \quad \text{[Equation 5]}$$

Here, $S_k$ may correspond to the amount of change in capacitance of the k-th channel in the case of the first method (FIG. 20a), may be a value obtained by multiplying the amount of change in capacitance of the k-th channel by the sensitivity compensation scaling factor previously assigned to the channel in the case of the second method (FIG. 20b), and may become a value obtained by reflecting a reference value corresponding to the touch position onto a value (i.e., a volume change amount estimated for the k-th channel) obtained by multiplying a distance change value calculated for the k-th channel by the area of the channel in the case of the third method (FIG. 20c).

For example, when the signal is detected as illustrated in FIG. 22c, N=4 and if the method of i) is used, by adding the values detected in four channels having the largest signal, 110+90+60+50=310 and the value detected in the channel having the smallest signal is 2, and as a result, the pressure value P is 310−4×2=302 in Equation 5. For example, even when surrounding noise suddenly increases and the values detected in four channels having the largest signals increase by 80 and become 390, the value detected in the channel having the smallest signal also increases by approximately 20 due to the noise, and as a result, 22 will be detected. Therefore, the pressure value P is 390−4×22=302 in Equation 5, so that the same or almost similar value is detected regardless of noise.

Figure 22D:
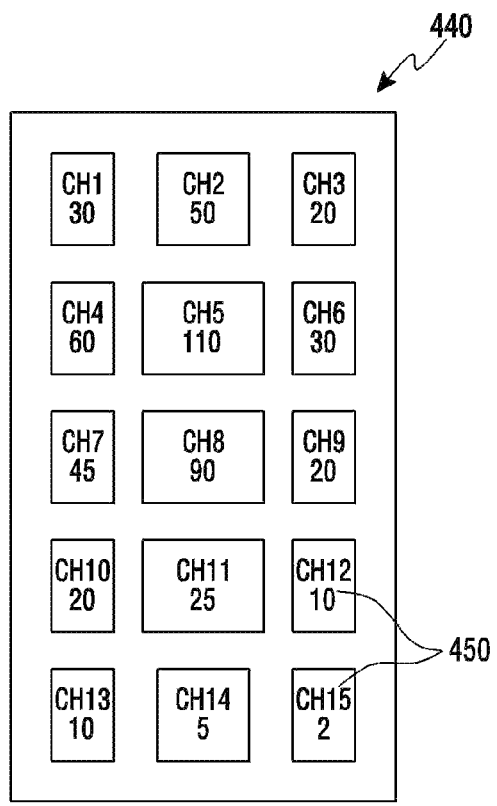

Meanwhile, according to embodiments, the area of the electrode used for each channel may be designed differently. An example in this case is illustrated in FIG. 22d. FIG. 22d illustrates that the area of each of central channels CH5, CH8, and CH11 is twice as large as that of peripheral channels CH1, CH3, CH4, CH6, CH7, CH9, CH10, CH12, CH13, and CH15 and the area of each of a top center channel CH2 and a bottom center channel CH14 is 1.5 times larger than the area of each of the peripheral channels. In FIG. 22d, the amount of change in capacitance detected in each channel is shown when the pressure is applied to the P position in FIG. 22a.

When the area of each channel is different as illustrated in FIG. 22d, the amount of noise mixed into each channel is also changed, and is approximately proportional to a channel area. Therefore, when the area of each channel is different, Equation 4 may be rewritten as Equation 6. In Equation 6, $A_k$ represents the area of the channel with the k-th largest calculated value.

$$P = \sum_{k=1}^{N} S_k - \frac{\sum_{k=1}^{N} A_k}{\sum_{k=M-N+1}^{M} A_k} \times \sum_{k=M-N+1}^{M} S_k \quad \text{[Equation 6]}$$

In Equation 6, when the SNR improvement scaling factor assigned to the channel in which the N largest signals among the signals detected in each channel are detected is 1, the sum of the areas of the channels in which the N largest signals are detected is Amax, and the sum of the areas of the channels in which the N smallest signals are detected is Amin, the SNR improvement scaling factor assigned to the channel where the N smallest signals are detected is −Amax/Amin and the SNR improvement scaling factor assigned to the remaining channels is set 0.

For example, when the signal is detected as illustrated in FIG. 22d, N=4 and if the method of i) is used, by adding the values detected in four channels having the largest signal, 110+90+60+50=310 and by adding the values detected in four channels having the smallest signal, 2+5+10+10=27. When the area of the channel with the smallest area is 1, the sum of the areas of four channels with the largest signal is 2+2+1.5+1=6.5 and the sum of the areas of four channels with the smallest signals is 1+1.5.+1+1=4.5. When the values are substituted into Equation 6, the pressure value P is 310−(6.5/4.5)×27=271 (rounded up to a decimal point). For example, even when surrounding noise suddenly increases and the values detected in four channels having the largest signals increase by 80 and become 390, the values detected in four channels having the smallest signal also increase by approximately 80×(4.5/6.5)=55 in proportion to the area due to the noise, and as a result, 82 will be detected in four channels having the smallest signals. Therefore, the pressure value P is 390−(6.5/4.5)×82=272 (rounded up to the decimal point) in Equation 6, so that the same or almost similar value is detected regardless of noise.

Further, Equation 5 may be rewritten as Equation 7.

$$P = \sum_{k=1}^{N} A_k d_k - \frac{\sum_{k=1}^{N} A_k}{A_M} \times S_M \quad \text{[Equation 7]}$$

In Equation 7, when the SNR improvement scaling factor assigned to the channel in which the N largest signals among the signals detected in each channel are detected is 1, the sum of the areas of the channels in which the N largest signals are detected is Amax, and the sum of the areas of the channels in which the smallest signals are detected is A, the SNR improvement scaling factor assigned to the channel where the smallest signals are detected is −Amax/A and the SNR improvement scaling factor assigned to the remaining channels is set 0.

In this case, for example, when the signal is detected as illustrated in FIG. 22d, N=4 and if the method of i) is used, by adding the values detected in four channels having the largest signal, 110+90+60+50=310, the value detected in the channel having the smallest signal is 2, the sum of the areas of four channels having the largest signals is 2+2+1.5+1=6.5, and the area of the channel having the smallest signal is 1. When the values are substituted into Equation 7, the pressure value P is 310−(6.5/1)×2=297. For example, even when surrounding noise suddenly increases and the values detected in four channels having the largest signals increase by 80 and become 390, the value detected in the channel having the smallest signal also increases by approximately 80×(1/6.5)=12.3 in proportion to the area, and as a result, 14.3 will be detected. Therefore, the pressure value P is 390−(6.5/1)×14.3=297 (rounded up to the decimal point) in Equation 7, so that the same or almost similar value is detected regardless of noise.

Table 1 shows pressure detection values when there is no touch in the case of applying the scheme of Equation 4 and in the case of applying the scheme of Equation 6. As can be seen in Table 1, applying Equation 6 may greatly reduce a possibility of being incorrectly recognized as the pressure touch due to the noise.

TABLE 1

| Time [s] | Equation 4 | Equation 6 |
| --- | --- | --- |
| 0.01 | −22 | −1 |
| 0.02 | 14 | 2 |
| 0.03 | −18 | −1 |
| 0.04 | −42 | −2 |
| 0.06 | 36 | −1 |
| 0.07 | 37 | 5 |
| 0.08 | −24 | 4 |
| 0.09 | −20 | 2 |
| 0.10 | 24 | 2 |
| 0.11 | −8 | −4 |
| 0.12 | −7 | −1 |
| 0.13 | −20 | −1 |
| 0.14 | 23 | −5 |
| 0.16 | −20 | 0 |
| 0.17 | −8 | −2 |
| 0.18 | 11 | −3 |
| 0.19 | 8 | 0 |
| 0.20 | −2 | 1 |
| 0.21 | 8 | 3 |
| 0.22 | −18 | 3 |
| 0.23 | 8 | 5 |
| 0.24 | −2 | −3 |

Meanwhile, in the above description, it is described that the change amount of the capacitance is detected in order to detect the touch pressure, but the present invention is not limited thereto. For example, the present invention is applicable even to a case of detecting the touch pressure by using a strain gauge.

Although several embodiments of the present invention have been mainly described above, these are merely examples and do not limit the present invention, and those skilled in the art to which the present invention pertains will know that various modifications and applications not illustrated above can be made within the scope without departing from the essential characteristics of the embodiment. For example, each component specifically shown in the embodiment may be implemented by being modified. In addition, it will be interpreted that differences related to the modifications and applications are included in the scope of the present invention defined in the appended claims.

| [Explanation of Reference numbers] | |
| --- | --- |
| 1000: touch input device | 100: touch sensor panel |
| 120: drive unit | 110: sensing unit |
| 130: controller | 200: display module |
| 300: substrate | |
| 420: spacer layer | 440: pressure sensor |
| 450, 460: electrode | 470: first insulation layer |
| 471: Second insulation layer | 470a, 471a: electrode covering layer |
| 470b, 471b: support layer | 430: adhesive layer |
| 435: protective layer | 480: elastic layer |

The invention claimed is:

1. A touch input device comprising:
a pressure sensor detecting a pressure of touching a surface of the touch input device, wherein the pressure sensor includes a plurality of electrodes to form a plurality of channels, and the touch input device detects a magnitude of a pressure for a touch based on a change amount of an electrical characteristic detected in the each channel and an SNR improvement scaling factor assigned to each channel, wherein the SNR improvement scaling factor assigned to a channel in which N largest signals are detected among the signals detected in each channel is 1, N being a natural number greater than 1, the SNR improvement scaling factor assigned to a channel in which N smallest signals are detected is −1, and the SNR improvement scaling factor assigned to the remaining channels is 0, wherein the touch input device detects the magnitude of the pressure by adding a second value to a first value, wherein the first value is each of the N largest signals multiplied by the SNR improvement scaling factor of 1 and then summed, and wherein the second value is each of the N smallest signals multiplied by the SNR improvement scaling factor of −1 and then summed.

2. The touch input device of claim 1, wherein the electrical characteristic is a capacitance, and the magnitude of the pressure for the touch is detected based on the sum of values obtained by multiplying a change amount of the capacitance detected in the each channel and the SNR improvement scaling factor assigned to the each channel by each other.

3. The touch input device of claim 1, wherein the electrical characteristic is the capacitance, and the magnitude of the pressure for the touch is detected based on the sum of values obtained by multiplying the change amount of the capacitance detected in the each channel, a sensitivity correction scaling factor previously assigned to the each channel and the SNR improvement scaling factor assigned to the each channel by each other.

4. The touch input device of claim 3, wherein the sensitivity correction scaling factor assigned to the channel corresponding to a center of a display module is smaller than the sensitivity correction scaling factor assigned to the channel corresponding to an edge of the display module.

5. The touch input device of claim 1, wherein the electrical characteristic is the capacitance, a volume change amount of the touch input device is estimated from the change amount of the capacitance detected in the each channel, and the magnitude of the pressure for the touch is detected based on the estimated volume change amount and the SNR improvement scaling factor assigned to the each channel.

6. The touch input device of claim 5, wherein the magnitude of the pressure for the touch is detected based on the estimated volume change amount, the SNR improvement scaling factor assigned to the each channel, and a reference value corresponding to a predetermined touch position which is prestored.

7. The touch input device of claim 5, wherein the volume change amount of the touch input device is estimated by calculating a distance change corresponding to the each channel from the change amount of the capacitance detected in the each channel.

8. A touch input device comprising:
a pressure sensor detecting a pressure of touching a surface of the touch input device,
wherein the pressure sensor includes a plurality of electrodes to form a plurality of channels, and
the touch input device detects a magnitude of a pressure for a touch based on a change amount of an electrical characteristic detected in the each channel and an SNR improvement scaling factor assigned to each channel, wherein the SNR improvement scaling factor assigned to a channel in which N largest signals are detected among the signals detected in each channel is 1, N being a natural number greater than 1, the SNR improvement scaling factor assigned to a channel in which the smallest signal is detected is −N, and the SNR improvement scaling factor assigned to the remaining channels is 0, wherein the touch input device detects the magnitude of the pressure by adding a second value to a first value, wherein the first value is each of the N largest signals multiplied by the SNR improvement scaling factor of 1 and then summed, and wherein the second value is the smallest signal multiplied by the SNR improvement scaling factor of −N.

9. A touch input device comprising:
a pressure sensor detecting a pressure of touching a surface of the touch input device,
wherein the pressure sensor includes a plurality of electrodes to form a plurality of channels, and
the touch input device detects a magnitude of a pressure for a touch based on a change amount of an electrical characteristic detected in the each channel and an SNR improvement scaling factor assigned to each channel, wherein the SNR improvement scaling factor assigned to a channel in which one or more signals having a magnitude equal to or greater than a predetermined ratio of the largest signal magnitude among the signals detected in each channel is detected is 1, the SNR improvement scaling factor assigned to a channel in which N smallest signals are detected is −1, N being a natural number greater than 1, and the SNR improvement scaling factor assigned to the remaining channels is 0, wherein the touch input device detects the magnitude of the pressure by adding a second value to a first value, wherein the first value is each of the one or more signals multiplied by the SNR improvement scaling factor of 1 and then summed, and wherein the second value is each of the N smallest signals multiplied by the SNR improvement scaling factor of −1 and then summed.

10. A touch input device comprising:
a pressure sensor detecting a pressure of touching a surface of the touch input device,
wherein the pressure sensor includes a plurality of electrodes to form a plurality of channels, and
the touch input device detects a magnitude of a pressure for a touch based on a change amount of an electrical characteristic detected in the each channel and an SNR improvement scaling factor assigned to each channel, wherein when the SNR improvement scaling factor assigned to the channel in which one or more signals having the magnitude equal to or greater than a predetermined ratio of the largest signal magnitude among the signals detected in each channel is detected is 1 and the number of channels in which the signal having the magnitude equal to or greater than the predetermined ratio is detected is N, N being a natural number greater than 1, the SNR improvement scaling factor assigned to the channel in which the smallest signal is detected is −N and the SNR improvement scaling factor assigned to the remaining channels is 0, wherein the touch input device detects the magnitude of the pressure by adding a second value to a first value, wherein the first value is each of the one or more signals multiplied by the SNR improvement scaling factor of 1 and then summed, and wherein the second value is the smallest signal multiplied by the SNR improvement scaling factor of −N.

11. A touch input device comprising:
a pressure sensor detecting a pressure of touching a surface of the touch input device,
wherein the pressure sensor includes a plurality of electrodes to form a plurality of channels, and
the touch input device detects a magnitude of a pressure for a touch based on a change amount of an electrical characteristic detected in the each channel and an SNR improvement scaling factor assigned to each channel, further comprising:
a touch sensor detecting a touched position, wherein the SNR improvement scaling factor assigned to N channels closest to the touch position is 1, N being a natural number greater than 1, the SNR improvement scaling factor assigned to the channel in which N smallest signals are detected is −1, and the SNR improvement scaling factor assigned to the remaining channels is 0, wherein the touch input device detects the magnitude of the pressure by adding a second value to a first value, wherein the first value is each of signals detected by the N channels multiplied by the SNR improvement scaling factor of 1 and then summed, and wherein the second value is each of the N smallest signals multiplied by the SNR improvement scaling factor of −1 and then summed.

12. A touch input device comprising:
a pressure sensor detecting a pressure of touching a surface of the touch input device,
wherein the pressure sensor includes a plurality of electrodes to form a plurality of channels, and
the touch input device detects a magnitude of a pressure for a touch based on a change amount of an electrical characteristic detected in the each channel and an SNR improvement scaling factor assigned to each channel, further comprising:
a touch sensor detecting a touched position, wherein the SNR improvement scaling factor assigned to N channels closest to the touch position is 1, N being a natural number greater than 1, the SNR improvement scaling factor assigned to the channel in which the smallest signal is detected is −N, and the SNR improvement scaling factor assigned to the remaining channels is 0, wherein the touch input device detects the magnitude of the pressure by adding a second value to a first value, wherein the first value is each of signals detected by the N channels multiplied by the SNR improvement scaling factor of 1 and then summed, and wherein the second value is the smallest signal multiplied by the SNR improvement scaling factor of −N.

13. A touch input device comprising:
a pressure sensor detecting a pressure of touching a surface of the touch input device,
wherein the pressure sensor includes a plurality of electrodes to form a plurality of channels, and
the touch input device detects a magnitude of a pressure for a touch based on a change amount of an electrical characteristic detected in the each channel and an SNR improvement scaling factor assigned to each channel,
wherein at least any one of the plurality of electrodes has a different area from other electrodes, and
when the SNR improvement scaling factor assigned to the channel in which the N largest signals among the signals detected in each channel are detected is 1, the sum of the areas of the channels in which the N largest signals are detected is Amax, and the sum of the areas of the channels in which the N smallest signals are detected is Amin, the SNR improvement scaling factor assigned to the channel where the N smallest signals are detected is −Amax/Amin and the SNR improvement scaling factor assigned to the remaining channels is 0.

14. A touch input device comprising:
a pressure sensor detecting a pressure of touching a surface of the touch input device,
wherein the pressure sensor includes a plurality of electrodes to form a plurality of channels, and
the touch input device detects a magnitude of a pressure for a touch based on a change amount of an electrical characteristic detected in the each channel and an SNR improvement scaling factor assigned to each channel,
wherein at least any one of the plurality of electrodes has a different area from other electrodes, and
when the SNR improvement scaling factor assigned to the channel in which the N largest signals among the signals detected in each channel are detected is 1, the sum of the areas of the channels in which the N largest signals are detected is Amax, and the areas of the channels in which the smallest signals are detected is A, the SNR improvement scaling factor assigned to the channel where the smallest signals are detected is −Amax/A and the SNR improvement scaling factor assigned to the remaining channels is 0.

* * * * *